United States Patent
He et al.

(10) Patent No.: US 11,792,770 B2
(45) Date of Patent: Oct. 17, 2023

(54) CHANNEL RESTRICTIONS FOR RELAYED SIDELINK COMMUNICATIONS

(71) Applicant: QUALCOMM Incorporated, San Diego, CA (US)

(72) Inventors: Linhai He, San Diego, CA (US); Seyedkianoush Hosseini, San Diego, CA (US); Sudhir Kumar Baghel, Hillsborough, NJ (US); Karthika Paladugu, San Diego, CA (US); Gokul Sridharan, Sunnyvale, CA (US); Gabi Sarkis, San Diego, CA (US); Gavin Bernard Horn, La Jolla, CA (US); Hwan Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/203,695

(22) Filed: Mar. 16, 2021

(65) Prior Publication Data
US 2021/0297992 A1    Sep. 23, 2021

Related U.S. Application Data

(60) Provisional application No. 62/992,596, filed on Mar. 20, 2020.

(51) Int. Cl.
*H04W 72/02* (2009.01)
*H04W 72/1263* (2023.01)
(Continued)

(52) U.S. Cl.
CPC ....... *H04W 72/02* (2013.01); *H04W 72/0453* (2013.01); *H04W 72/1263* (2013.01);
(Continued)

(58) Field of Classification Search
None
See application file for complete search history.

(56) References Cited

U.S. PATENT DOCUMENTS

2014/0241262 A1    8/2014    Novak et al.
2018/0219654 A1    8/2018    Chen et al.
(Continued)

FOREIGN PATENT DOCUMENTS

WO    WO-2017134578 A1    8/2017
WO    WO-2018016157 A1    1/2018
(Continued)

OTHER PUBLICATIONS

International Search Report and Written Opinion—PCT/US2021/022830—ISA/EPO—dated Jul. 12, 2021.
(Continued)

*Primary Examiner* — Kodzovi Acolatse
(74) *Attorney, Agent, or Firm* — Holland & Hart LLP/QUALCOMM Incorporated

(57) ABSTRACT

Methods, systems, and devices for wireless communications are described to support relayed sidelink communications. A first device and a base station may communicate via a communication link including a sidelink link between the first device and a second device and a relay link between the second device and the base station. The base station may determine restrictions for the communication link and transmit an indication of the restrictions over the relay link. The restrictions may differentiate data originating from the first device and the second device, restrict the first device to one or more resources, or associate logical channels at the first device with one or more transport block sizes and communication links. The second device may relay the indication of the restrictions to the first device. The first device, the
(Continued)

second device, and the base station may communicate over the communication link according to the restrictions.

69 Claims, 24 Drawing Sheets

(51) Int. Cl.
*H04W 72/0453* (2023.01)
*H04W 72/23* (2023.01)
*H04W 72/56* (2023.01)
*H04W 72/566* (2023.01)

(52) U.S. Cl.
CPC ........... *H04W 72/23* (2023.01); *H04W 72/56* (2023.01); *H04W 72/566* (2023.01)

(56) References Cited

U.S. PATENT DOCUMENTS

| | | | |
|---|---|---|---|
| 2018/0324842 | A1 | 11/2018 | Gulati et al. |
| 2019/0335356 | A1 | 10/2019 | Lee et al. |
| 2020/0029353 | A1 | 1/2020 | Xu et al. |
| 2020/0092685 | A1 | 3/2020 | Fehrenbach et al. |
| 2020/0196387 | A1 | 6/2020 | Roy et al. |
| 2020/0344771 | A1* | 10/2020 | Kang .................. H04W 76/14 |
| 2021/0168826 | A1* | 6/2021 | Zhao .................. H04L 5/0044 |
| 2021/0298034 | A1 | 9/2021 | He et al. |
| 2021/0298043 | A1 | 9/2021 | He et al. |
| 2022/0015070 | A1* | 1/2022 | Chen .................. H04W 72/23 |
| 2022/0022244 | A1* | 1/2022 | Zhao .................. H04W 72/569 |
| 2022/0124772 | A1* | 4/2022 | Xu .................. H04W 76/14 |
| 2022/0225341 | A1* | 7/2022 | Li .................. H04W 28/02 |
| 2022/0346112 | A1* | 10/2022 | Lin .................. H04W 72/569 |
| 2022/0400490 | A1* | 12/2022 | Ji .................. H04W 72/0453 |

FOREIGN PATENT DOCUMENTS

| | | |
|---|---|---|
| WO | WO-2018061521 A1 | 4/2018 |
| WO | WO-2020006366 A1 | 1/2020 |
| WO | WO-2020006388 A1 | 1/2020 |
| WO | WO-2020034610 A1 | 2/2020 |

OTHER PUBLICATIONS

3GPP TS 23.304: "3rd Generation Partnership Project, Technical Specification Group Services and System Aspects, Proximity based Services (ProSe) in the 5G System (5GS) (Release 17)", 3GPP TS 23.304 V0.1.0 (Mar. 2021), Technical Specification, Sections 5.4 and 6.1, Mar. 2021, Valbonne, France, 7 pages.

CoolPad: "Further Discussion on Resource Allocation Issues and Way Forward for Release 13", 3GPP Draft, 3GPP TSG RAN WG2 #91bis, R2-154269, 3GPP, Mobile Competence Centre, 650, Route Des Lucioles, F-06921 Sophia-Antipolis Cedex, France, vol. RAN WG2, No. Malmo, Sweden, Oct. 5, 2015-Oct.10, 2015, Oct. 4, 2015, XP051004828, pp. 1-4, paragraph [03.3], p. 2, paragraph 3.1, p. 2, figure 2.

Interdigital Inc: "Remaining Aspects of UL/SL Prioritization", 3GPP Draft, 3GPP RAN WG2 Meeting #107bis, R2-1914868, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Nov. 8, 2019 (Nov. 8, 2019), XP051816812, 4 Pages, section 2.3.

Nokia, et al., "Sidelink Resource Allocation with Relay UE", 3GPP Daft, 3GPP TSG RAN WG1 Meeting #89, R1-1708564, 3GPP, Mobile Competence Centre, 650, Route Des Lucioles, F- 06921 Sophia-Antipolis Cedex, F, vol. RAN WG1, No. Hangzhou, China, May 15, 2017-May 19, 2017, May 14, 2017, XP051273756, pp. 1-7, section 2, figure 2, p. 2-p. 3, p. 3, figure 2, Section 4, seventh paragraph.

NTT Docomo, Inc: "Sidelink Physical Layer Structure for NR V2X", 3GPP Draft, 3GPP TSG RAN WG1 Meeting #AH1901, R1-1900962, SL PHY Structure, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593807, 7 Pages, p. 2.

VIVO: "Triggering Condition of Pre-BSR", 3GPP Draft, 3GPP TSG-RAN WG2 Meeting #106, R2-1905829 (Resubmission of R2-19003343)_Triggering Condition of PRE-BSR, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019 May 3, 2019 (May 3, 2019), XP051710182, pp. 1-3.

\* cited by examiner

CHANNEL RESTRICTIONS FOR RELAYED SIDELINK COMMUNICATIONS

CROSS REFERENCE

The present Application for Patent claims the benefit of U.S. Provisional Patent Application No. 62/992,596 by H E et al., entitled "CHANNEL RESTRICTIONS FOR RELAYED SIDELINK COMMUNICATIONS," filed Mar. 20, 2020, assigned to the assignee hereof, and expressly incorporated by reference herein.

INTRODUCTION

The following relates generally to wireless communications and more specifically to managing sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include receiving, over a relay communication link between the first device and a base station, an indication of one or more logical channel prioritization (LCP) restrictions corresponding to the relay communication link and a sidelink communication link between the first device and a second device, the one or more LCP restrictions based on an identity of the second device. The method may include transmitting, over the sidelink communication link, the indication of the one or more LCP restrictions and communicating over the sidelink communication link and the relay communication link based on the one or more LCP restrictions.

An apparatus for wireless communication at a first device is described. The apparatus may include a processor and memory coupled to the processor. The processor and memory may be configured to receive, over a relay communication link between the first device and a base station, an indication of one or more LCP restrictions corresponding to the relay communication link and a sidelink communication link between the first device and a second device, the one or more LCP restrictions based on an identity of the second device. The processor and memory may further be configured to transmit, over the sidelink communication link, the indication of the one or more LCP restrictions and communicate over the sidelink communication link and the relay communication link based on the one or more LCP restrictions.

Another apparatus for wireless communication at a first device is described. The apparatus may include means for receiving, over a relay communication link between the first device and a base station, an indication of one or more LCP restrictions corresponding to the relay communication link and a sidelink communication link between the first device and a second device, the one or more LCP restrictions based on an identity of the second device. The apparatus may also include means for transmitting, over the sidelink communication link, the indication of the one or more LCP restrictions and means for communicating over the sidelink communication link and the relay communication link based on the one or more LCP restrictions.

A non-transitory computer-readable medium storing code for wireless communication at a first device is described. The code may include instructions executable by a processor to receive, over a relay communication link between the first device and a base station, an indication of one or more LCP restrictions corresponding to the relay communication link and a sidelink communication link between the first device and a second device, the one or more LCP restrictions based on an identity of the second device. The code may include instructions executable by the processor to transmit, over the sidelink communication link, the indication of the one or more LCP restrictions and communicate over the sidelink communication link and the relay communication link based on the one or more LCP restrictions.

Some examples of the method, apparatuses, and non-transitory computer-readable medium described herein may further include operations, features, means, or instructions for receiving a configuration that differentiates a logical channel priority for the second device from a logical channel priority for the first device.

Some examples of the method, apparatuses, and non-transitory computer-readable medium described herein may further include operations, features, means, or instructions for receiving an indication that one or more logical channels (LCHs) associated with the first device may have a higher scheduling priority than one or more LCHs associated with the second device.

Some examples of the method, apparatuses, and non-transitory computer-readable medium described herein may further include operations, features, means, or instructions for receiving an indication of an offset associated with an LCP for the first device.

Some examples of the method, apparatuses, and non-transitory computer-readable medium described herein may further include operations, features, means, or instructions for determining an initial LCP for the first device, summing the initial LCP and the offset, the LCP for the first device based on the sum of the initial LCP and the offset, and assigning the LCP for the first device to one or more communications associated with the first device, the one or more communications transmitted over the relay communication link.

Some examples of the method, apparatuses, and non-transitory computer-readable medium described herein may further include operations, features, means, or instructions for receiving a configuration that restricts communications for a set of devices to a subset of carriers of a system bandwidth, the set of devices including the second device.

Some examples of the method, apparatuses, and non-transitory computer-readable medium described herein may further include operations, features, means, or instructions for receiving a configuration that restricts communications for a set of devices to one or more grant-based resources, the set of devices including the second device.

Some examples of the method, apparatuses, and non-transitory computer-readable medium described herein may further include operations, features, means, or instructions for receiving a configuration that associates each LCH corresponding to the second device with one of the sidelink communication link or a second communication link directly between the second device and the base station.

Some examples of the method, apparatuses, and non-transitory computer-readable medium described herein may further include operations, features, means, or instructions for receiving a configuration that associates each LCH corresponding to the second device with a first range of transport block sizes (TBSs) associated with the sidelink communication link and a second range of TBSs associated with a second communication link directly between the second device and the base station.

Some examples of the method, apparatuses, and non-transitory computer-readable medium described herein may further include operations, features, means, or instructions for receiving, via the configuration, a threshold TBS for communications on the sidelink communication link or the second communication link.

Some examples of the method, apparatuses, and non-transitory computer-readable medium described herein may further include operations, features, means, or instructions for receiving, over the sidelink communication link, a first identifier (ID) indicating the identity of the second device, identifying a second ID indicating an identity of the first device, and transmitting, over the relay communication link, the first ID and the second ID, the receiving the indication of the one or more LCP restrictions based on transmitting the first ID and the second ID.

Some examples of the method, apparatuses, and non-transitory computer-readable medium described herein may further include operations, features, means, or instructions for receiving, over the sidelink communication link, one or more first LCP restrictions configured for the second device, identifying one or more second LCP restrictions configured for the first device, and transmitting, over the relay communication link, the one or more first LCP restrictions and the one or more second LCP restrictions, the one or more LCP restrictions based on the one or more first LCP restrictions and the one or more second LCP restrictions.

A method for wireless communication at a second device is described. The method may include receiving, over a sidelink communication link between the second device and a first device, an indication of one or more LCP restrictions corresponding to the sidelink communication link and a relay communication link between the first device and a base station, the one or more LCP restrictions based on an identity of the second device. The method may include communicating over the sidelink communication link based on the one or more LCP restrictions.

An apparatus for wireless communication at a second device is described. The apparatus may include a processor and memory coupled to the processor. The processor and memory may be configured to receive, over a sidelink communication link between the second device and a first device, an indication of one or more LCP restrictions corresponding to the sidelink communication link and a relay communication link between the first device and a base station, the one or more LCP restrictions based on an identity of the second device. The processor and memory may further be configured to communicate over the sidelink communication link based on the one or more LCP restrictions.

Another apparatus for wireless communication at a second device is described. The apparatus may include means for receiving, over a sidelink communication link between the second device and a first device, an indication of one or more LCP restrictions corresponding to the sidelink communication link and a relay communication link between the first device and a base station, the one or more LCP restrictions based on an identity of the second device. The apparatus may include means for communicating over the sidelink communication link based on the one or more LCP restrictions.

A non-transitory computer-readable medium storing code for wireless communication at a second device is described. The code may include instructions executable by a processor to receive, over a sidelink communication link between the second device and a first device, an indication of one or more LCP restrictions corresponding to the sidelink communication link and a relay communication link between the first device and a base station, the one or more LCP restrictions based on an identity of the second device. The code may include instructions executable by a processor to communicate over the sidelink communication link based on the one or more LCP restrictions.

Some examples of the method, apparatuses, and non-transitory computer-readable medium described herein may further include operations, features, means, or instructions for receiving a configuration that restricts communications for a set of devices to a subset of carriers of a system bandwidth, the set of devices including the second device.

Some examples of the method, apparatuses, and non-transitory computer-readable medium described herein may further include operations, features, means, or instructions for receiving a configuration that restricts communications for a set of devices to one or more grant-based resources, the set of devices including the second device.

Some examples of the method, apparatuses, and non-transitory computer-readable medium described herein may further include operations, features, means, or instructions for establishing a second communication link with the base station, the second device being located within a coverage area of the base station and the second communication link being a direct communication link between the second device and the base station.

Some examples of the method, apparatuses, and non-transitory computer-readable medium described herein may further include operations, features, means, or instructions for receiving a configuration that associates each LCH corresponding to the second device with one of the sidelink communication link or a second communication link between the second device and the base station, the second device located within a coverage area of the base station and the second communication link being a direct communication link between the second device and the base station.

Some examples of the method, apparatuses, and non-transitory computer-readable medium described herein may further include operations, features, means, or instructions for receiving a configuration that associates each LCH corresponding to the second device with a first range of TBSs associated with the sidelink communication link and a second range of TBSs associated with a second communication link between the second device and the base station, the second device located within a coverage area of the base station and the second communication link being a direct communication link between the second device and the base station.

Some examples of the method, apparatuses, and non-transitory computer-readable medium described herein may further include operations, features, means, or instructions for receiving, via the configuration, a threshold TBS for communications on the sidelink communication link or the second communication link.

Some examples of the method, apparatuses, and non-transitory computer-readable medium described herein may further include operations, features, means, or instructions for transmitting, over the sidelink communication link, an ID indicating the identity of the second device, the receiving the indication of the one or more LCP restrictions based on transmitting the ID.

Some examples of the method, apparatuses, and non-transitory computer-readable medium described herein may further include operations, features, means, or instructions for transmitting, over the sidelink communication link, one or more first LCP restrictions configured for the second device, the one or more LCP restrictions based on the one or more first LCP restrictions.

A method for wireless communication at a base station is described. The method may include transmitting, over a relay communication link between the base station and a second device, an indication of one or more LCP restrictions corresponding to the relay communication link and a sidelink communication link between the second device and a first device, the one or more LCP restrictions based on an identity of the first device. The method may include communicating with the second device over the relay communication link based on the one or more LCP restrictions.

An apparatus for wireless communication at a base station is described. The apparatus may include a processor and memory coupled to the processor. The processor and memory may be configured to transmit, over a relay communication link between the base station and a first device, an indication of one or more LCP restrictions corresponding to the relay communication link and a sidelink communication link between the first device and a second device, the one or more LCP restrictions based on an identity of the second device. The processor and memory may further be configured to communicate with the first device over the relay communication link based on the one or more LCP restrictions.

Another apparatus for wireless communication at a base station is described. The apparatus may include means for transmitting, over a relay communication link between the base station and a first device, an indication of one or more LCP restrictions corresponding to the relay communication link and a sidelink communication link between the first device and a second device, the one or more LCP restrictions based on an identity of the second device. The apparatus may include means for communicating with the first device over the relay communication link based on the one or more LCP restrictions.

A non-transitory computer-readable medium storing code for wireless communication at a base station is described. The code may include instructions executable by a processor to transmit, over a relay communication link between the base station and a first device, an indication of one or more LCP restrictions corresponding to the relay communication link and a sidelink communication link between the first device and a second device, the one or more LCP restrictions based on an identity of the second device. The code may include instructions executable by a processor to communicate with the first device over the relay communication link based on the one or more LCP restrictions.

Some examples of the method, apparatuses, and non-transitory computer-readable medium described herein may further include operations, features, means, or instructions for transmitting an LCP configuration that differentiates an LCP for the second device from an LCP for the first device.

Some examples of the method, apparatuses, and non-transitory computer-readable medium described herein may further include operations, features, means, or instructions for transmitting an indication that one or more LCHs associated with the first device may have a higher scheduling priority than one or more LCHs associated with the second device.

Some examples of the method, apparatuses, and non-transitory computer-readable medium described herein may further include operations, features, means, or instructions for transmitting an indication of an offset associated with an LCP for the first device, one or more communications associated with the first device and communicated over the relay communication link being based on the offset.

Some examples of the method, apparatuses, and non-transitory computer-readable medium described herein may further include operations, features, means, or instructions for transmitting an indication that the one or more LCP restrictions apply to a set of devices that includes the second device.

Some examples of the method, apparatuses, and non-transitory computer-readable medium described herein may further include operations, features, means, or instructions for transmitting an LCP configuration that restricts communications for a set of devices to a subset of carriers of a system bandwidth, the set of devices including the second device.

Some examples of the method, apparatuses, and non-transitory computer-readable medium described herein may further include operations, features, means, or instructions for transmitting an LCP configuration that restricts communications for a set of devices to one or more grant-based resources, the set of devices including the second device.

Some examples of the method, apparatuses, and non-transitory computer-readable medium described herein may further include operations, features, means, or instructions for establishing a second communication link with the second device, the second device being located within a coverage area of the base station and the second communication link being a direct communication link between the second device and the base station.

Some examples of the method, apparatuses, and non-transitory computer-readable medium described herein may further include operations, features, means, or instructions for transmitting an LCP configuration that associates each LCH corresponding to the second device with one of the sidelink communication link or a second communication link between the base station and the second device, the second device located within a coverage area of the base station and the second communication link being a direct communication link between the second device and the base station.

Some examples of the method, apparatuses, and non-transitory computer-readable medium described herein may further include operations, features, means, or instructions for transmitting an LCP configuration that associates each LCH corresponding to the second device with a first range of TBSs associated with the sidelink communication link and a second range of TBSs associated with a second communication link between the base station and the second device, the second device located within a coverage area of the base station and the second communication link being a direct communication link between the second device and the base station.

Some examples of the method, apparatuses, and non-transitory computer-readable medium described herein may further include operations, features, means, or instructions for indicating, in the LCP configuration, a threshold TBS for communications on the sidelink communication link or the second communication link.

Some examples of the method, apparatuses, and non-transitory computer-readable medium described herein may further include operations, features, means, or instructions for receiving, over the relay communication link, a first ID indicating the identity of the second device and a second ID indicating the identity of the first device, the transmitting the indication of the one or more LCP restrictions based on receiving the first ID and the second ID.

Some examples of the method, apparatuses, and non-transitory computer-readable medium described herein may further include operations, features, means, or instructions for receiving, over the relay communication link, one or more first LCP restrictions configured for the second device and one or more second LCP restrictions configured for the first device, the one or more LCP restrictions based on the one or more first LCP restrictions and the one or more second LCP restrictions.

A method of wireless communication at a relay UE is described. The method may include establishing a communication link with a base station and a remote UE, the communication link including a sidelink communication link between the remote UE and the relay UE and a relay communication link between the relay UE and the base station. The method may further include receiving, over the relay communication link, an indication of one or more LCP restrictions corresponding to the communication link, the one or more LCP restrictions based on an identity of the remote UE. The method may also include transmitting, over the sidelink communication link, the indication of the one or more LCP restrictions and communicating with the remote UE and the base station over the communication link based on the one or more LCP restrictions.

An apparatus for wireless communication at a relay UE is described. The apparatus may include a processor and memory coupled to the processor. The processor and memory may be configured to establish a communication link with a base station and a remote UE, the communication link including a sidelink communication link between the remote UE and the relay UE and a relay communication link between the relay UE and the base station. The processor and memory may further be configured to receive, over the relay communication link, an indication of one or more LCP restrictions corresponding to the communication link, the one or more LCP restrictions based on an identity of the remote UE. The processor and memory may also be configured to transmit, over the sidelink communication link, the indication of the one or more LCP restrictions and communicate with the remote UE and the base station over the communication link based on the one or more LCP restrictions.

Another apparatus for wireless communication at a relay UE is described. The apparatus may include means for establishing a communication link with a base station and a remote UE, the communication link including a sidelink communication link between the remote UE and the relay UE and a relay communication link between the relay UE and the base station. The apparatus may further include means for receiving, over the relay communication link, an indication of one or more LCP restrictions corresponding to the communication link, the one or more LCP restrictions based on an identity of the remote UE. The apparatus may also include means for transmitting, over the sidelink communication link, the indication of the one or more LCP restrictions and communicating with the remote UE and the base station over the communication link based on the one or more LCP restrictions.

A non-transitory computer-readable medium storing code for wireless communication at a relay UE is described. The code may include instructions executable by a processor to establish a communication link with a base station and a remote UE, the communication link including a sidelink communication link between the remote UE and the relay UE and a relay communication link between the relay UE and the base station. The code may further include instructions executable by a processor to receive, over the relay communication link, an indication of one or more LCP restrictions corresponding to the communication link, the one or more LCP restrictions based on an identity of the remote UE. The code may also include instructions executable by a processor to transmit, over the sidelink communication link, the indication of the one or more LCP restrictions and communicate with the remote UE and the base station over the communication link based on the one or more LCP restrictions.

In some examples of the method, apparatuses, and non-transitory computer-readable medium described herein, receiving the indication of the one or more LCP restrictions may include operations, features, means, or instructions for receiving a configuration that differentiates an LCP for the remote UE from an LCP for the relay UE.

In some examples of the method, apparatuses, and non-transitory computer-readable medium described herein, receiving the indication of the one or more LCP restrictions further may include operations, features, means, or instructions for receiving, via the configuration, an indication that one or more LCHs associated with the relay UE may have a higher scheduling priority than one or more LCHs associated with the remote UE.

In some examples of the method, apparatuses, and non-transitory computer-readable medium described herein, receiving the indication of the one or more LCP restrictions further may include operations, features, means, or instructions for receiving, via the configuration, an indication of an offset associated with the LCP for the relay UE.

In some examples of the method, apparatuses, and non-transitory computer-readable medium described herein, communicating with the remote UE and the base station over the communication link may include operations, features, means, or instructions for determining an initial LCP for the relay UE, summing the initial LCP and the offset, where the LCP for the relay UE may be based on the sum of the initial LCP and the offset, and assigning the LCP for the relay UE to one or more communications associated with the relay UE, the one or more communications transmitted over the relay communication link.

In some examples of the method, apparatuses, and non-transitory computer-readable medium described herein, the one or more LCP restrictions apply to a set of remote UEs that includes the remote UE.

In some examples of the method, apparatuses, and non-transitory computer-readable medium described herein, receiving the indication of the one or more LCP restrictions may include operations, features, means, or instructions for receiving a configuration that restricts communications for the set of remote UEs to a subset of carriers of a system bandwidth.

In some examples of the method, apparatuses, and non-transitory computer-readable medium described herein, receiving the indication of the one or more LCP restrictions may include operations, features, means, or instructions for receiving a configuration that restricts communications for the set of remote UEs to one or more grant-based resources.

In some examples of the method, apparatuses, and non-transitory computer-readable medium described herein, receiving the indication of the one or more LCP restrictions may include operations, features, means, or instructions for receiving a configuration that associates each LCH corresponding to the remote UE with one of the communication link or a second communication link directly between the remote UE and the base station, the configuration based on a target throughput, latency, reliability, or any combination thereof, for communications on the respective communication link or second communication link.

In some examples of the method, apparatuses, and non-transitory computer-readable medium described herein, receiving the indication of the one or more LCP restrictions may include operations, features, means, or instructions for receiving a configuration that associates each LCH corresponding to the remote UE with a first range of TBSs associated with the communication link and a second range of TBSs associated with a second communication link directly between the remote UE and the base station.

In some examples of the method, apparatuses, and non-transitory computer-readable medium described herein, receiving the indication of the one or more LCP restrictions further may include operations, features, means, or instructions for receiving, via the configuration, a threshold TBS for communications on the communication link or the second communication link, the threshold TBS based on a target throughput, latency, reliability, or any combination thereof, for the respective communications on the communication link or the second communication link.

In some examples of the method, apparatuses, and non-transitory computer-readable medium described herein, establishing the communication link may include operations, features, means, or instructions for receiving, over the sidelink communication link, a first ID indicating the identity of the remote UE, identifying a second ID indicating the identity of the relay UE, and transmitting, over the relay communication link, the first ID and the second ID.

Some examples of the method, apparatuses, and non-transitory computer-readable medium described herein may further include operations, features, means, or instructions for receiving, over the sidelink communication link, one or more first LCP restrictions configured for the remote UE, identifying one or more second LCP restrictions configured for the relay UE, and transmitting, over the relay communication link, the one or more first LCP restrictions and the one or more second LCP restrictions, where the one or more LCP restrictions may be based on the one or more first LCP restrictions and the one or more second LCP restrictions.

A method of wireless communication at a remote UE is described. The method may include establishing a communication link with a base station, the communication link including a sidelink communication link between the remote UE and a relay UE and a relay communication link between the relay UE and the base station. The method may further include receiving, over the sidelink communication link, an indication of one or more LCP restrictions corresponding to the communication link, the one or more LCP restrictions based on an identity of the remote UE. The method may also include and communicating over the communication link based on the one or more LCP restrictions.

An apparatus for wireless communication at a remote UE is described. The apparatus may include a processor and memory coupled to the processor. The processor and memory may be configured to establish a communication link with a base station, the communication link including a sidelink communication link between the remote UE and a relay UE and a relay communication link between the relay UE and the base station. The processor and memory may further be configured to receive, over the sidelink communication link, an indication of one or more LCP restrictions corresponding to the communication link, the one or more LCP restrictions based on an identity of the remote UE. The processor and memory may also be configured to communicate over the communication link based on the one or more LCP restrictions.

Another apparatus for wireless communication at a remote UE is described. The apparatus may include means for establishing a communication link with a base station, the communication link including a sidelink communication link between the remote UE and a relay UE and a relay communication link between the relay UE and the base station. The apparatus may also include means for receiving, over the sidelink communication link, an indication of one or more LCP restrictions corresponding to the communication link, the one or more LCP restrictions based on an identity of the remote UE. The apparatus may also include means for communicating over the communication link based on the one or more LCP restrictions.

A non-transitory computer-readable medium storing code for wireless communication at a remote UE is described. The code may include instructions executable by a processor to establish a communication link with a base station, the communication link including a sidelink communication link between the remote UE and a relay UE and a relay communication link between the relay UE and the base station. The code may further include instructions executable by a processor to receive, over the sidelink communication link, an indication of one or more LCP restrictions corresponding to the communication link, the one or more LCP restrictions based on an identity of the remote UE. The code may also include instructions executable by a processor to communicate over the communication link based on the one or more LCP restrictions.

In some examples of the method, apparatuses, and non-transitory computer-readable medium described herein, the one or more LCP restrictions apply to a set of remote UEs that includes the remote UE.

In some examples of the method, apparatuses, and non-transitory computer-readable medium described herein, receiving the indication of the one or more LCP restrictions may include operations, features, means, or instructions for receiving a configuration that restricts communications for the set of remote UEs to a subset of carriers of a system bandwidth.

In some examples of the method, apparatuses, and non-transitory computer-readable medium described herein, receiving the indication of the one or more LCP restrictions may include operations, features, means, or instructions for receiving a configuration that restricts communications for the set of remote UEs to one or more grant-based resources.

Some examples of the method, apparatuses, and non-transitory computer-readable medium described herein may further include operations, features, means, or instructions for establishing a second communication link with the base station, where the remote UE may be located within a coverage area of the base station and the second communication link may be a direct communication link between the remote UE and the base station.

In some examples of the method, apparatuses, and non-transitory computer-readable medium described herein, receiving the indication of the one or more LCP restrictions may include operations, features, means, or instructions for receiving a configuration that associates each LCH corresponding to the remote UE with one of the communication link or the second communication link, the configuration based on a target throughput, latency, reliability, or any combination thereof, for communications on the respective communication link or second communication link.

In some examples of the method, apparatuses, and non-transitory computer-readable medium described herein, receiving the indication of the one or more LCP restrictions may include operations, features, means, or instructions for receiving a configuration that associates each LCH corresponding to the remote UE with a first range of TBSs associated with the communication link and a second range of TBSs associated with the second communication link.

In some examples of the method, apparatuses, and non-transitory computer-readable medium described herein, receiving the indication of the one or more LCP restrictions further may include operations, features, means, or instructions for receiving, via the configuration, a threshold TBS for communications on the communication link or the second communication link, the threshold TBS based on a target throughput, latency, reliability, or any combination thereof, for the respective communications on the communication link or the second communication link.

In some examples of the method, apparatuses, and non-transitory computer-readable medium described herein, establishing the communication link may include operations, features, means, or instructions for transmitting, over the sidelink communication link, an ID indicating the identity of the remote UE.

Some examples of the method, apparatuses, and non-transitory computer-readable medium described herein may further include operations, features, means, or instructions for transmitting, over the sidelink communication link, one or more first LCP restrictions configured for the remote UE, where the one or more LCP restrictions may be based on the one or more first LCP restrictions.

A method of wireless communication at a base station is described. The method may include establishing a communication link with a remote UE, the communication link including a sidelink communication link between the remote UE and a relay UE and a relay communication link between the relay UE and the base station. The method may further include determining an identity of the remote UE based on establishing the communication link and determining, based on the identity of the remote UE, one or more LCP restrictions corresponding to the communication link. The method may also include transmitting, over the relay communication link, an indication of the one or more LCP restrictions and communicating with the relay UE and the remote UE over the communication link based on the one or more LCP restrictions.

An apparatus for wireless communication at a base station is described. The apparatus may include a processor and memory coupled to the processor. The processor and memory may be configured to establish a communication link with a remote UE, the communication link including a sidelink communication link between the remote UE and a relay UE and a relay communication link between the relay UE and the base station. The processor and memory may further be configured to determine an identity of the remote UE based on establishing the communication link and determine, based on the identity of the remote UE, one or more LCP restrictions corresponding to the communication link. The processor and memory may also be configured to transmit, over the relay communication link, an indication of the one or more LCP restrictions and communicate with the relay UE and the remote UE over the communication link based on the one or more LCP restrictions.

Another apparatus for wireless communication at a base station is described. The apparatus may include means for establishing a communication link with a remote UE, the communication link including a sidelink communication link between the remote UE and a relay UE and a relay communication link between the relay UE and the base station. The apparatus may further include means for determining an identity of the remote UE based on establishing the communication link and determining, based on the identity of the remote UE, one or more LCP restrictions corresponding to the communication link. The apparatus may also include means for transmitting, over the relay communication link, an indication of the one or more LCP restrictions and communicating with the relay UE and the remote UE over the communication link based on the one or more LCP restrictions.

A non-transitory computer-readable medium storing code for wireless communication at a base station is described. The code may include instructions executable by a processor to establish a communication link with a remote UE, the communication link including a sidelink communication link between the remote UE and a relay UE and a relay communication link between the relay UE and the base station. The code may further include instructions executable by a processor to determine an identity of the remote UE based on establishing the communication link and determine, based on the identity of the remote UE, one or more LCP restrictions corresponding to the communication link. The code may also include instructions executable by a processor to transmit, over the relay communication link, an indication of the one or more LCP restrictions and communicate with the relay UE and the remote UE over the communication link based on the one or more LCP restrictions.

In some examples of the method, apparatuses, and non-transitory computer-readable medium described herein, determining the one or more LCP restrictions may include operations, features, means, or instructions for determining an LCP configuration that differentiates an LCP for the remote UE from an LCP for the relay UE.

In some examples of the method, apparatuses, and non-transitory computer-readable medium described herein, determining the one or more LCP restrictions further may include operations, features, means, or instructions for indicating, in the configuration, that one or more LCHs associated with the relay UE may have a higher scheduling priority than one or more LCHs associated with the remote UE.

In some examples of the method, apparatuses, and non-transitory computer-readable medium described herein, determining the one or more LCP restrictions further may include operations, features, means, or instructions for indicating, in the configuration, an offset associated with the LCP for the relay UE, where one or more communications associated with the relay UE and communicated over the relay communication link may be based on the offset.

In some examples of the method, apparatuses, and non-transitory computer-readable medium described herein, determining the one or more LCP restrictions may include operations, features, means, or instructions for determining that the one or more LCP restrictions apply to a set of remote UEs that includes the remote UE.

In some examples of the method, apparatuses, and non-transitory computer-readable medium described herein, determining the one or more LCP restrictions further may include operations, features, means, or instructions for determining an LCP configuration that restricts communications for the set of remote UEs to a subset of carriers of a system bandwidth.

In some examples of the method, apparatuses, and non-transitory computer-readable medium described herein, determining the one or more LCP restrictions further may include operations, features, means, or instructions for determining an LCP configuration that restricts communications for the set of remote UEs to one or more grant-based resources.

Some examples of the method, apparatuses, and non-transitory computer-readable medium described herein may further include operations, features, means, or instructions for establishing a second communication link with the remote UE, where the remote UE may be located within a coverage area of the base station and the second communication link may be a direct communication link between the remote UE and the base station.

In some examples of the method, apparatuses, and non-transitory computer-readable medium described herein, determining the one or more LCP restrictions may include operations, features, means, or instructions for determining an LCP configuration that associates each LCH corresponding to the remote UE with one of the communication link or the second communication link, the configuration based on a target throughput, latency, reliability, or any combination thereof, for communications on the respective communication link or second communication link.

In some examples of the method, apparatuses, and non-transitory computer-readable medium described herein, determining the one or more LCP restrictions may include operations, features, means, or instructions for determining an LCP configuration that associates each LCH corresponding to the remote UE with a first range of TBSs associated with the communication link and a second range of TBSs associated with the second communication link.

In some examples of the method, apparatuses, and non-transitory computer-readable medium described herein, determining the one or more LCP restrictions may include operations, features, means, or instructions for indicating, in the configuration, a threshold TBS for communications on the communication link or the second communication link, the threshold TBS based on a target throughput, latency, reliability, or any combination thereof, for the respective communications on the communication link or the second communication link.

In some examples of the method, apparatuses, and non-transitory computer-readable medium described herein, establishing the communication link may include operations, features, means, or instructions for receiving, over the relay communication link, a first ID indicating the identity of the remote UE and a second ID indicating the identity of the relay UE.

Some examples of the method, apparatuses, and non-transitory computer-readable medium described herein may further include operations, features, means, or instructions for receiving, over the relay communication link, one or more first LCP restrictions configured for the remote UE and one or more second LCP restrictions configured for the relay UE, and determining the one or more LCP restrictions based on the one or more first LCP restrictions and the one or more second LCP restrictions.

DETAILED DESCRIPTION

Figure 1:
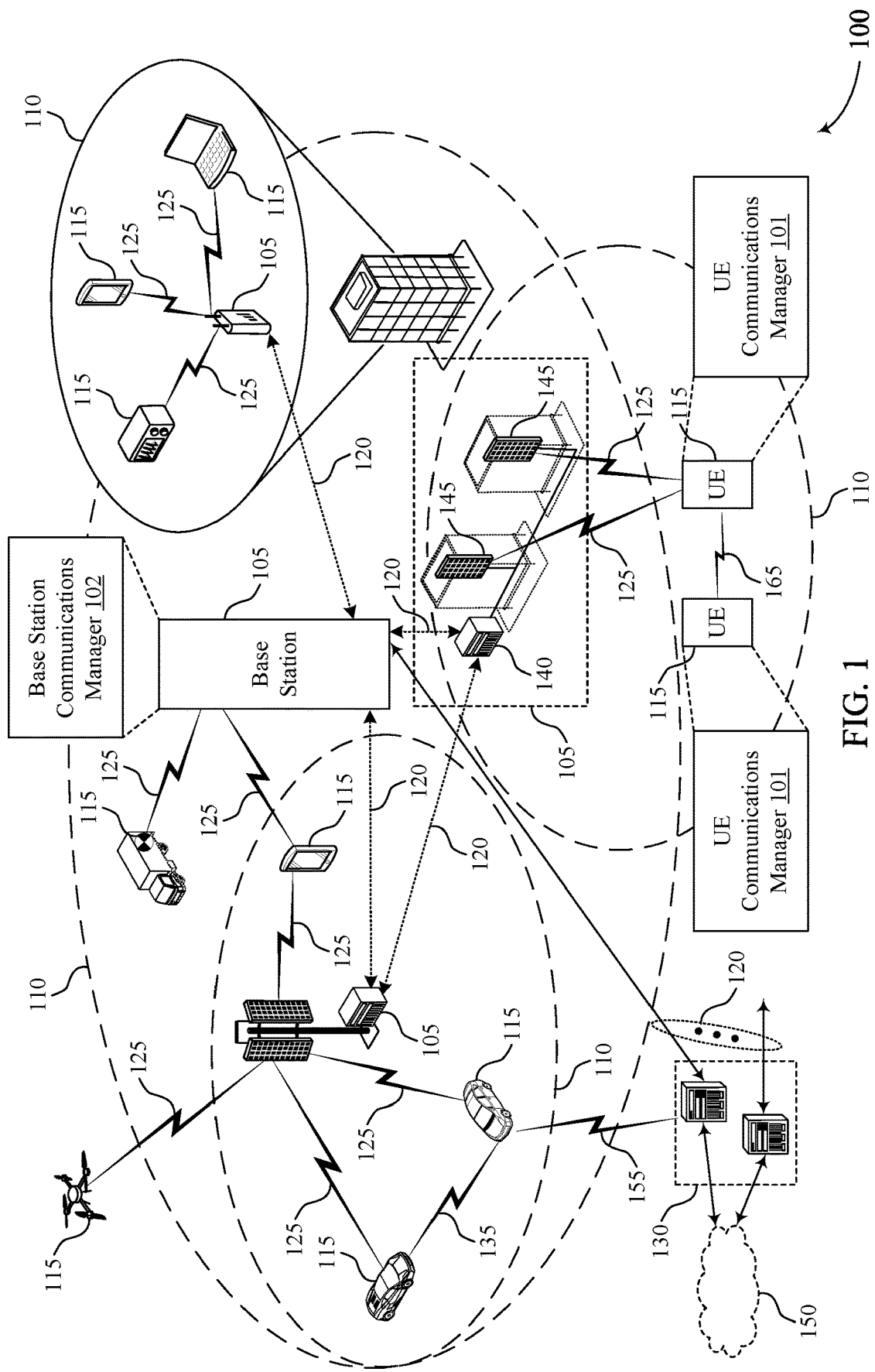
FIG. 1 illustrates an example of a wireless communications system that supports channel restrictions for relayed sidelink communications in accordance with one or more aspects of the present disclosure.

A base station may, in some cases, communicate with a remote UE (e.g., a device outside of a coverage area of the base station or in a lower-coverage area of the base station) over a communication link that includes multiple links. For example, the communication link may include a sidelink link between the remote UE and a relay UE (e.g., a device in a coverage area of the base station and that provides coverage to the remote UE) and a relay link (e.g., a direct link) between the relay UE and the base station. In the uplink, the remote UE may transmit information (e.g., one or more data or control messages) to the relay UE over the sidelink link, and the relay UE may relay or forward (e.g., transmit, retransmit) the information to the base station over the relay link. In the downlink, the base station may transmit information to the relay UE over the relay link and the relay UE may relay or forward (e.g., transmit, retransmit) the information to the remote UE over the sidelink link. The relay UE may also transmit its own information (e.g., one or more data or control messages originating at the relay UE) to the base station via the relay link (e.g., the direct link).

Some uplink transmissions to the base station originating from the remote UE, the relay UE, or both, may be subject to one or more restrictions. For example, either the remote UE or the relay UE, or both, may use one or more restrictions to determine how to multiplex information from different LCHs (e.g., communication channels associated with different types of information) when either the remote UE or relay UE receives an uplink grant scheduling resources for an uplink transmission (e.g., or when the relay UE forwards or relays information from the remote UE). Information associated with different LCHs may be assigned with different scheduling priorities (e.g., a priority for transmission to the base station), for example, such that information from higher priority LCHs may be scheduled for transmission before information from other LCHs (e.g., relatively lower priority LCHs). A higher priority LCH, for example, may be associated with higher priority or lower latency communications, or with communications from the relay UE, while a lower priority LCH may be associated with lower priority or higher latency communications, or with communications from the remote UE.

In some examples of LCH restrictions, the network may restrict an LCH from using one or more uplink grants having a duration longer than a threshold number of symbols or having resources located on carriers in which symbols are above a threshold width. In some examples, the restrictions applied to LCHs may represent or be referred to as LCP restrictions. As described herein, an LCP may refer to a logical channel priority or a logical channel prioritization. Methods or restriction configurations for configuring LCP restrictions for a communication link (e.g., including the sidelink link between the remote UE and the relay UE and the relay link between the relay UE and the base station) may support decreased communication delays and increased reliability.

After or as part of establishing the communication link between the remote UE, the relay UE, and the base station, the base station may configure one or more LCP restrictions for the communication link. For example, the base station may configure LCP restrictions to differentiate information originating from the remote UE and information originating from the relay UE, to restrict the remote UE to one or more communication resources (e.g., time and frequency resources), or to restrict link types (e.g., a type of channel or communications associated with the link) or TBS that may be used for LCHs at the remote UE or the relay UE. The base station may determine an identity of the remote UE and may, for example, configure the one or more LCP restrictions based on the identity of the remote UE. The base station may additionally or alternatively configure the one or more LCP restrictions based on LCP restrictions already configured at one or both of the remote UE and the relay UE (e.g., nominal or initial LCP restrictions configured by the network).

The base station may transmit an indication of the one or more LCP restrictions to the relay UE (e.g., over the relay link), and the relay UE may transmit (e.g., forward or relay) an indication of the one or more LCP restrictions to the remote UE (e.g., over the sidelink link). The base station, the remote UE, and the relay UE may communicate with each other over the communication link (e.g., the sidelink link and the relay link) based on the one or more LCP restrictions. For example, communications originating from the relay UE may take priority over communications originating from the remote UE or may be associated with a priority offset based on the LCP restrictions. Similarly, communications from the remote UE or the relay UE may be associated with one or more communication resources, one or more communication links, or one or more TBS based on the LCP restrictions.

Aspects of the disclosure are initially described in the context of wireless communications systems. Aspects of the disclosure are further illustrated by and described with reference to an LCP restriction configuration, a process flow, apparatus diagrams, system diagrams, and flowcharts that relate to configurations for sidelink scheduling requests.

FIG. 1 illustrates an example of a wireless communications system 100 that supports channel restrictions for relayed sidelink communications in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). In some cases, a communication link 135 may be referred to as a sidelink communication link and may be used for sidelink communications between UEs 115. In some cases, a sidelink communication link as described herein may additionally or alternatively represent an example of a relay link 165, where the relay link 165 may be used to relay information (e.g., data, control information) from a first UE 115 to a second UE 115. In some cases, the relay link may additionally or alternatively be an example of a communication link 135.

One or more UEs 115 utilizing D2D or sidelink communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D or sidelink communications may utilize a one-to-many (1:M) system in which each UE 115 transmits to every other UE 115 in the group. In some examples, a base station 105 facilitates the scheduling of resources for D2D or sidelink communications. In other cases, D2D or sidelink communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both. In some cases, V2V communications may implement or use a PC5 interface.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a base station 105 may communicate with a remote UE 115 over an indirect communication link. For example, the remote UE 115 and the base station 105 may communicate via a sidelink link between the remote UE 115 and a relay UE 115 and a relay link (e.g., direct link) between the relay UE 115 and the base station 105. In the uplink, the remote UE 115 may transmit information (e.g., one or more messages) to the relay UE 115 over the sidelink link, and the relay UE 115 may relay or forward (e.g., transmit) the information to the base station 105 over the relay link. In the downlink, the base station 105 may transmit information to the relay UE 115 over the relay link and the relay UE 115 may relay or forward (e.g., transmit) the information to the remote UE 115 over the sidelink link.

In some cases, a relay UE 115 may support similar communication links with multiple remote UEs 115 for communications with a base station 105. A communication link between a remote UE 115, a relay UE 115, and a base station may represent a Layer 2 relay (e.g., a UE-to-network relay). The remote UE 115 may discover the relay UE prior to establishment of the communication link, for example, using a discover procedure based on one or more relay service codes that may be configured by the network or provisioned by a policy control function (PCF) to the remote UE 115 during registration with the base station 105 (e.g., when establishing a Uu link). A remote UE 115 may discover the relay UE 115 by monitoring for the one or more corresponding relay service codes. During link establishment, the relay UE 115 may establish a dedicated protocol data unit (PDU) session associated with the one or more relay service codes.

In some cases, the network may maintain a convergence protocol over the communication link between the base station 105, the relay UE 115, and the remote UE 115, and may restrict convergence protocol between the relay UE 115 and the remote UE 115. Network access stratum and non-access stratum connections may also be maintained over the communication link. In some case, a radio access network (RAN) may control the sidelink link (e.g., PC5 interface) using network RRC signaling.

Some uplink transmissions to the base station 105 from the remote UE 115, the relay UE 115, or both, may be subject to one or more restrictions. Methods or restriction configurations for configuring LCP restrictions for communications over a communication link including the sidelink link between the remote UE 115 and the relay UE 115 and the relay link between the relay UE 115 and the base station 105 may support decreased communication delays and increased reliability. The base station 105 may accordingly configure one or more LCP restrictions for the communication link. For example, the base station 105 may configure LCP restrictions to differentiate information originating from the remote UE 115 and the relay UE 115, to restrict the remote UE 115 to one or more resources, or to restrict link types or TBS that may be used on LCHs at the remote UE 115 or the relay UE 115. The base station 105 may determine an identity of the remote UE 115 (e.g., as part of establishing the communication link) and may configure the one or more LCP restrictions based on the identity of the remote UE 115. The base station 105 may further configure the one or more LCP restrictions based on LCP restrictions configured at one or both of the remote UE 115 and the relay UE 115 (e.g., nominal or initial LCP restrictions configured by the network).

The base station 105 may transmit an indication of the one or more LCP restrictions to the relay UE 115 (e.g., over the relay link), and the relay UE 115 may transmit (e.g., forward or relay) an indication of the one or more LCP restrictions to the remote UE 115 (e.g., over the sidelink link). The base station 105, the remote UE 115, and the relay UE 115 may communicate with each other over the communication link (e.g., the sidelink link and the relay link) based on the one or more LCP restrictions. For example, communications originating from the relay UE 115 may take priority over communications originating from the remote UE 115 or may be associated with a priority offset based on the LCP restrictions. Similarly, communications from the remote UE 115 or the relay UE 115 may be associated with one or more resources, one or more communications links, or one or more TBS based on the LCP restrictions.

One or more of the operations performed by the base station 105 may be performed by a base station communications manager 102, which may be an example of a communications manager 915, 1015, 1105, or 1210 as described with reference to FIGS. 9 through 12. In some cases, a transceiver may perform receiving or transmitting operations and a scheduler may determine one or more LCP restrictions.

One or more of the operations performed by the remote UE 115 or the relay UE 115 may be performed by a UE communications manager 101, which may be an example of a communications manager 515, 615, 705, or 810 as described with reference to FIGS. 5 through 8. In some cases, a transceiver may perform the receiving or transmitting operations and a processor may identify one or more aspects of an LCP restriction configuration and configure one or more communications according to the LCP restriction configuration.

Figure 2:
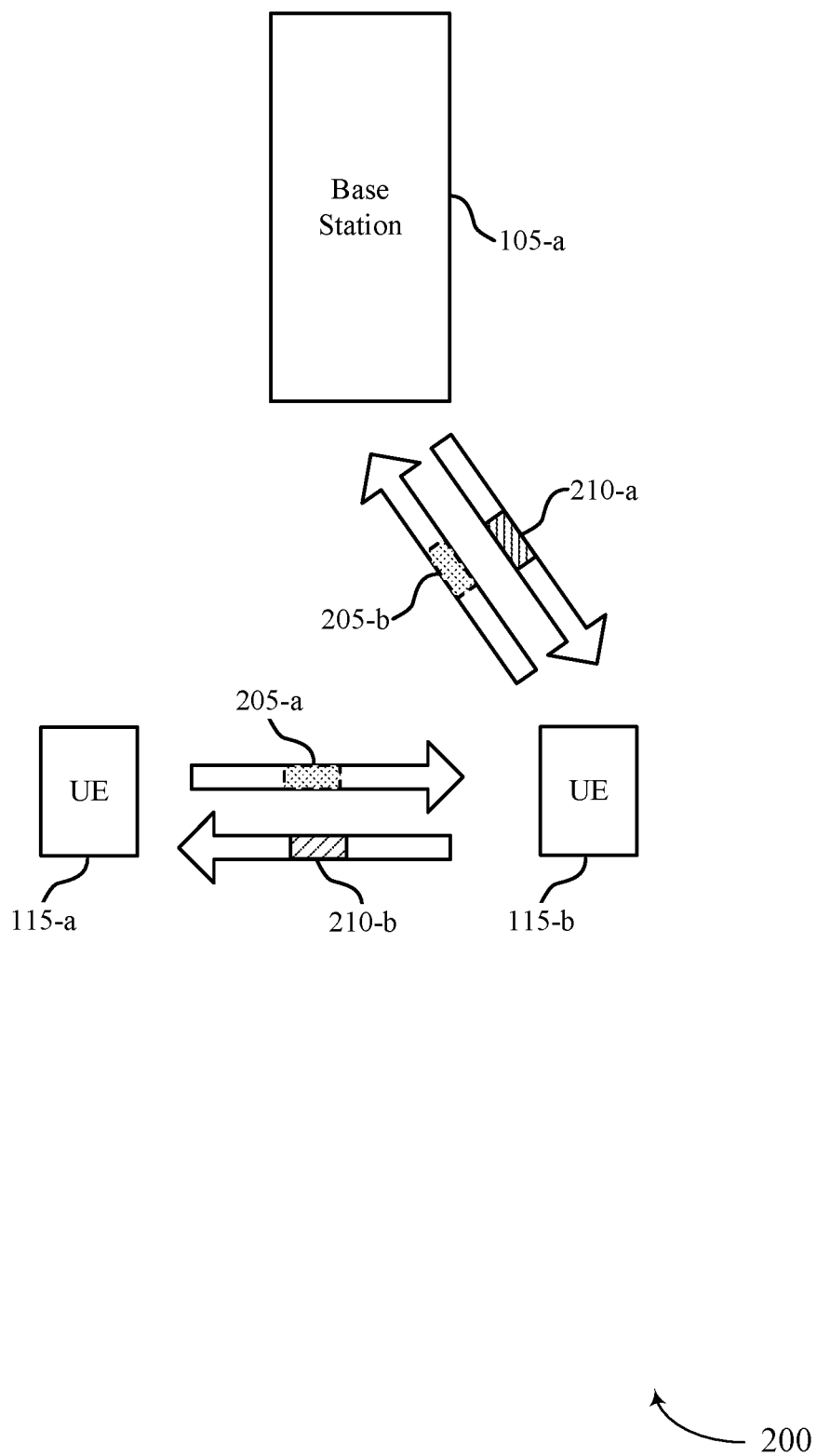
FIG. 2 illustrates an example of a wireless communications system that supports channel restrictions for relayed sidelink communications in accordance with one or more aspects of the present disclosure.

FIG. 2 illustrates an example of a wireless communications system 200 that supports channel restrictions for relayed sidelink communications in accordance with one or more aspects of the present disclosure. In some examples, wireless communications system 200 may implement aspects of wireless communications system 100. For example, wireless communications system 200 may include a base station 105-*a*, a UE 115-*b*, and a UE 115-*a*, which may be examples of a base station 105 and UEs 115 described with reference to FIG. 1. Base station 105-*a* may communicate with UE 115-*b* over a direct communication link and may communicate with UE 115-*a* over an indirect communication link, where UE 115-*a* may represent a remote UE 115 and UE 115-*b* may represent a relay UE 115.

For example, UE 115-*a* and base station 105-*a* may communicate via a sidelink link between UEs 115-*b* and 115-*a* and a relay link (e.g., direct link or Uu link) between UE 115-*b* and base station 105-*a*. In the uplink, UE 115-*a* may transmit information (e.g., one or more messages) to UE 115-*b* over the sidelink link, and UE 115-*b* may relay or forward the information to base station 105-*a* over the relay link. In the downlink, base station 105-*a* may transmit information to UE 115-*b* over the relay link and UE 115-*b* may relay or forward the information to UE 115-*a* over the sidelink link.

In some cases, UE 115-*a* may be located outside of a coverage area of base station 105-*a* and may communicate with base station 105-*a* via the communication link with UE 115-*b* (e.g., the indirect communication link). In some other cases, UE 115-*a* may be located within a coverage area of base station 105-*a* and may establish a direct communication link (e.g., a Uu link) with base station 105-*a* (e.g., in addition to the indirect communication link). In such cases, UE 115-*a* may communicate with base station 105-*a* via the communication link with UE 115-*b*, via the direct communication link, or both. UE 115-*a* may use both links to increase communications throughput and robustness. For example, smaller-sized uplink control information (UCI) may be transmitted to base station 105-*a* directly over the direct link, but larger UCI packets may be transmitted via UE 115-*b* (e.g., if links through UE 115-*b* have higher throughput).

For uplink transmissions from UE 115-*a* to base station 105-*a* over the indirect communication link, base station 105-*a* may dynamically schedule uplink resources on the sidelink link between UEs 115-*b* and 115-*a*, may preconfigure one or more uplink grants or resources for the sidelink link, or may omit scheduling or configuring of any uplink resources (e.g., the UEs 115-*b* and 115-*a* may schedule uplink resources for the sidelink link). Uplink transmissions on the relay link between UE 115-*b* and base station 105-*a* may include a MAC instance that is shared between UE 115-*b* and any remote UEs 115 (e.g., including UE 115-*a*) communicating with base station 105-*a* via UE 115-*b* or may include separate MAC instances for different remote UEs 115 (e.g., where a MAC instance may be configured for UE 115-*a*).

Remote UEs 115 (e.g., including UE 115-*a*) communicating with base station 105-*a* via UE 115-*b* may be organized into one or more groups or sets of UEs 115. In a first example, remote UEs 115 communicating with base station 105-*a* via UE 115-*b* may be organized into multiple groups, and UE 115-*b* may be included in one or more of the multiple groups. UEs 115 within each group may share common instances of MAC and RLC procedures (e.g., their RLC PDUs may be multiplexed in a same MAC PDU). Communication traffic for UEs 115 in different groups may be restricted from mixing (e.g., multiplexing) and may be scheduled separately. In some cases, all UEs 115 (e.g., including UEs 115-*a* and 115-*b*) may be included in a single group, and in some cases, UE 115-*b* may be included in a group by itself, and all remote UEs 115 (e.g., including UE 115-*a*) may be included in another group. In a second example, remote UEs 115 communicating with base station 105-*a* via UE 115-*b* may be organized into groups of one UE 115 each. UE 115-*b* may also be included in one of these groups (e.g., may be included in its own group).

Data for uplink transmissions may arrive at a buffer of UE 115-*a*, which may trigger a buffer status report (BSR) if the buffer is empty when the data arrives, or if the priority of the data is higher than that of other data on other logical channels. In cases where uplink transmissions on the relay link or the sidelink link are dynamically scheduled by base station 105-*a*, the BSR may represent or include a request for sidelink or other resources from base station 105-*a* for transmission of the data. If sidelink resources are available for transmission of the BSR, or if sidelink resources (e.g., physical sidelink control channel (PSCCH) resources) are preconfigured for a BSR, UE 115-*a* may transmit the BSR to UE 115-*b* over at least a portion of the available sidelink resources. UE 115-*b* may forward or relay the BSR to base station 105-*a*, and base station 105-*a* may configure or grant uplink resources (e.g., resources on the sidelink link and/or relay link) for transmission of the data based on the received BSR. In some cases, a method for transmitting the BSR from UE 115-*b* to base station 105-*a* may be based on a method for transmitting the BSR from UE 115-*a* to base station 105-*a*.

Some uplink transmissions (e.g., a BSR, uplink data, control information) to base station 105-*a* from UE 115-*a*, UE 115-*b*, or both, may be subject to one or more restrictions. For example, either UE 115-*a* or 115-*b* may use one or more restrictions to determine how to multiplex information from different LCHs when either UE 115 receives an uplink grant (e.g., or when UE 115-*b* forwards or relays information from UE 115-*a*). Information from different LCHs may be assigned with different scheduling priorities, for example, such that information from higher priority LCHs may be scheduled for transmission before information from other LCHs. In some examples of LCH restrictions, the network may restrict an LCH from using one or more uplink grants that may be associated with one or more properties. For example, an LCH associated with URLLC communications may be restricted from an uplink grant having a duration longer than a threshold number of symbols or having resources located on carriers with numerologies above a threshold width. In some examples, the restrictions applied to LCHs may represent or be referred to as LCP restrictions.

If LCP restrictions are unavailable or unassigned for transmissions over a communication link including a remote UE 115 (e.g., UE 115-*a*) and a relay UE 115 (e.g., UE 115-*b*), uplink transmissions from UE 115-*a*, UE 115-*b*, or both, may be delayed or may achieve a lower quality of service (QoS). Thus, methods or restriction configurations for communications over such a communication link, such as the sidelink link between UEs 115-*b* and 115-*a* and the relay link between UE 115-*b* and base station 105-*a*, may support decreased communication delays and increased QoS.

The present disclosure provides methods and restriction configurations for communications over a communication link including a remote UE 115, a relay UE 115, and a base station 105 (e.g., respectively UE 115-*a*, UE 115-*b*, and base station 105-*a*). After or as part of establishing the communication link between UE 115-*a*, UE 115-*b*, and base station 105-*a*, base station 105-*a* may configure one or more LCP restrictions for the communication link. For example, base station 105-*a* may configure LCP restrictions to differentiate information originating from UE 115-*a* and UE 115-*b*, to restrict UE 115-*a* (e.g., or restrict a group of remote UEs 115 including UE 115-*a*) to one or more resources, or to restrict link types or TBS that may be used on LCHs at UE 115-*a* or UE 115-*b*.

Base station 105-*a* may determine an identity of UE 115-*a* (e.g., as part of establishing the communication link), and may configure the one or more LCP restrictions based on the identity of UE 115-*a*. In some cases, base station 105-*a* may determine an identity of UE 115-*b* (e.g., as part of establishing the communication link), and may configure the one or more LCP restrictions based on the identity of UE 115-*b*. For example, UE 115-*a* may transmit an indication of an ID associated with UE 115-*a* in an uplink message 205-*a* to UE 115-*b* (e.g., when establishing the communication link). UE 115-*b* may transmit the ID of UE 115-*a* and/or an ID associated with UE 115-*b* in an uplink message 205-*b* to base station 105-*a*.

In some cases, base station 105-*a* may further configure the one or more LCP restrictions based on LCP restrictions configured at one or both of UE 115-*a* and UE 115-*b* (e.g., nominal or initial LCP restrictions configured by the network). For example, UE 115-*a* may transmit an indication of one or more LCP restrictions associated with UE 115-*a* in an uplink message 205-*a* to UE 115-*b*. UE 115-*b* may transmit the LCP restrictions of UE 115-*a* and/or one or more LCP restrictions associated with UE 115-*b* in an uplink message 205-*b* to base station 105-*a*.

In some cases (e.g., when all remote UEs 115 and UE 115-*b* may share a same group), base station 105-*a* may configure LCP restrictions such that information from UE 115-*b* takes scheduling priority over information from UE 115-*a* (e.g., and over information from other remote UEs 115). For example, an LCH of UE 115-*b* and an LCH of UE 115-*a* may have a same nominal priority value (e.g., configured by the network), and base station 105-*a* may schedule UE 115-*b* first based on the LCP restriction (e.g., the higher priority associated with UE 115-*b*). In some cases, base station 105-*a* may configure an offset priority value for information originating from UE 115-*b*, such that a priority value of such information may be equal to an original (e.g., nominal) priority value configured by the network plus the offset priority value.

In a first example, UE 115-*b* may be configured with a nominal priority value of '1,' UE 115-*a* may be configured with a nominal priority value of '2,' and the LCP restrictions may indicate an offset priority value of '2.' As such, the priority value of information originating from UE 115-*b* may represent the nominal priority value plus the offset, or a value of '3.' In this example, information from UE 115-*b* may have a higher priority value than information from UE 115-*a* and base station 105-*a* may schedule UE 115-*b* first based on the LCP restriction (e.g., the offset) and the nominal priority values. In a second example, UE 115-*b* may be configured with a nominal priority value of '1,' UE 115-*a* may be configured with a nominal priority value of '2,' and the LCP restrictions may indicate an offset priority value of '1.' As such, the priority value of information originating from UE 115-*b* may represent the nominal priority value plus the offset, or a value of '2.' In this example, information from UE 115-*b* may have a same priority value as information from UE 115-*a* and base station 105-*a* may share scheduling resources equally between LCHs from UE 115-*b* and UE 115-*a* based on the LCP restriction (e.g., offset) and the nominal priority values.

LCP restrictions may additionally or alternatively restrict communications to or from UE 115-*a* (e.g., or a group of remote UEs 115 including UE 115-*a*) to a subset of carriers on the system bandwidth or to resources associated with dynamic grants. For example, use of a configured grant (e.g., a type-1 configured grant) may be prohibited to UE 115-*a* (e.g., or to the group of remote UEs 115) in order to avoid an increase in contention over resources. In some cases, UE 115-*a* may be located within a coverage area of, and may establish a direct link with, base station 105-*a*. In such cases, the LCP restrictions may configure associations or restrictions between LCHs and different link types (e.g., sidelink or direct link types), or may configure a range of TBS for different link types and associated LCHs. Such restrictions are further described herein with reference to FIG. 3.

Base station 105-*a* may transmit an indication 210-*a* of the one or more LCP restrictions to UE 115-*b* (e.g., over the relay link), and UE 115-*b* may transmit (e.g., forward or relay) an indication 210-*b* of the one or more LCP restrictions to UE 115-*a* (e.g., over the sidelink link). Base station 105-*a*, UE 115-*a*, and UE 115-*b* may communicate with each other over the communication link (e.g., the sidelink link and the relay link) based on the one or more LCP restrictions. For example, as described herein, communications originating from UE 115-*b* may take priority over communications originating from UE 115-*a* or may be associated with a priority offset based on the LCP restrictions. Similarly, communications from UE 115-*a* may be associated with one or more resources, one or more communications links, or one or more TBS based on the LCP restrictions.

In one or more aspects, the described techniques may support improvements in wireless communications. For example, the one or more LCP restrictions for UEs 115-*a* and 115-*b* (e.g., the LCP restriction(s) associated with the communication link) may support decreased communication delays and increased reliability.

Figure 3:
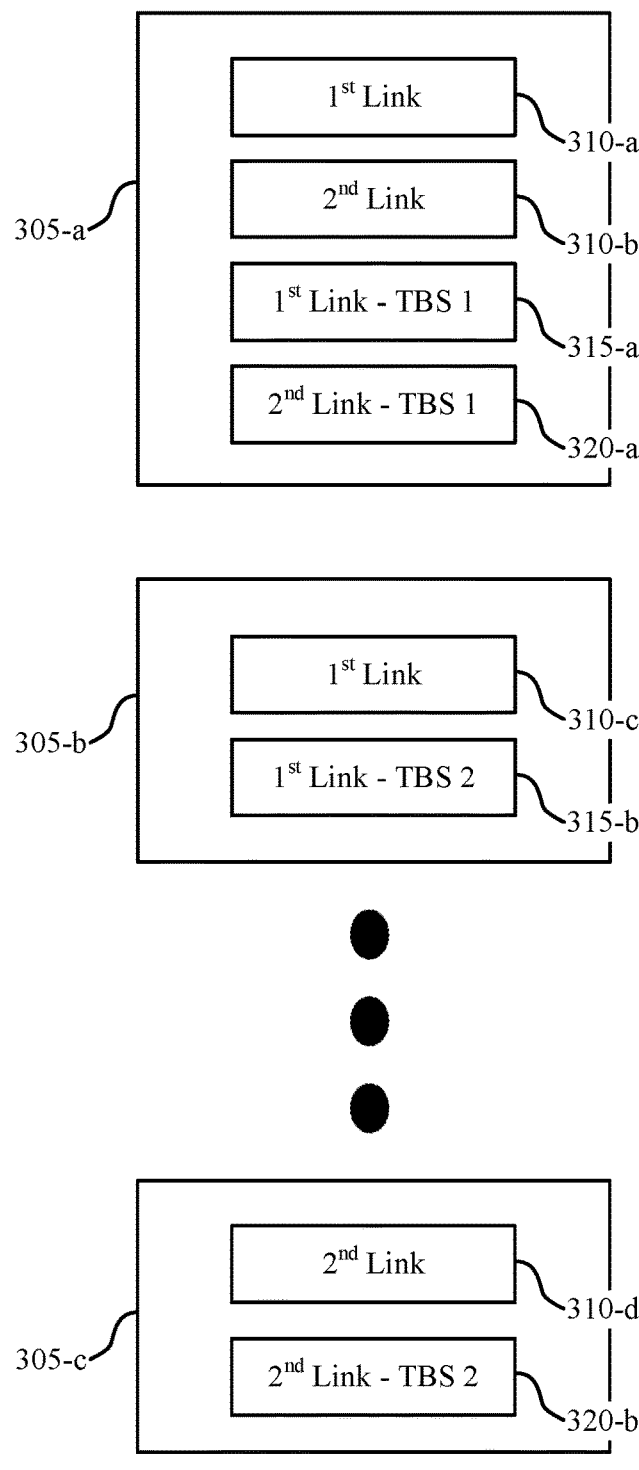
FIG. 3 illustrates an example of an LCP restriction configuration that supports channel restrictions for relayed sidelink communications in accordance with one or more aspects of the present disclosure.

FIG. 3 illustrates an example of an LCP restriction configuration 300 that supports channel restrictions for relayed sidelink communications in accordance with one or more aspects of the present disclosure. In some examples, LCP restriction configuration 300 may implement or be implemented by aspects of wireless communications systems 100 or 200. For example, a base station 105 may configure LCP restriction configuration 300 for communications with a remote UE 115, via a first communication link 310 that may include a relay UE 115 to relay the communications to and from the remote UE 115. The base station 105 may transmit an indication of the LCP restriction configuration to the relay UE 115, and the relay UE 115 may forward or transmit the indication to the remote UE 115, as described with reference to FIG. 2. The base station 105 and UEs 115 may be examples of a base station 105 and UEs 115 described herein with reference to FIGS. 1 and 2.

As described with reference to FIG. 2, the base station 105 and the remote UE 115 may, in some cases, communicate over a second, direct communication link 310 between the remote UE 115 and the base station 105 (e.g., if the remote UE 115 is located in a coverage area of the base station 105). The base station 105 may configure LCP restrictions (e.g., LCP restriction configuration 300) for the remote UE 115, such that the LCP restrictions may specify associations between LCHs 305 of the remote UE 115 and one or more communication links 310, and/or may specify TBS thresholds 315 or 320 on the communication links 310. It is to be understood that while the LCP restrictions are described with respect to the remote UE 115 that such LCP restrictions may also be configured for or apply to the relay UE 115.

In one example, the base station 105 may configure LCP restrictions for the remote UE 115 for a first LCH 305-*a*, a second LCH 305-*b*, and so forth until an nth LCH 305-*c* of the remote UE 115. The base station 105 may associate each LCH 305 with one or more communication links 310. For example, the base station 105 may specify, for each LCH 305, whether an uplink grant on a direct communication link 310 (e.g., second communication link 310) may be used. For example, LCHs 305 used by eMBB applications may be associated with a higher throughput and the base station 105 may restrict such LCHs 305 from using the direct communication link 310. Additionally or alternatively, LCHs 305 with lower latency constraints may be restricted from using the first communication link (e.g., including at the relay UE 115). In one example, the base station 105 may specify that the direct communication link 310 may be used on LCHs 305-*a* and 305-*c* and/or may restrict the direct communication link 310 on LCH 305-*b*. In this example, the base station 105 may further specify that a first communication link 310 (e.g., a relay link) may be used on LCHs 305-*a* and 305-*b* and/or may restrict the first communication link 310 on LCH 305-*c*.

The base station 105 may further associate each LCH 305 with one or more TBS thresholds 315 or 320 for each supported communication link 310. In one example, a TBS threshold 315 may be associated with the first communication link 310 and a TBS threshold 320 may be associated with the second communication link 310 (e.g., direct communication link 310). In some cases, the TBS thresholds 315 or 320 may include a range of TBS that the remote UE 115 may support on the respective communication link 310. For example, the base station 105 may configure a threshold TBS (e.g., minimum TBS) for an LCH 305 that supports the first communication link 310. This configuration may avoid wasting resources on high throughput applications (e.g., eMBB), for example. The base station 105 may additionally or alternatively configure a threshold TBS (e.g., maximum TBS) for an LCH 305 that supports the second, direct communication link 310. This configuration may support high reliability and low latency applications (e.g., URLLC), for example, because smaller TBS may be associated with a lower number of retransmissions.

In one example, the base station 105 may specify a first TBS threshold 315-a for communication link 310-a on LCH 305-a and a first TBS threshold 320-a for communication link 310-b on LCH 305-a. The first TBS threshold 315-a may include a minimum TBS, while the first TBS threshold 320-a may include a maximum TBS. The base station 105 may further specify a second TBS threshold 315-b for communication link 310-c on LCH 305-b and a second TBS threshold 320-b for communication link 310-d on LCH 305-c. The second TBS threshold 315-a may include a minimum TBS, while the second TBS threshold 320-a may include a maximum TBS. In some cases, the first TBS threshold 315-a and the second TBS threshold 315-b may be different, or in some cases, the TBS thresholds 315 may be the same. Similarly, the first TBS threshold 320-a and the second TBS threshold 320-b may be different or the same.

The base station 105 may transmit an indication of LCP restriction configuration 300 to the relay UE 115 (e.g., over the relay link), and the relay UE 115 may transmit (e.g., forward or relay) an indication of LCP restriction configuration 300 to the remote UE 115 (e.g., over the sidelink link). The base station 105, the remote UE 115, and the relay UE 115 may communicate with each other over the communication link (e.g., the sidelink link and the relay link) based on LCP restriction configuration 300. For example, communications associated with different LCHs 305 of the remote UE 115 (e.g., directed to the base station 105 and/or the relay UE 115) may be associated with one or more communications links 310, or one or more TBS based on the LCP restriction configuration 300.

Figure 4:
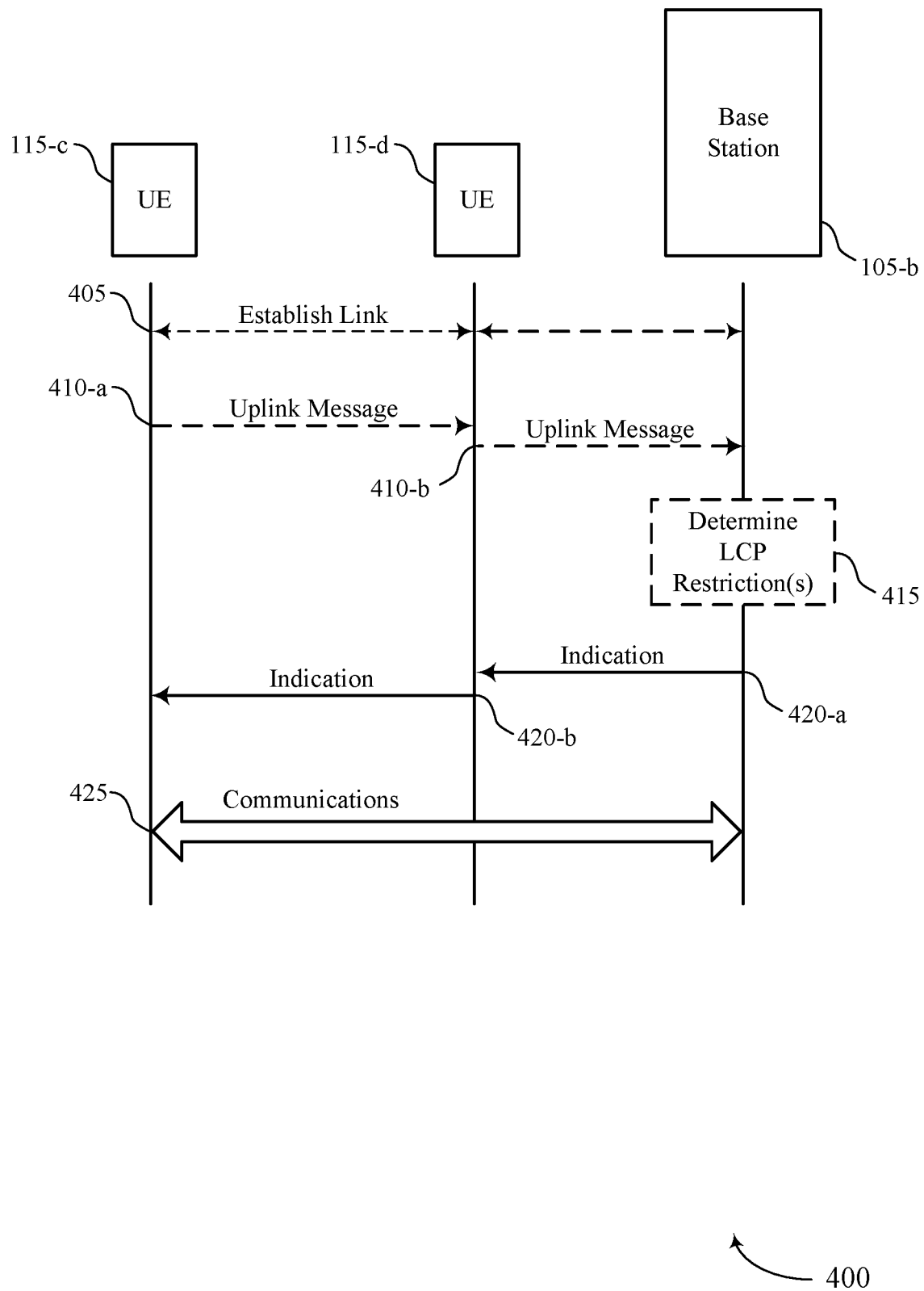
FIG. 4 illustrates an example of a process flow that supports channel restrictions for relayed sidelink communications in accordance with one or more aspects of the present disclosure.

FIG. 4 illustrates an example of a process flow 400 that supports channel restrictions for relayed sidelink communications in accordance with one or more aspects of the present disclosure. In some examples, process flow 400 may implement or be implemented by aspects of wireless communications systems 100 or 200. In some cases, process flow 400 may implement or be implemented by aspects of LCP restriction configuration 300. Process flow may be implemented by a base station 105-b, a UE 115-c, and a UE 115-d, where UE 115-c may represent a remote UE 115 and UE 115-d may represent a relay UE 115. Base station 105-b and UEs 115-c and 115-d may represent examples of a base station 105 and UEs 115 described herein with reference to FIGS. 1-3. Base station 105-b may communicate with UE 115-c via a communication link that may include UE 115-d (e.g., to relay the communications to and from UE 115-c).

In the following description of process flow 400, the operations between UE 115-c, UE 115-d, and base station 105-b may be transmitted in a different order than the order shown, or the operations performed by UE 115-c, UE 115-d, and base station 105-b may be performed in different orders or at different times. Some operations may also be left out of process flow 400, or other operations may be added to process flow 400. Although UE 115-c, UE 115-d, and base station 105-b are shown performing the operations of process flow 400, some aspects of some operations may also be performed by one or more other wireless devices. For example, UEs 115-c and 115-d may each represent a respective example of a wireless communications device, which may or may not be a UE 115.

At 405, base station 105-b, UE 115-c, and UE 115-d may establish a communication link, where the communication link may include a sidelink link between UE 115-c and UE 115-d and a relay link between UE 115-d and base station 105-b. In some cases, when establishing the communication link, UE 115-d may transmit an ID of UE 115-c (e.g., received from UE 115-c) and/or an ID of UE 115-d to base station 105-b.

At 410-a, in some cases, UE 115-c may transmit an indication of one or more LCP restrictions configured by the network (e.g., initial LCP restrictions) associated with UE 115-c in an uplink message to UE 115-d.

At 410-b, in some cases, UE 115-d may transmit the LCP restrictions of UE 115-c and/or one or more LCP restrictions configured by the network (e.g., initial LCP restrictions) associated with UE 115-d, for example, in an uplink message to base station 105-b.

At 415, base station 105-b may determine an identity of UE 115-c (e.g., based on establishing the communication link) and may determine, based on the identity of UE 115-c, one or more LCP restrictions corresponding to the communication link. Base station 105-b may also determine the one or more LCP restrictions based on the LCP restrictions configured by the network for UE 115-c and UE 115-d. For example, as described herein with reference to FIGS. 2 and 3, base station 105-b may configure one or more LCP restrictions to differentiate information originating from UE 115-c and UE 115-d, to restrict UE 115-c (e.g., or restrict a group of remote UEs 115 including UE 115-c) to one or more resources, or to restrict link types or TBS that may be used on LCHs at UE 115-c or UE 115-d.

At 420-a, base station 105-b may transmit, over the relay link and to UE 115-d, an indication of the one or more LCP restrictions. In some cases, the indication may include one or more aspects of an LCP restriction configuration as described with reference to FIG. 3.

At 420-b, UE 115-d may transmit, over the sidelink link and to UE 115-c, the indication of the one or more LCP restrictions. In some cases, this indication may include one or more aspects of an LCP restriction configuration as described with reference to FIG. 3.

At 425, base station 105-b, UE 115-c, and UE 115-d may communicate with each other over the communication link (e.g., the sidelink link and the relay link) based on the one or more LCP restrictions. For example, as described herein, communications originating from UE 115-d may take priority over communications originating from UE 115-c or may be associated with a priority offset based on the one or more LCP restrictions. Similarly, communications from UE 115-c or UE 115-d may be associated with one or more resources, one or more communications links, or one or more TBS based on the LCP restrictions.

In some cases, UE 115-c may trigger a BSR for transmission of data to base station 105-b over the communication link. For example, UE 115-c may identify or receive data in a buffer of UE 115-c and may trigger the BSR based on the identified data (e.g., based on the identified data being new data or based on a priority of the identified data).

Figure 5:
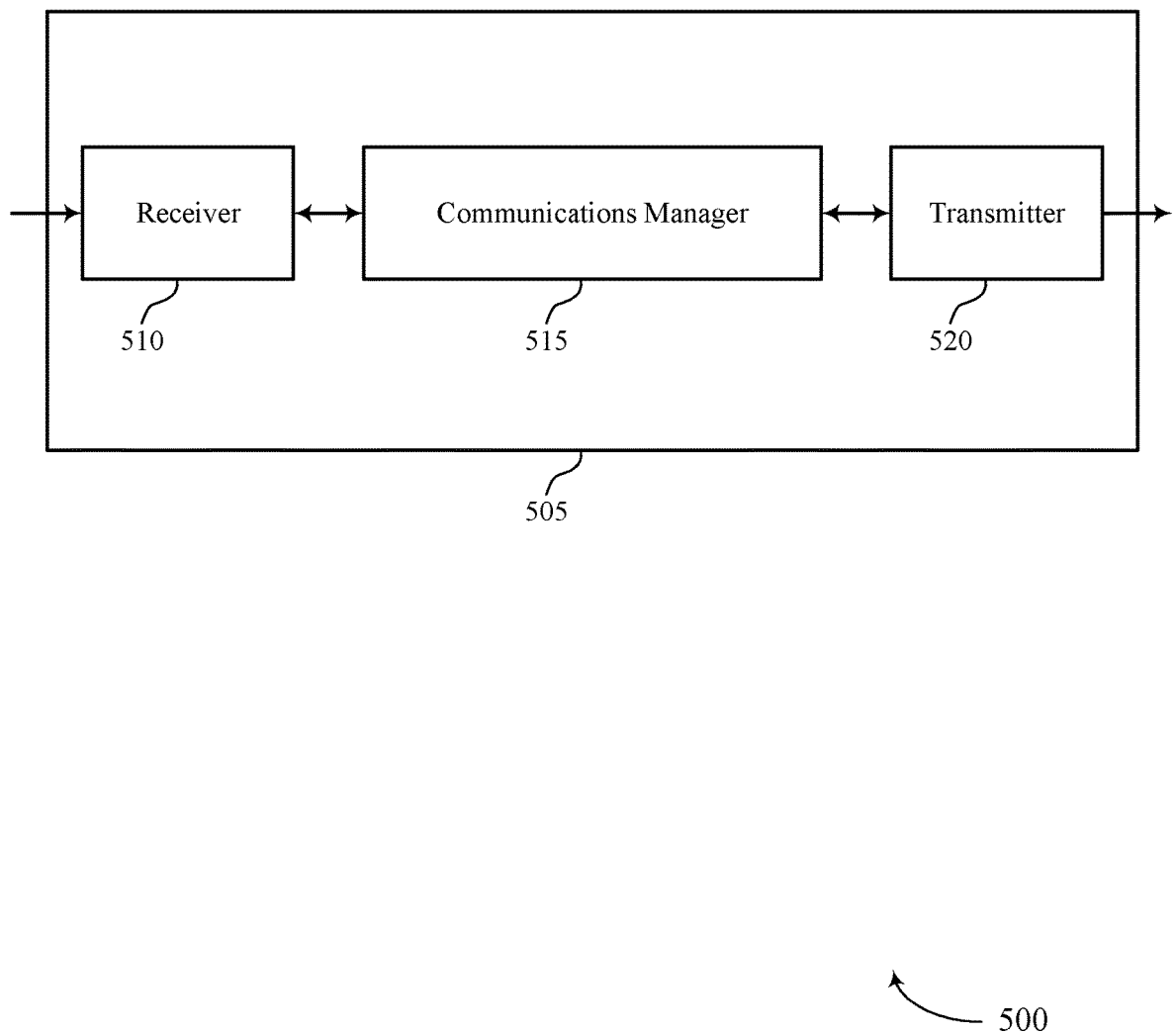
FIGS. 5 and 6 show block diagrams of devices that support channel restrictions for relayed sidelink communications in accordance with one or more aspects of the present disclosure.

FIG. 5 shows a block diagram 500 of a device 505 that supports channel restrictions for relayed sidelink communications in accordance with one or more aspects of the present disclosure. The device 505 may be an example of aspects of a UE 115 or other wireless communications device (e.g., a first device) as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel restrictions for relayed sidelink communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, over a relay communication link between the first device and a base station, an indication of one or more LCP restrictions corresponding to the relay communication link and a sidelink communication link between the first device and a second device, the one or more LCP restrictions based on an identity of the second device. The communications manager 515 may transmit, over the sidelink communication link, the indication of the one or more LCP restrictions and communicate over the sidelink communication link and the relay communication link based on the one or more LCP restrictions.

The communications manager 515 may additionally or alternatively receive, over a sidelink communication link between a second device and a first device, an indication of one or more LCP restrictions corresponding to the sidelink communication link and a relay communication link between the first device and a base station, the one or more LCP restrictions based on an identity of the second device. The communications manager 515 may communicate over the sidelink communication link based on the one or more LCP restrictions. The communications manager 515 may be an example of aspects of the communications manager 810 described herein.

The communications manager 515 may be an example of means for performing various aspects of managing sidelink communications as described herein. The communications manager 515, or its sub-components, may be implemented in hardware (e.g., in communications management circuitry). The circuitry may comprise of a processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components, may be executed by a general-purpose processor, a DSP, an ASIC, an FPGA or other programmable logic device.

In some examples, the communications manager 515 may be configured to perform various operations (e.g., receiving, transmitting, communicating) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In one or more aspects, the described techniques performed by the communications manager 515 as described herein may support improvements in relayed sidelink communications. For example, communications manager 515 may decrease communication delays and latency, and increase available power at a wireless device (e.g., a UE 115) by supporting LCP restrictions that apply to a communication link between a remote UE, a relay UE, and a base station. The LCP restrictions may reduce overhead resource use or reduce power consumption at a device (or any combination thereof) compared to other systems and techniques, for example, that do not support an LCP restriction configuration for a communication link between a remote UE, a relay UE, and a base station. Accordingly, communications manager 515 may save power and increase battery life at a wireless device (e.g., a UE 115) by strategically reducing an amount of signaling or processing performed by a wireless device (e.g., a UE 115) when communicating over a communication link between a remote UE, a relay UE, and a base station.

Figure 6:
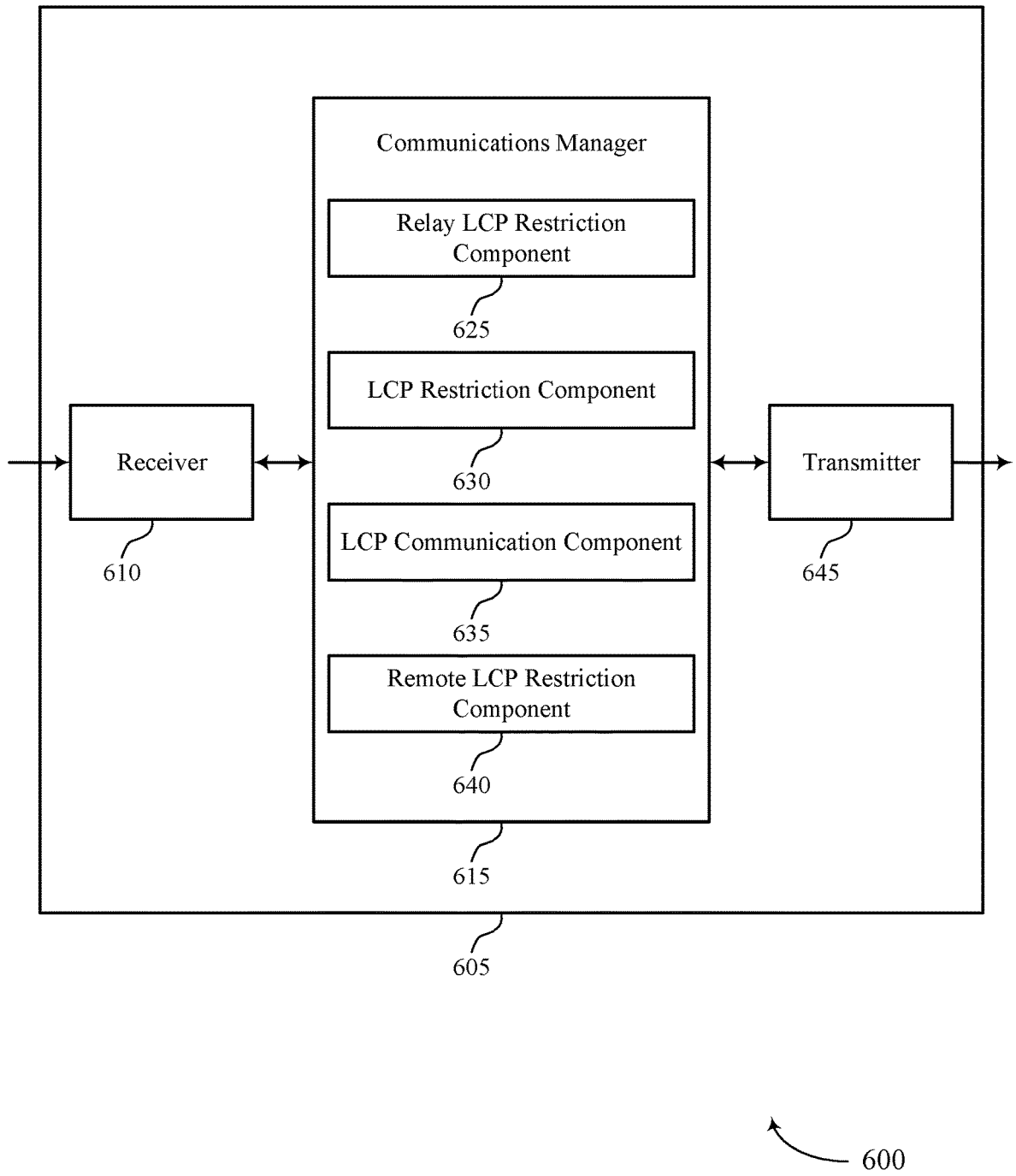

FIG. 6 shows a block diagram 600 of a device 605 that supports channel restrictions for relayed sidelink communications in accordance with one or more aspects of the present disclosure. The device 605 may be an example of aspects of a device 505 (e.g., a first device), or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to channel restrictions for relayed sidelink communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a relay LCP restriction component 625, an LCP restriction component 630, an LCP communication component 635, and a remote LCP restriction component 640. The communications manager 615 may be an example of aspects of the communications manager 810 described herein.

The relay LCP restriction component 625 may receive, over a relay communication link between the first device and a base station, an indication of one or more LCP restrictions corresponding to the relay communication link and a sidelink communication link between the first device and a second device, the one or more LCP restrictions based on an identity of the second device. The LCP restriction component 630 may transmit, over the sidelink communication link, the indication of the one or more LCP restrictions. The LCP communication component 635 may communicate over the sidelink communication link and the relay communication link based on the one or more LCP restrictions.

The remote LCP restriction component 640 may receive, over a sidelink communication link between the second device and a first device, an indication of one or more LCP restrictions corresponding to the sidelink communication link and a relay communication link between the first device and a base station, the one or more LCP restrictions based on an identity of the second device. The LCP communication component 635 may communicate over the sidelink communication link based on the one or more LCP restrictions.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

A processor of a wireless device (e.g., controlling the receiver 610, the transmitter 645, or the transceiver 820 as described with reference to FIG. 8) may decrease communication delays and latency, and increase available power. The reduced delays may reduce energy consumption (e.g., via implementation of system components described with reference to FIG. 7) compared to other systems and techniques, for example, that do not support an LCP restriction configuration for a communication link between a remote UE, a relay UE, and a base station. Further, the processor of the UE 115 may identify one or more aspects of an LCP restriction configuration to perform the techniques described herein. The processor of the wireless device may use the LCP restriction configuration to perform one or more actions that may result in lower delays and power consumption, as well as save power and increase battery life at the wireless device (e.g., by communicating according to one or more link-specific LCP restrictions on a communication link between a remote UE, a relay UE, and a base station), among other improvements.

Figure 7:
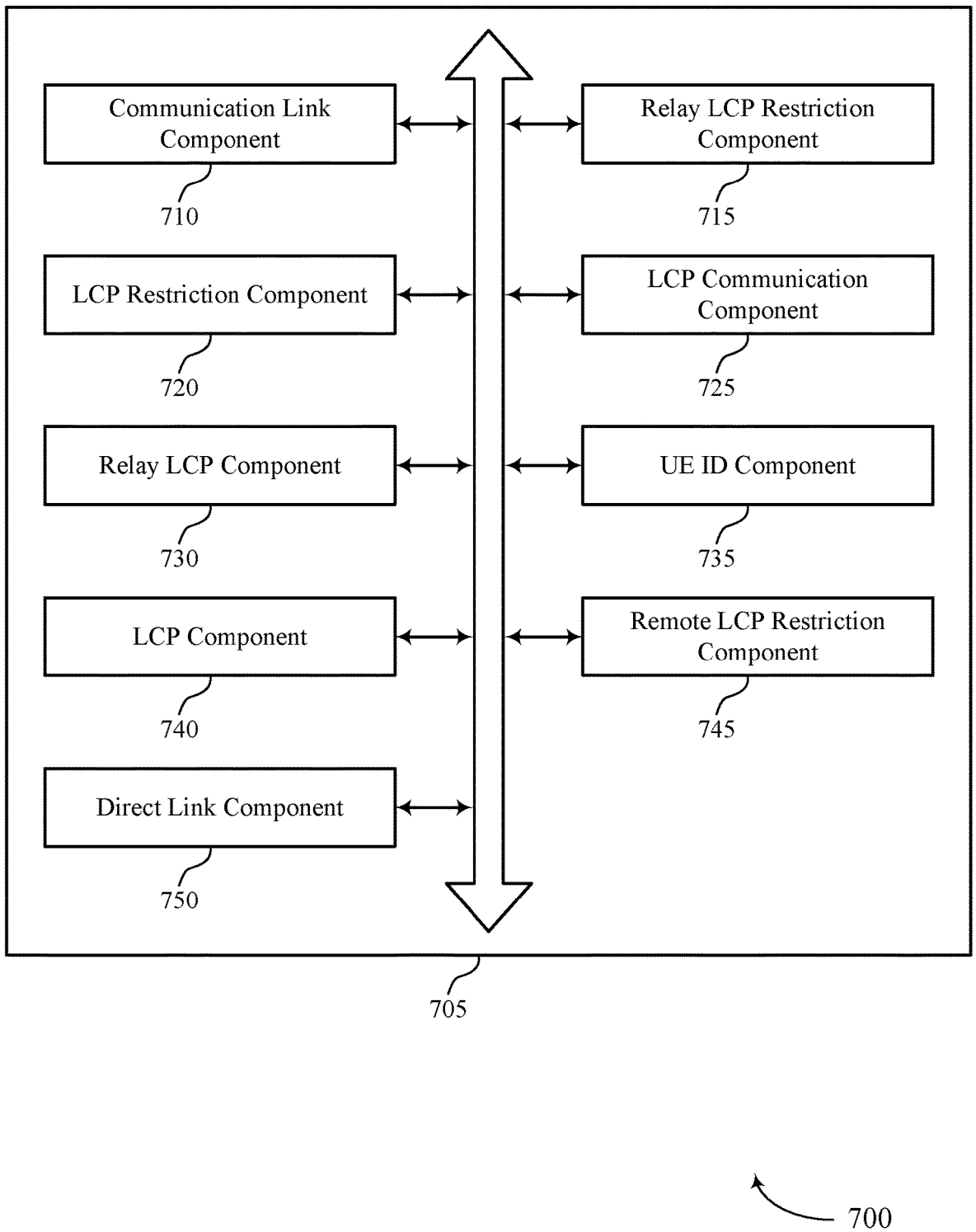
FIG. 7 shows a block diagram of a communications manager that supports channel restrictions for relayed sidelink communications in accordance with one or more aspects of the present disclosure.

FIG. 7 shows a block diagram 700 of a communications manager 705 that supports channel restrictions for relayed sidelink communications in accordance with one or more aspects of the present disclosure. The communications manager 705 may be an example of aspects of a communications manager 515, a communications manager 615, or a communications manager 810 described herein. The communications manager 705 may include a communication link component 710, a relay LCP restriction component 715, an LCP restriction component 720, an LCP communication component 725, a relay LCP component 730, a UE ID component 735, an LCP component 740, a remote LCP restriction component 745, and a direct link component 750. Each of these modules may communicate, directly or indirectly, with one another (e.g., via one or more buses).

In some examples, the communication link component 710 may establish, for a first device, a communication link with a base station and a second device, the communication link including a sidelink communication link between the second device and the first device and a relay communication link between the first device and the base station.

The relay LCP restriction component 715 may receive, over the relay communication link between the first device and the base station, an indication of one or more LCP restrictions corresponding to the relay communication link and the sidelink communication link, the one or more LCP restrictions based on an identity of the second device. In some examples, the relay LCP restriction component 715 may receive a configuration that differentiates an LCP for the second device from an LCP for the first device. In some examples, the relay LCP restriction component 715 may receive an indication that one or more LCHs associated with the first device have a higher scheduling priority than one or more LCHs associated with the second device.

In some examples, the relay LCP restriction component 715 may receive an indication of an offset associated with an LCP for the first device. In some examples, the one or more LCP restrictions apply to a set of devices that includes the second device. In some examples, the relay LCP restriction component 715 may receive a configuration that restricts communications for the set of devices to a subset of carriers of a system bandwidth. In some examples, the relay LCP restriction component 715 may receive a configuration that restricts communications for the set of devices to one or more grant-based resources.

In some examples, the relay LCP restriction component 715 may receive a configuration that associates each LCH corresponding to the second device with one of the sidelink communication link or a second communication link directly between the second device and the base station. In some examples, the configuration may be based on a target throughput, latency, reliability, or any combination thereof, for communications on the respective communication link or second communication link. In some examples, the relay LCP restriction component 715 may receive a configuration that associates each LCH corresponding to the second device with a first range of TBSs associated with the sidelink communication link and a second range of TBSs associated with a second communication link directly between the second device and the base station.

In some examples, the relay LCP restriction component 715 may receive, via the configuration, a threshold TBS for communications on the sidelink communication link or the second communication link. In some examples, the threshold TBS may be based on a target throughput, latency, reliability, or any combination thereof, for the respective communications on the communication link or the second communication link.

The LCP restriction component 720 may transmit, over the sidelink communication link, the indication of the one or more LCP restrictions. The LCP communication component 725 may communicate over the sidelink communication link and the relay communication link based on the one or more LCP restrictions.

In some examples, the LCP communication component 725 may determine an initial LCP for the first device and sum the initial LCP and the offset, where the LCP for the first device is based on the sum of the initial LCP and the offset. In some examples, the LCP communication component 725 may assign the LCP for the first device to one or more communications associated with the first device, the one or more communications transmitted over the relay communication link.

The UE ID component 735 may receive, over the sidelink communication link, a first ID indicating the identity of the second device. In some examples, the UE ID component 735 may identify a second ID indicating the identity of the first device. In some examples, the UE ID component 735 may transmit, over the relay communication link, the first ID and the second ID, where receiving the indication of the one or more LCP restrictions may be based on transmitting the first ID and the second ID.

The LCP component 740 may receive, over the sidelink communication link, one or more first LCP restrictions configured for the second device. In some examples, the LCP component 740 may identify one or more second LCP restrictions configured for the first device. In some examples, the LCP component 740 may transmit, over the relay communication link, the one or more first LCP restrictions and the one or more second LCP restrictions, where the one or more LCP restrictions are based on the one or more first LCP restrictions and the one or more second LCP restrictions.

In some examples, the communication link component 710 may establish, for a second device, a communication link with a base station, the communication link including a sidelink communication link between the second device and a first device and a relay communication link between the first device and the base station. The remote LCP restriction component 745 may receive, over the sidelink communication link, an indication of one or more LCP restrictions corresponding to the sidelink communication link and the relay communication link, the one or more LCP restrictions based on an identity of the second device. In some examples, the LCP communication component 725 may communicate over the sidelink communication link based on the one or more LCP restrictions. In some examples, the UE ID component 735 may transmit, over the sidelink communication link, an ID indicating the identity of the second device.

In some examples, the LCP component 740 may transmit, over the sidelink communication link, one or more first LCP restrictions configured for the second device, where the one or more LCP restrictions are based on the one or more first LCP restrictions.

The direct link component 750 may establish a second communication link with the base station, where the second device is located within a coverage area of the base station and the second communication link is a direct communication link between the second device and the base station.

In some examples, the one or more LCP restrictions apply to a set of devices that includes the second device. In some examples, the remote LCP restriction component 745 may receive a configuration that restricts communications for the set of devices to a subset of carriers of a system bandwidth. In some examples, the remote LCP restriction component 745 may receive a configuration that restricts communications for the set of devices to one or more grant-based resources.

In some examples, the remote LCP restriction component 745 may receive a configuration that associates each LCH corresponding to the second device with one of the sidelink communication link or the second communication link. In some examples, the configuration may be based on a target throughput, latency, reliability, or any combination thereof, for communications on the respective communication link or second communication link. In some examples, the remote LCP restriction component 745 may receive a configuration that associates each LCH corresponding to the second device with a first range of TBSs associated with the sidelink communication link and a second range of TBSs associated with the second communication link.

In some examples, the remote LCP restriction component 745 may receive, via the configuration, a threshold TBS for communications on the sidelink communication link or the second communication link. In some examples, the threshold TBS may be based on a target throughput, latency, reliability, or any combination thereof, for the respective communications on the communication link or the second communication link.

Figure 8:
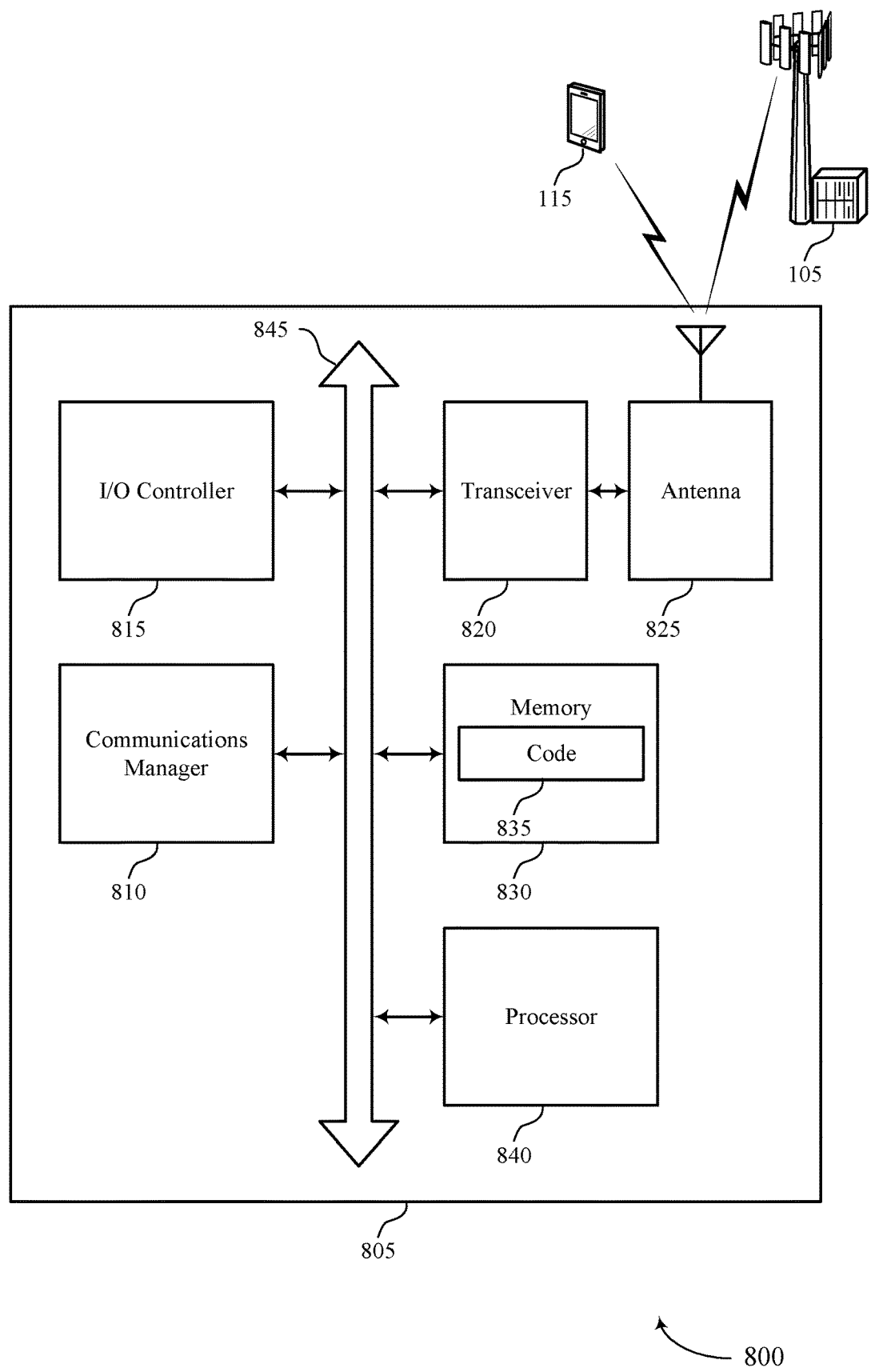
FIG. 8 shows a diagram of a system including a device that supports channel restrictions for relayed sidelink communications in accordance with one or more aspects of the present disclosure.

FIG. 8 shows a diagram of a system 800 including a device 805 that supports channel restrictions for relayed sidelink communications in accordance with one or more aspects of the present disclosure. The device 805 may be an example of or include the components of device 505, device 605, or a UE 115 as described herein (e.g., a first device). The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, over a relay communication link between the first device and a base station, an indication of one or more LCP restrictions corresponding to the relay communication link and a sidelink communication link between the first device and a second device, the one or more LCP restrictions based on an identity of the second device. The communications manager 810 may transmit, over the sidelink communication link, the indication of the one or more LCP restrictions and may communicate over the sidelink communication link and relay communication link based on the one or more LCP restrictions.

The communications manager 810 may additionally or alternatively receive, over a sidelink communication link between the second device and a first device, an indication of one or more LCP restrictions corresponding to the sidelink communication link and a relay communication link between the first device and a base station, the one or more LCP restrictions based on an identity of the second device. The communications manager 810 may communicate over the sidelink communication link based on the one or more LCP restrictions.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel restrictions for relayed sidelink communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
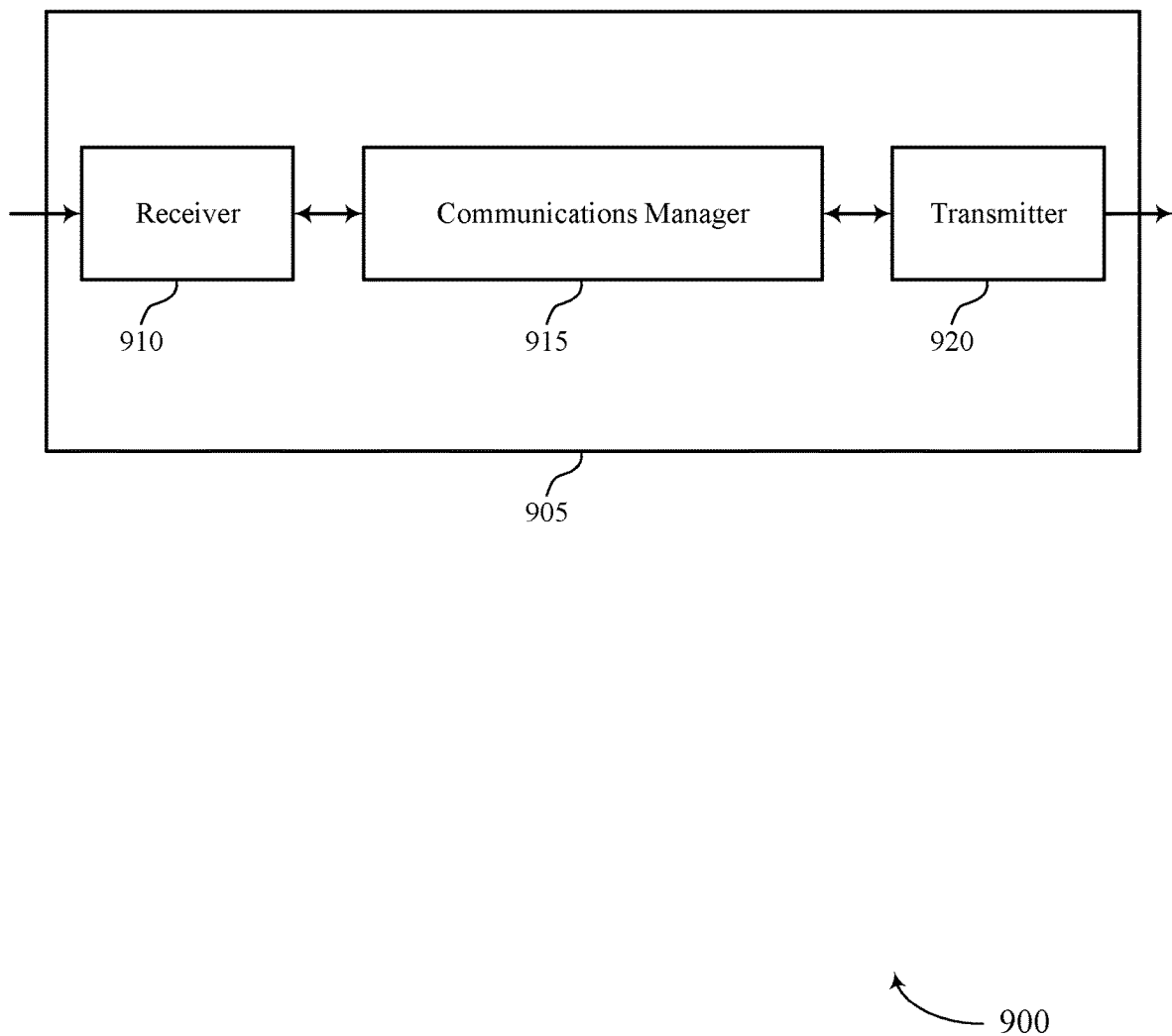
FIGS. 9 and 10 show block diagrams of devices that support channel restrictions for relayed sidelink communications in accordance with one or more aspects of the present disclosure.

FIG. 9 shows a block diagram 900 of a device 905 that supports channel restrictions for relayed sidelink communications in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel restrictions for relayed sidelink communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, over a relay communication link between the base station and a first device, an indication of one or more LCP restrictions corresponding to the relay communication link and a sidelink communication link between the first device and a second device, the one or more LCP restrictions based on an identity of the second device. The communications manager 915 may communicate with the first device over the relay communication link based on the one or more LCP restrictions. The communications manager 915 may be an example of aspects of the communications manager 1210 described herein.

In one or more aspects, the described techniques performed by the communication manager 915 as described herein may support improvements in relayed sidelink communications. For example, communications manager 915 may decrease communication delays and latency at a wireless device (e.g., a base station 105) by supporting LCP restrictions that apply to a communication link between a remote UE, a relay UE, and the base station. The LCP restrictions may reduce overhead resource use or latency (or any combination thereof) compared to other systems and techniques, for example, that do not support an LCP restriction configuration for a communication link between a remote UE, a relay UE, and a base station.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
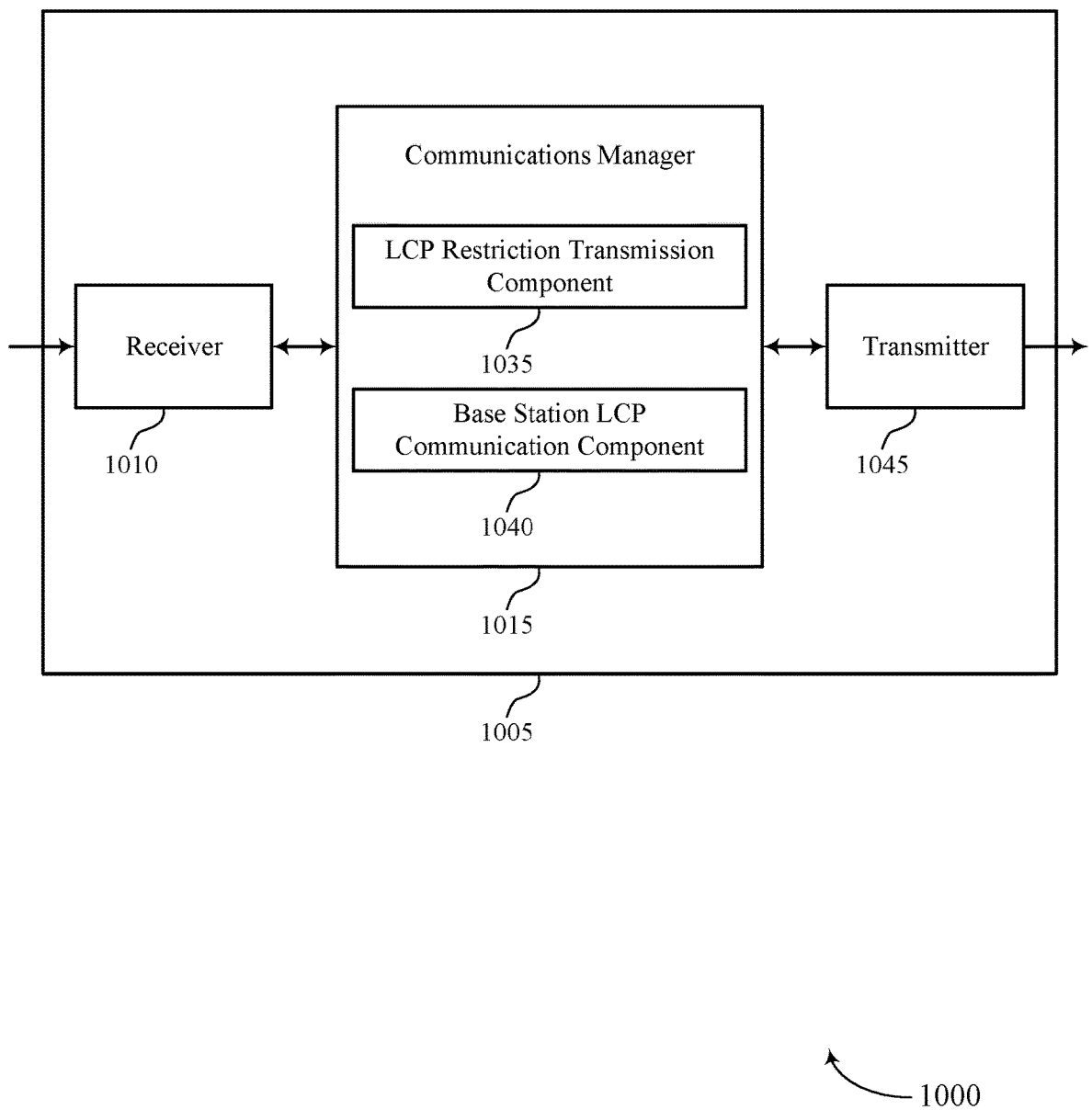

FIG. 10 shows a block diagram 1000 of a device 1005 that supports channel restrictions for relayed sidelink communications in accordance with one or more aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to channel restrictions for relayed sidelink communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a an LCP restriction transmission component 1035 and a base station LCP communication component 1040. The communications manager 1015 may be an example of aspects of the communications manager 1210 described herein.

The LCP restriction transmission component 1035 may transmit, over a relay communication link between the base station and a first device, an indication of one or more LCP restrictions corresponding to the relay communication link and a sidelink communication link between the first device and a second device, the one or more LCP restrictions based on an identity of the second device.

The base station LCP communication component 1040 may communicate with the first device over the relay communication link based on the one or more LCP restrictions.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
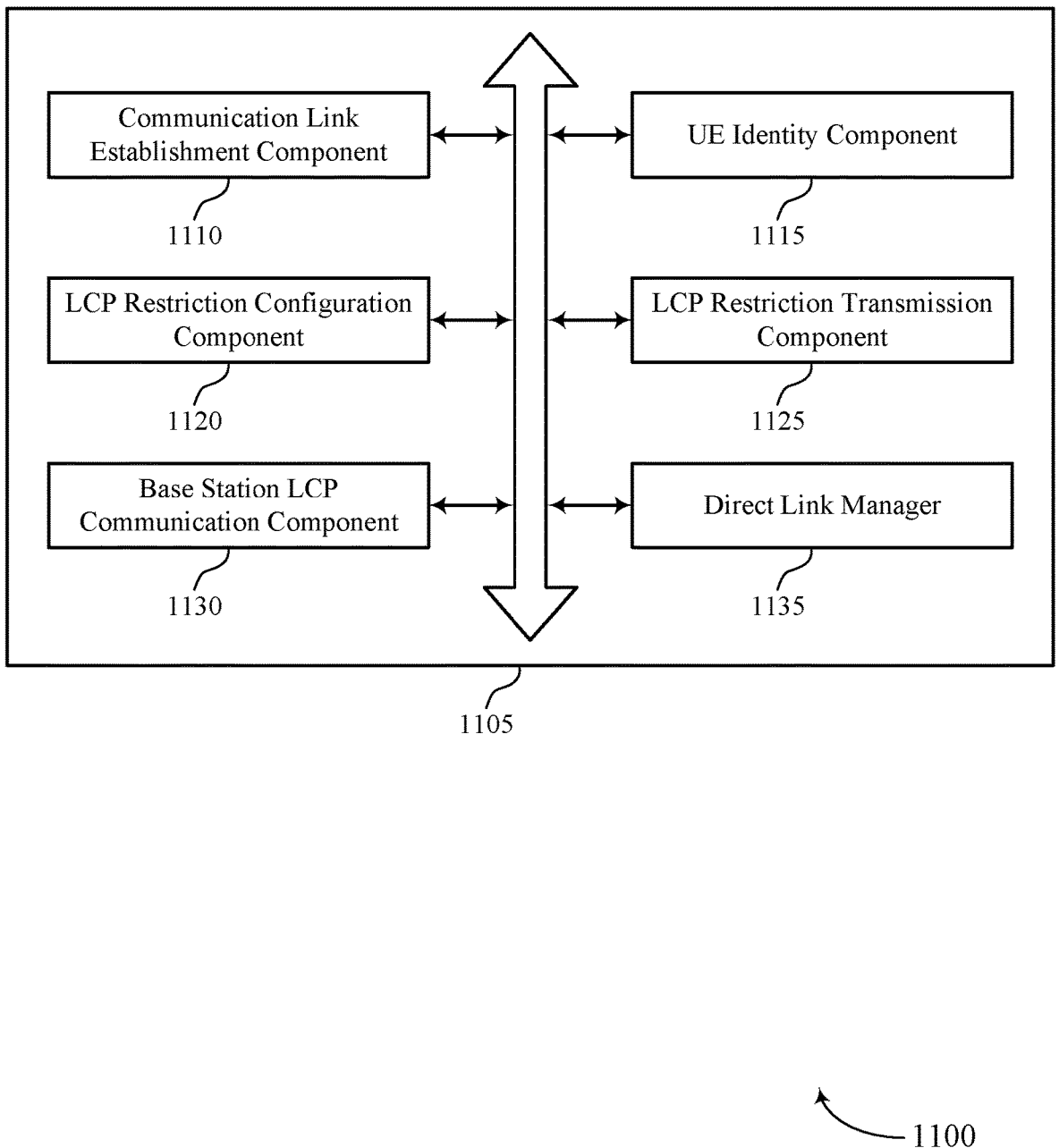
FIG. 11 shows a block diagram of a communications manager that supports channel restrictions for relayed sidelink communications in accordance with one or more aspects of the present disclosure.

FIG. 11 shows a block diagram 1100 of a communications manager 1105 that supports channel restrictions for relayed sidelink communications in accordance with one or more aspects of the present disclosure. The communications manager 1105 may be an example of aspects of a communications manager 915, a communications manager 1015, or a communications manager 1210 described herein. The communications manager 1105 may include a communication link establishment component 1110, a UE identity component 1115, an LCP restriction configuration component 1120, an LCP restriction transmission component 1125, a base station LCP communication component 1130, and a direct link manager 1135. Each of these modules may communicate, directly or indirectly, with one another (e.g., via one or more buses).

In some examples, the communication link establishment component 1110 may establish a communication link with a second device, the communication link including a sidelink communication link between the second device and a first device and a relay communication link between the first device and the base station.

In some examples, the UE identity component 1115 may determine an identity of the second device based on establishing the communication link. In some examples, the UE identity component 1115 may receive, over the relay communication link, a first ID indicating the identity of the second device and a second ID indicating the identity of the first device.

In some examples, the LCP restriction configuration component 1120 may determine, based on the identity of the second device, one or more LCP restrictions corresponding to the communication link. In some examples, the LCP restriction configuration component 1120 may determine an LCP configuration that differentiates an LCP for the second device from an LCP for the first device. In some examples, the LCP restriction configuration component 1120 may transmit an indication that one or more LCHs associated with the first device have a higher scheduling priority than one or more LCHs associated with the second device.

In some examples, the LCP restriction configuration component 1120 may transmit an indication of an offset associated with the LCP for the first device, where one or more communications associated with the first device and communicated over the relay communication link are based on the offset. In some examples, the LCP restriction configuration component 1120 may determine that the one or more LCP restrictions apply to a set of devices that includes the second device. In some examples, the LCP restriction configuration component 1120 may determine and transmit an LCP configuration that restricts communications for the set of devices to a subset of carriers of a system bandwidth.

In some examples, the LCP restriction configuration component 1120 may determine and transmit an LCP configuration that restricts communications for the set of devices to one or more grant-based resources. In some examples, the LCP restriction configuration component 1120 may determine and transmit an LCP configuration that associates each LCH corresponding to the second device with one of the sidelink communication link or a second communication link between the base station and the second device. In some examples, the configuration may be based on a target throughput, latency, reliability, or any combination thereof, for communications on the respective communication link or second communication link.

In some examples, the LCP restriction configuration component 1120 may determine and transmit an LCP configuration that associates each LCH corresponding to the second device with a first range of TBSs associated with the sidelink communication link and a second range of TBSs associated with the second communication link. In some examples, the LCP restriction configuration component 1120 may indicate, in the LCP configuration, a threshold TBS for communications on the sidelink communication link or the second communication link. In some examples, the threshold TBS may be based on a target throughput, latency, reliability, or any combination thereof, for the respective communications on the communication link or the second communication link.

In some examples, the LCP restriction configuration component 1120 may receive, over the relay communication link, one or more first LCP restrictions configured for the second device and one or more second LCP restrictions configured for the first device. In some examples, the LCP restriction configuration component 1120 may determine the one or more LCP restrictions based on the one or more first LCP restrictions and the one or more second LCP restrictions.

The LCP restriction transmission component 1125 may transmit, over the relay communication link, an indication of the one or more LCP restrictions.

The base station LCP communication component 1130 may communicate with the first device over the relay communication link based on the one or more LCP restrictions.

The direct link manager 1135 may establish the second communication link with the second device, where the second device is located within a coverage area of the base station and the second communication link is a direct communication link between the second device and the base station.

Figure 12:
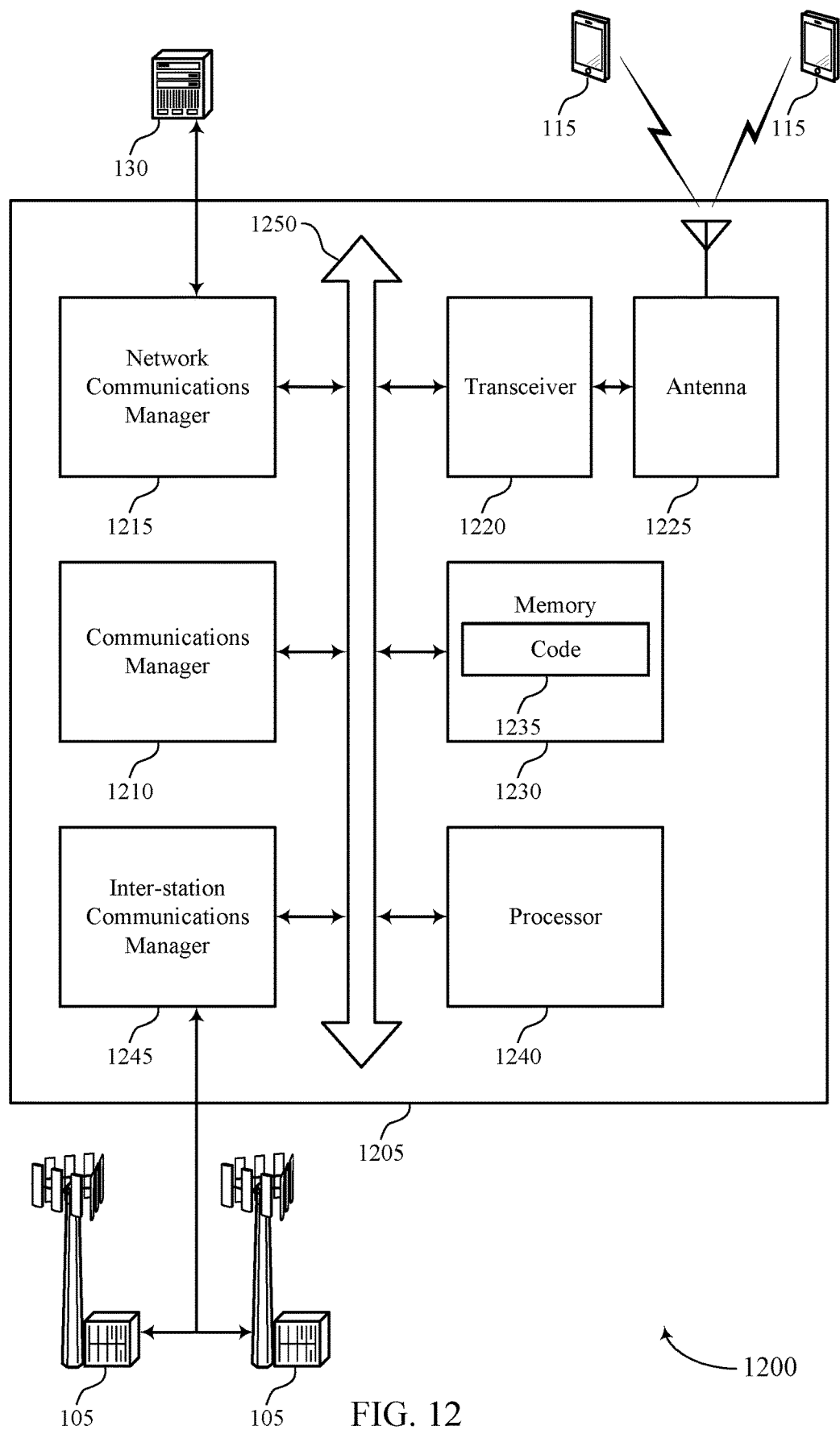
FIG. 12 shows a diagram of a system including a device that supports channel restrictions for relayed sidelink communications in accordance with one or more aspects of the present disclosure.

FIG. 12 shows a diagram of a system 1200 including a device 1205 that supports channel restrictions for relayed sidelink communications in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, over a relay communication link between the base station and a first device, an indication of one or more LCP restrictions corresponding to the relay communication link and a sidelink communication link between the first device and a second device, the one or more LCP restrictions based on an identity of the second device. The communications manager 1210 may communicate with the first device over the relay communication link based on the one or more LCP restrictions.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel restrictions for relayed sidelink communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
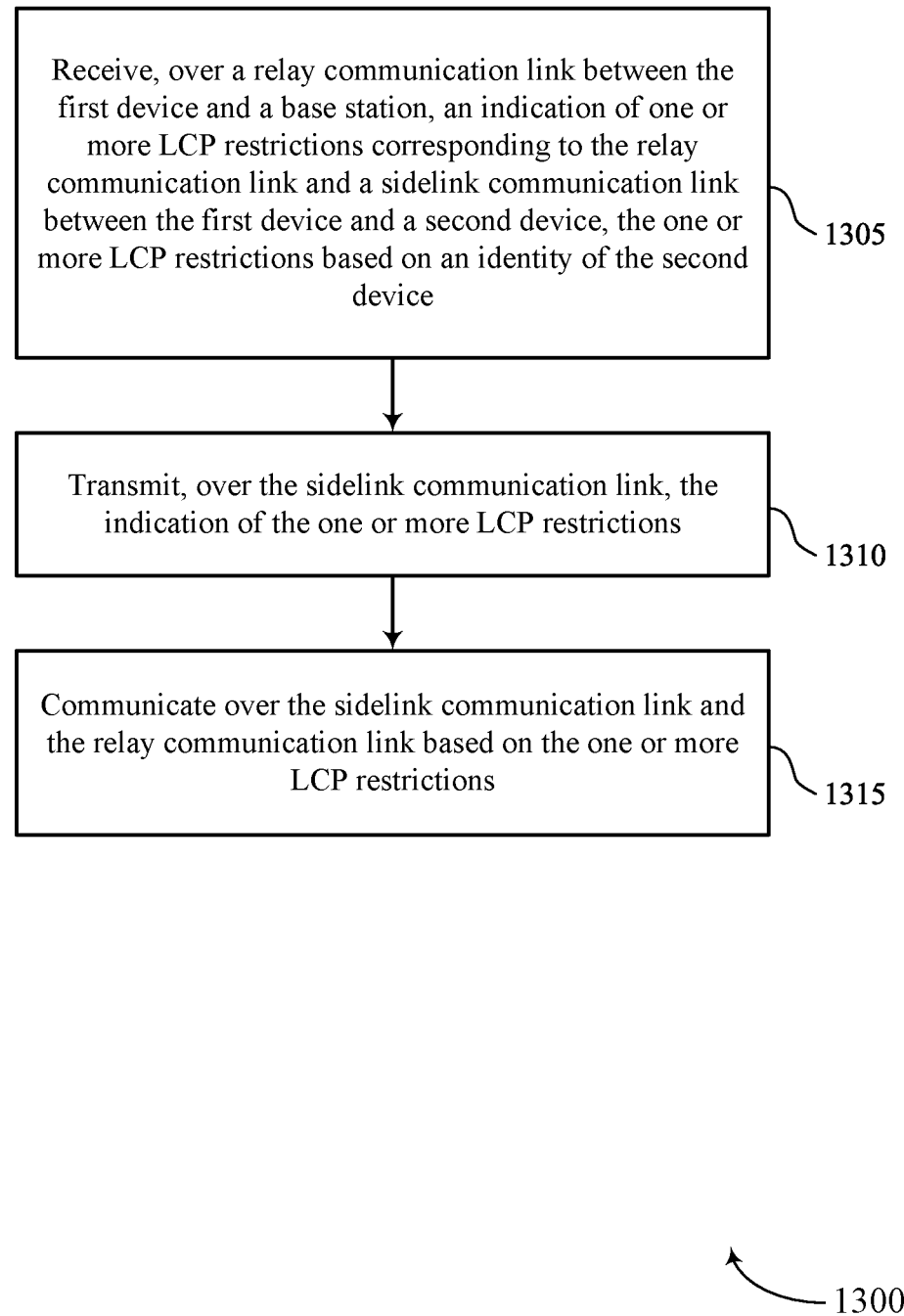
FIGS. 13 through 24 show flowcharts illustrating methods that support channel restrictions for relayed sidelink communications in accordance with one or more aspects of the present disclosure.

FIG. 13 shows a flowchart illustrating a method 1300 that supports channel restrictions for relayed sidelink communications in accordance with aspects of the present disclosure. The operations of the method 1300 may be implemented by a UE or its components as described herein. For example, the operations of the method 1300 may be performed by a communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 1305, the method may include receiving, over a relay communication link between the first device and a base station, an indication of one or more LCP restrictions corresponding to the relay communication link and a sidelink communication link between the first device and a second device, the one or more LCP restrictions based on an identity of the second device. The operations of 1305 may be performed in accordance with examples as disclosed herein. In some examples, aspects of the operations of 1305 may be performed by a relay LCP restriction component as described with reference to FIGS. 5 through 8.

At 1310, the method may include transmitting, over the sidelink communication link, the indication of the one or more LCP restrictions. The operations of 1310 may be performed in accordance with examples as disclosed herein. In some examples, aspects of the operations of 1310 may be performed by an LCP restriction component as described with reference to FIGS. 5 through 8.

At 1315, the method may include communicating over the sidelink communication link and the relay communication link based on the one or more LCP restrictions. The operations of 1315 may be performed in accordance with examples as disclosed herein. In some examples, aspects of the operations of 1315 may be performed by an LCP communication component as described with reference to FIGS. 5 through 8.

Figure 14:
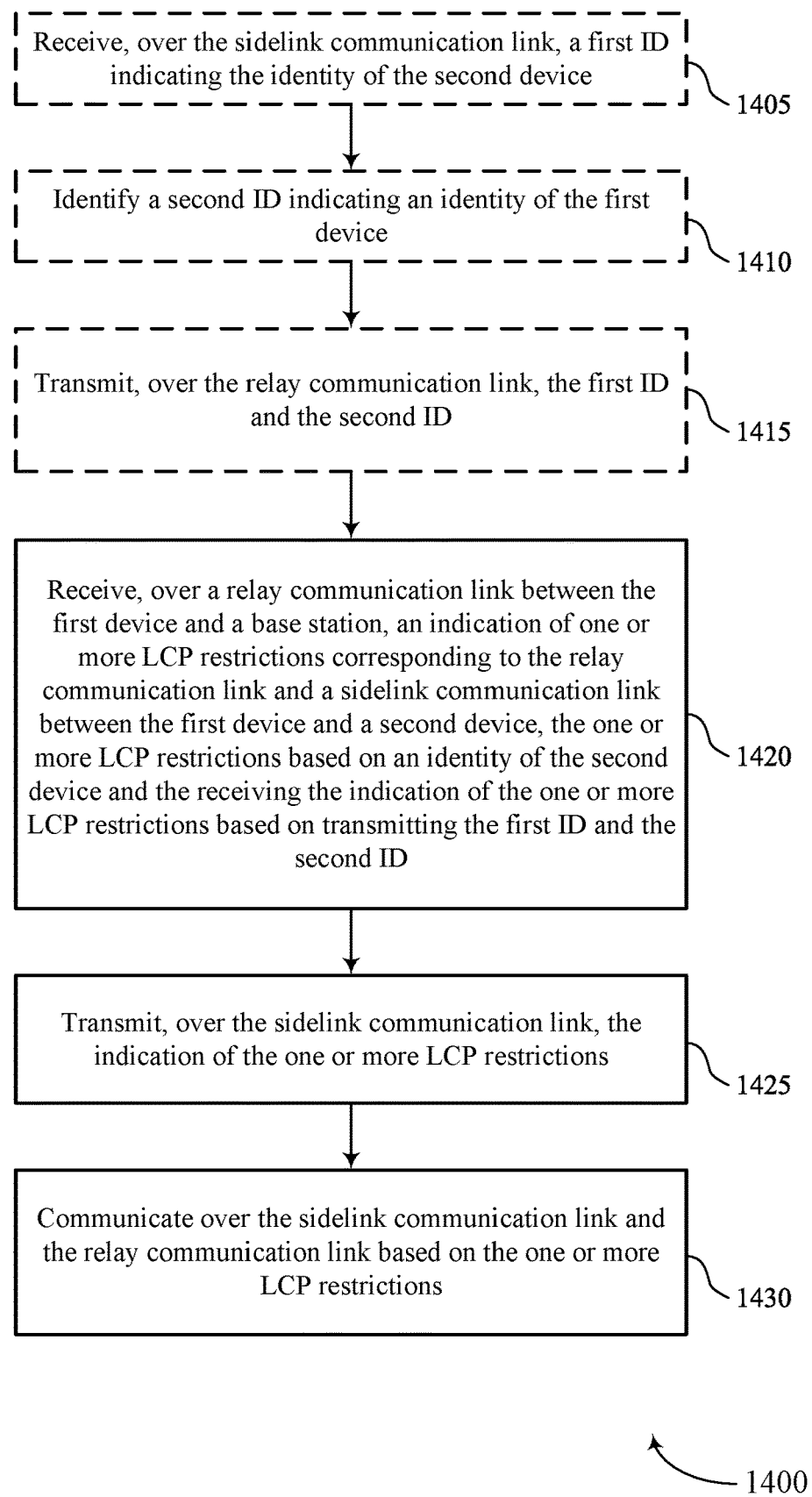

FIG. 14 shows a flowchart illustrating a method 1400 that supports channel restrictions for relayed sidelink communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, over the sidelink communication link, a first ID indicating the identity of the second device. The operations of 1405 may be performed in accordance with examples as disclosed herein. In some examples, aspects of the operations of 1405 may be performed by a UE ID component as described with reference to FIGS. 5 through 8.

At 1410, the method may include identifying a second ID indicating an identity of the first device. The operations of 1410 may be performed in accordance with examples as disclosed herein. In some examples, aspects of the operations of 1410 may be performed by a UE ID component as described with reference to FIGS. 5 through 8.

At 1415, the method may include transmitting, over the relay communication link, the first ID and the second ID, the receiving the indication of the one or more LCP restrictions based on transmitting the first ID and the second ID. The operations of 1415 may be performed in accordance with examples as disclosed herein. In some examples, aspects of the operations of 1415 may be performed by a UE ID component as described with reference to FIGS. 5 through 8.

At 1420, the method may include receiving, over a relay communication link between the first device and a base station, an indication of one or more LCP restrictions corresponding to the relay communication link and a sidelink communication link between the first device and a second device, the one or more LCP restrictions based on an identity of the second device. The operations of 1420 may be performed in accordance with examples as disclosed herein. In some examples, aspects of the operations of 1420 may be performed by a relay LCP restriction component as described with reference to FIGS. 5 through 8.

At 1425, the method may include transmitting, over the sidelink communication link, the indication of the one or more LCP restrictions. The operations of 1425 may be performed in accordance with examples as disclosed herein. In some examples, aspects of the operations of 1425 may be performed by an LCP restriction component as described with reference to FIGS. 5 through 8.

At 1430, the method may include communicating over the sidelink communication link and the relay communication link based on the one or more LCP restrictions. The operations of 1430 may be performed in accordance with examples as disclosed herein. In some examples, aspects of the operations of 1430 may be performed by an LCP communication component as described with reference to FIGS. 5 through 8.

Figure 15:
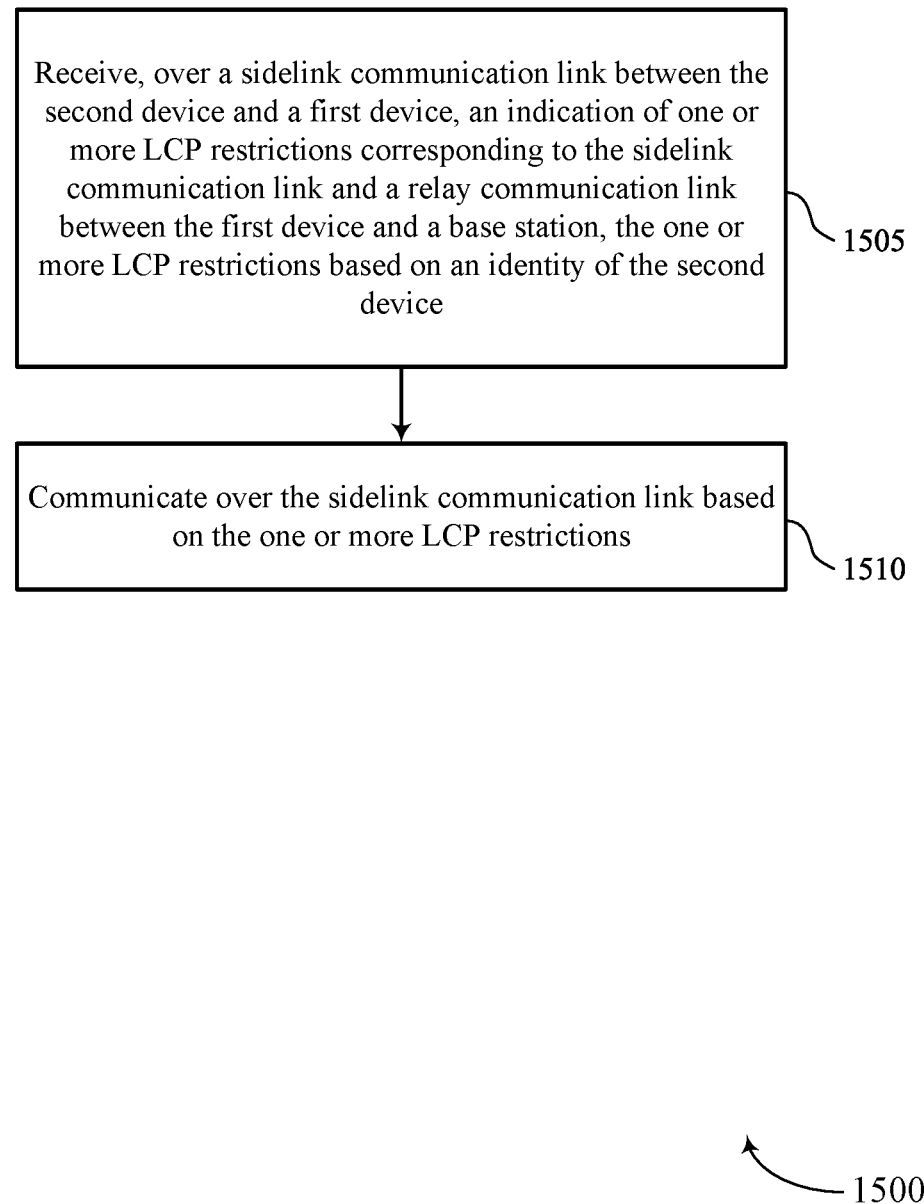

FIG. 15 shows a flowchart illustrating a method 1500 that supports channel restrictions for relayed sidelink communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, over a sidelink communication link between the second device and a first device, an indication of one or more LCP restrictions corresponding to the sidelink communication link and a relay communication link between the first device and a base station, the one or more LCP restrictions based on an identity of the second device. The operations of 1505 may be performed in accordance with examples as disclosed herein. In some examples, aspects of the operations of 1505 may be performed by a remote LCP restriction component as described with reference to FIGS. 5 through 8.

At 1510, the method may include communicating over the sidelink communication link based on the one or more LCP restrictions. The operations of 1510 may be performed in accordance with examples as disclosed herein. In some examples, aspects of the operations of 1510 may be performed by an LCP communication component as described with reference to FIGS. 5 through 8.

Figure 16:
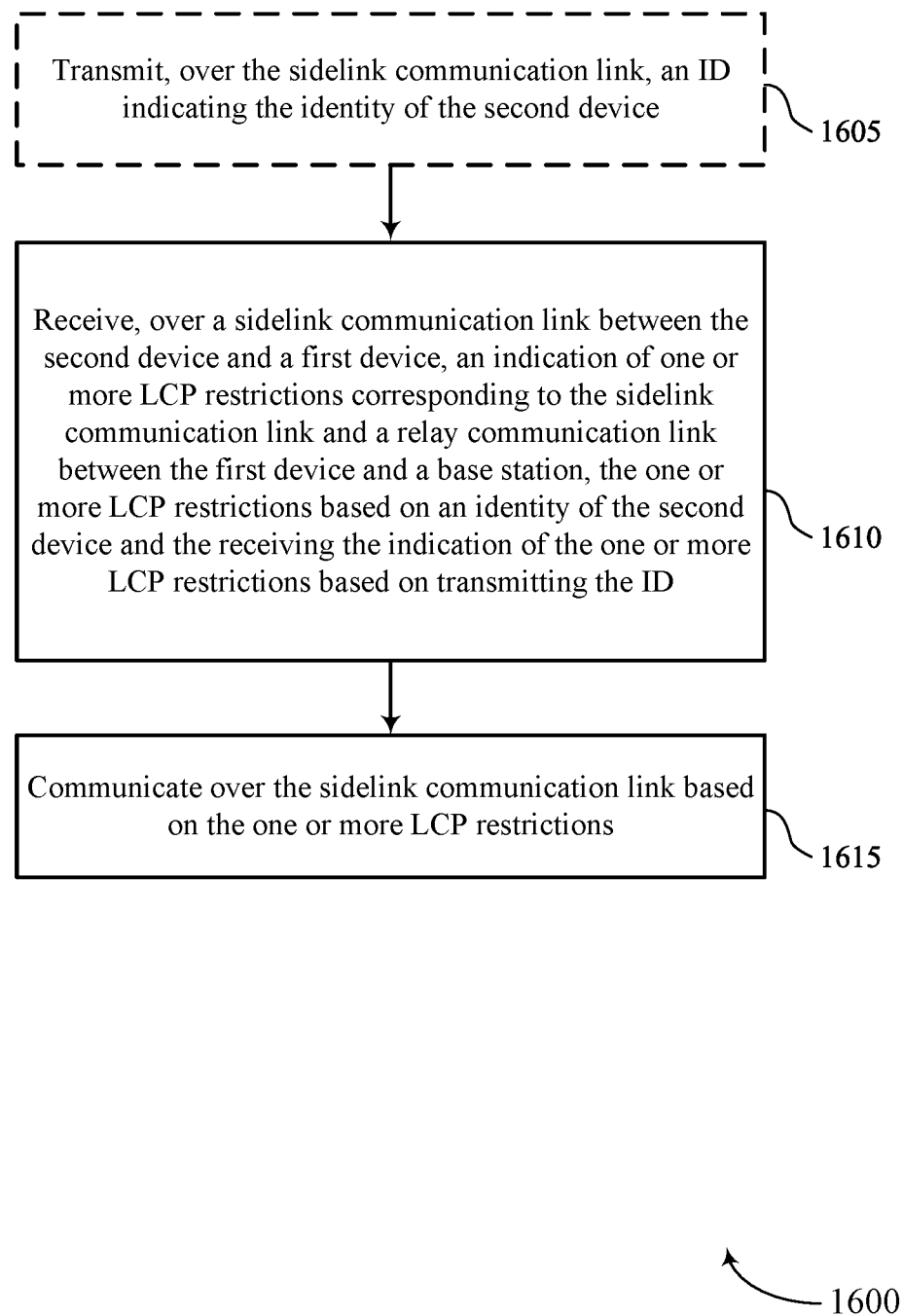

FIG. 16 shows a flowchart illustrating a method 1600 that supports channel restrictions for relayed sidelink communications in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, over the sidelink communication link, an ID indicating the identity of the second device, the receiving the indication of the one or more LCP restrictions based on transmitting the ID. The operations of 1605 may be performed in accordance with examples as disclosed herein. In some examples, aspects of the operations of 1605 may be performed by a UE ID component as described with reference to FIGS. 5 through 8.

At 1610, the method may include receiving, over a sidelink communication link between the second device and a first device, an indication of one or more LCP restrictions corresponding to the sidelink communication link and a relay communication link between the first device and a base station, the one or more LCP restrictions based on an identity of the second device. The operations of 1610 may be performed in accordance with examples as disclosed herein. In some examples, aspects of the operations of 1610 may be performed by a remote LCP restriction component as described with reference to FIGS. 5 through 8.

At 1615, the method may include communicating over the sidelink communication link based on the one or more LCP restrictions. The operations of 1615 may be performed in accordance with examples as disclosed herein. In some examples, aspects of the operations of 1615 may be performed by an LCP communication component as described with reference to FIGS. 5 through 8.

Figure 17:
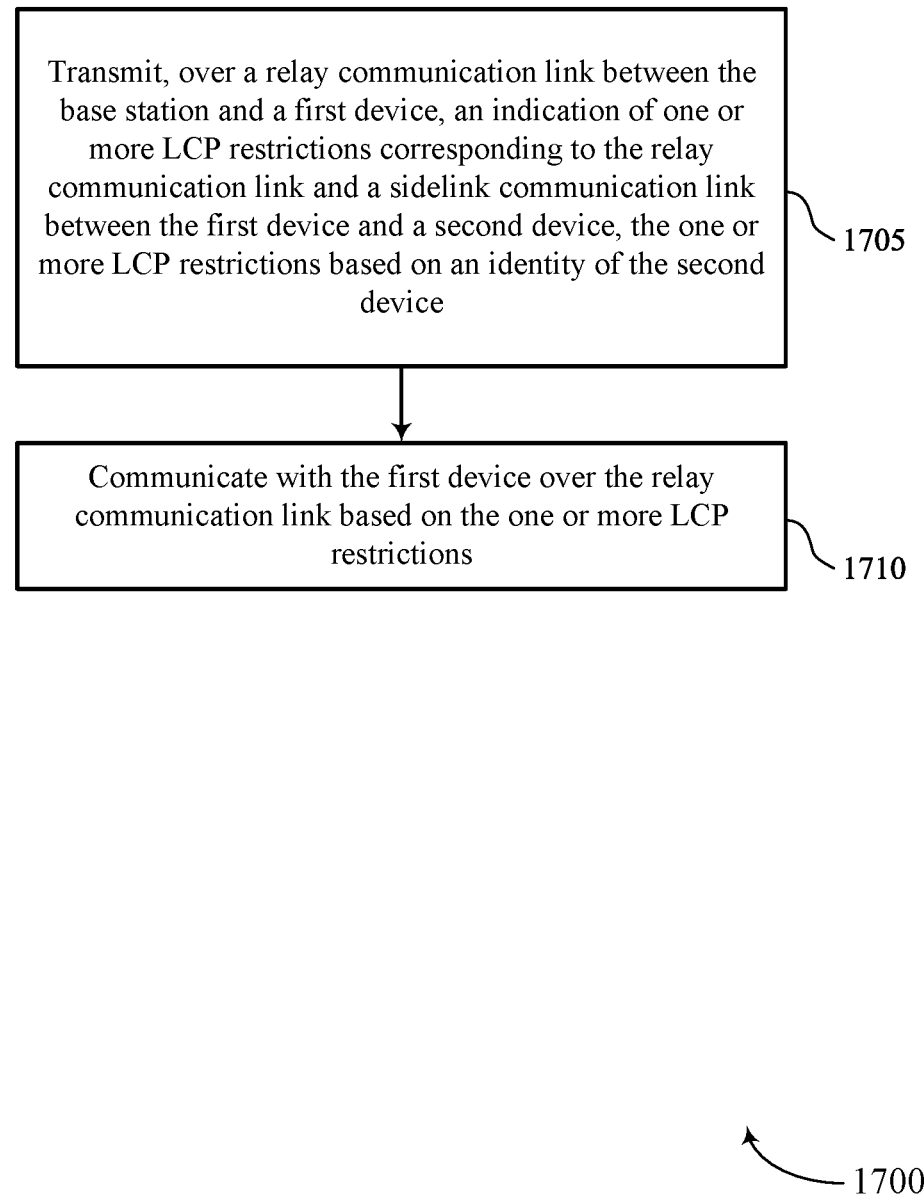

FIG. 17 shows a flowchart illustrating a method 1700 that supports channel restrictions for relayed sidelink communications in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, over a relay communication link between the base station and a first device, an indication of one or more LCP restrictions corresponding to the relay communication link and a sidelink communication link between the first device and a second device, the one or more LCP restrictions based on an identity of the second device. The operations of 1705 may be performed in accordance with examples as disclosed herein. In some examples, aspects of the operations of 1705 may be performed by an LCP restriction transmission component as described with reference to FIGS. 9 through 12.

At 1710, the method may include communicating with the first device over the relay communication link based on the one or more LCP restrictions. The operations of 1710 may be performed in accordance with examples as disclosed herein. In some examples, aspects of the operations of 1710 may be performed by a base station LCP communication component as described with reference to FIGS. 9 through 12.

Figure 18:
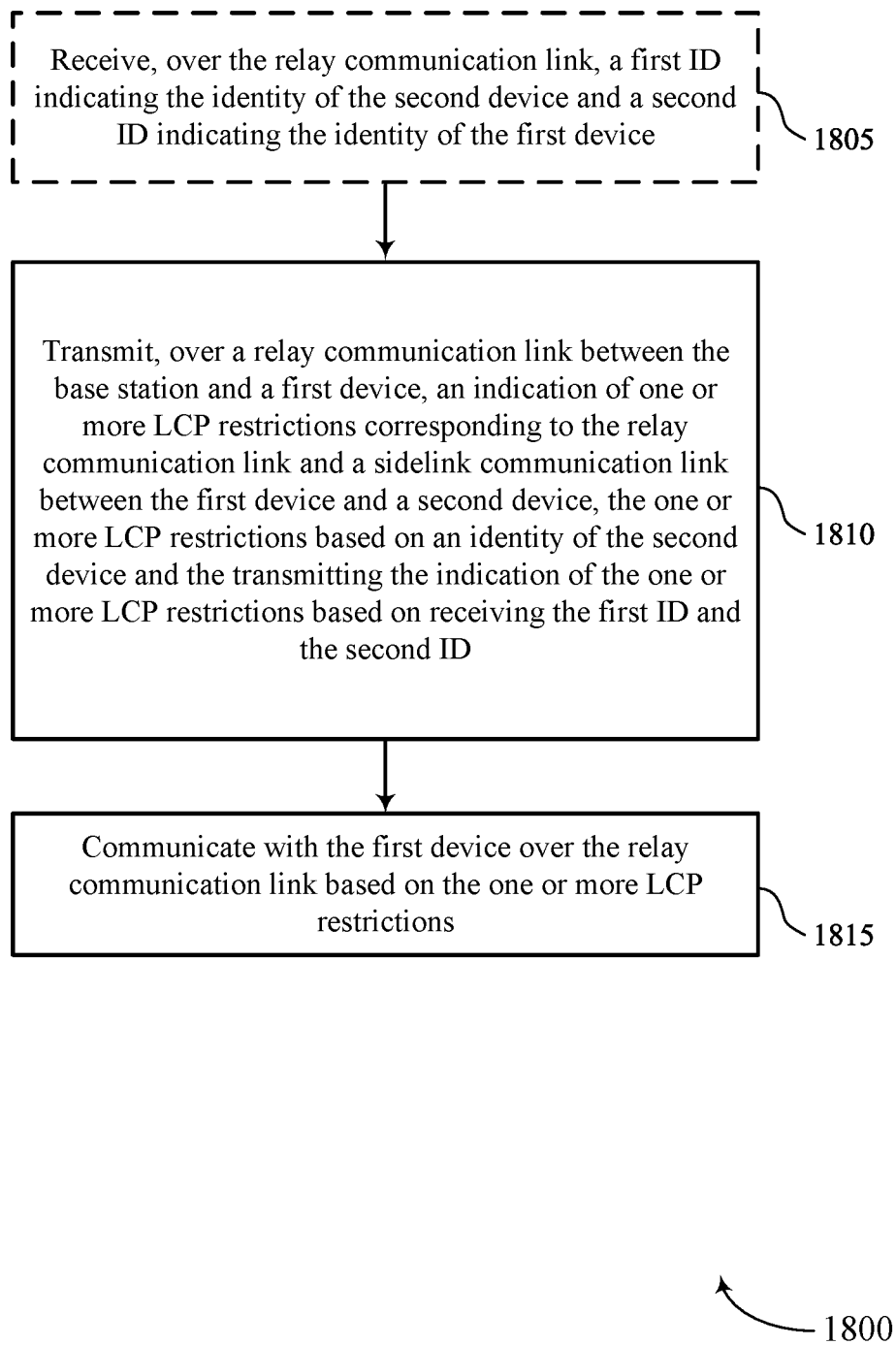

FIG. 18 shows a flowchart illustrating a method 1800 that supports channel restrictions for relayed sidelink communications in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, over the relay communication link, a first ID indicating the identity of the second device and a second ID indicating the identity of the first device, the transmitting the indication of the one or more LCP restrictions based on receiving the first ID and the second ID. The operations of 1805 may be performed in accordance with examples as disclosed herein. In some examples, aspects of the operations of 1805 may be performed by a UE identity component as described with reference to FIGS. 9 through 12.

At 1810, the method may include transmitting, over a relay communication link between the base station and a first device, an indication of one or more LCP restrictions corresponding to the relay communication link and a sidelink communication link between the first device and a second device, the one or more LCP restrictions based on an identity of the second device. The operations of 1810 may be performed in accordance with examples as disclosed herein. In some examples, aspects of the operations of 1810 may be performed by an LCP restriction transmission component as described with reference to FIGS. 9 through 12.

At 1815, the method may include communicating with the first device over the relay communication link based on the one or more LCP restrictions. The operations of 1815 may be performed in accordance with examples as disclosed herein. In some examples, aspects of the operations of 1815 may be performed by a base station LCP communication component as described with reference to FIGS. 9 through 12.

Figure 19:
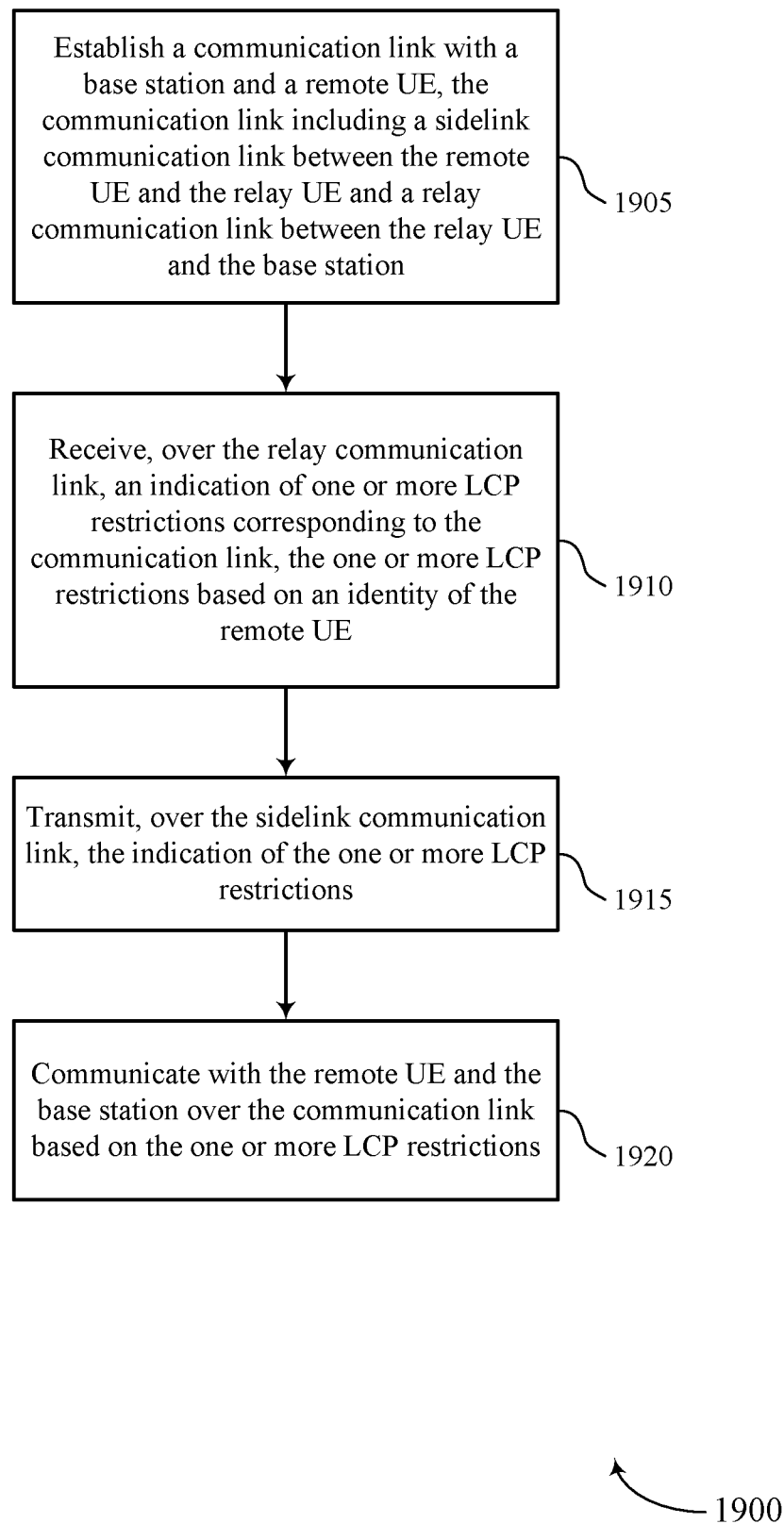

FIG. 19 shows a flowchart illustrating a method 1900 that supports channel restrictions for relayed sidelink communications in accordance with one or more aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may establish a communication link with a base station and a remote UE, the communication link including sidelink communication link between the remote UE and the relay UE and a relay communication link between the relay UE and the base station. The operations of 1905 may be performed according to the methods described herein. In some examples, aspects of the operations of 1905 may be performed by a communication link component as described with reference to FIGS. 5 through 8.

At 1910, the UE may receive, over the relay communication link, an indication of one or more LCP restrictions corresponding to the communication link, the one or more LCP restrictions based on an identity of the remote UE. The operations of 1910 may be performed according to the methods described herein. In some examples, aspects of the operations of 1910 may be performed by a relay LCP restriction component as described with reference to FIGS. 5 through 8.

At 1915, the UE may transmit, over the sidelink communication link, the indication of the one or more LCP restrictions. The operations of 1915 may be performed according to the methods described herein. In some examples, aspects of the operations of 1915 may be performed by an LCP restriction component as described with reference to FIGS. 5 through 8.

At 1920, the UE may communicate with the remote UE and the base station over the communication link based on the one or more LCP restrictions. The operations of 1920 may be performed according to the methods described herein. In some examples, aspects of the operations of 1920 may be performed by an LCP communication component as described with reference to FIGS. 5 through 8.

Figure 20:
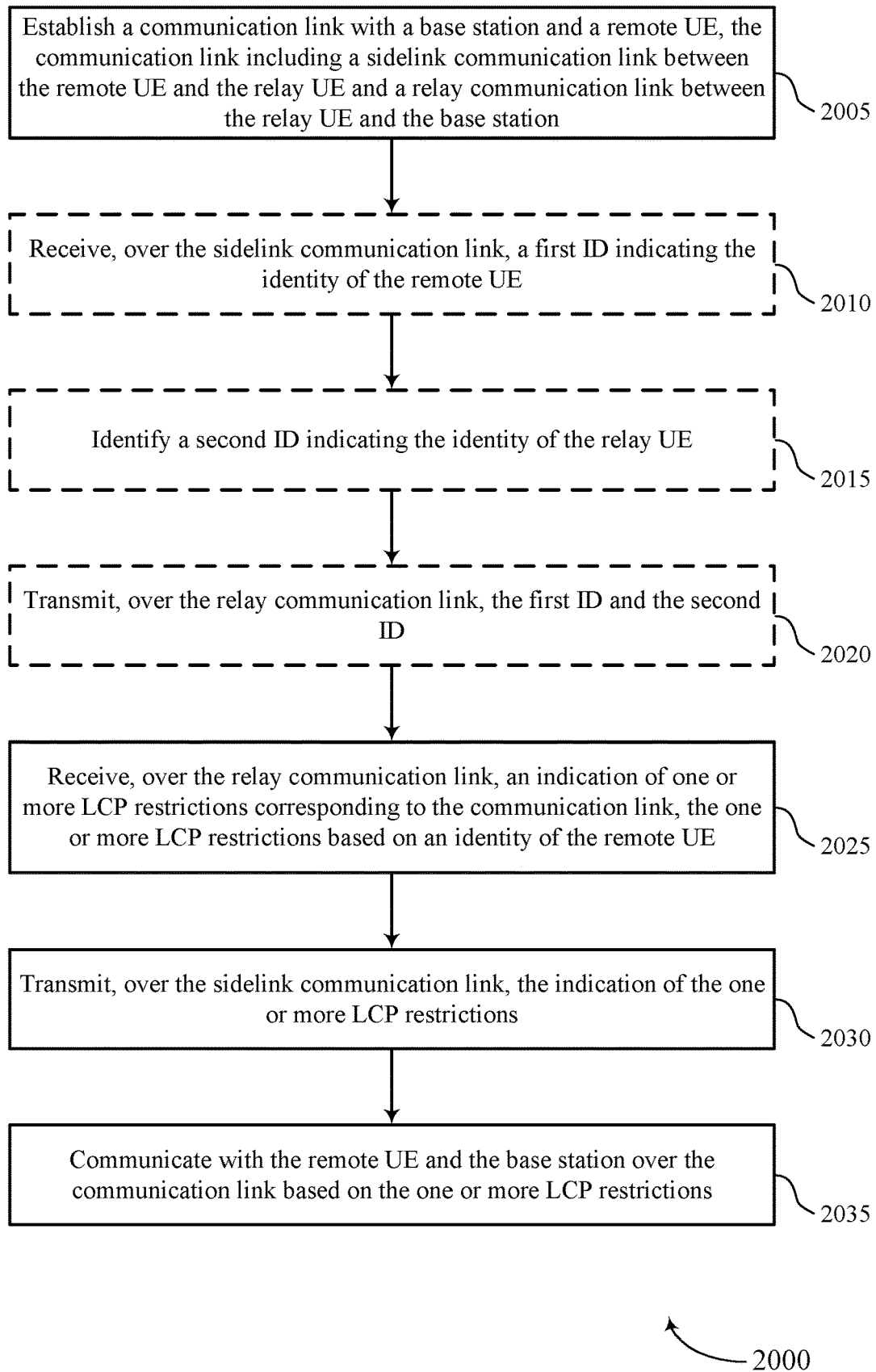

FIG. 20 shows a flowchart illustrating a method 2000 that supports channel restrictions for relayed sidelink communications in accordance with one or more aspects of the present disclosure. The operations of method 2000 may be implemented by a UE 115 or its components as described herein. For example, the operations of method 2000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2005, the UE may establish a communication link with a base station and a remote UE, the communication link including a sidelink communication link between the remote UE and the relay UE and a relay communication link between the relay UE and the base station. The operations of 2005 may be performed according to the methods described herein. In some examples, aspects of the operations of 2005 may be performed by a communication link component as described with reference to FIGS. 5 through 8.

At 2010, the UE may receive, over the sidelink communication link, a first ID indicating the identity of the remote UE. The operations of 2010 may be performed according to the methods described herein. In some examples, aspects of the operations of 2010 may be performed by a UE ID component as described with reference to FIGS. 5 through 8.

At 2015, the UE may identify a second ID indicating the identity of the relay UE. The operations of 2015 may be performed according to the methods described herein. In some examples, aspects of the operations of 2015 may be performed by a UE ID component as described with reference to FIGS. 5 through 8.

At 2020, the UE may transmit, over the relay communication link, the first ID and the second ID. The operations of 2020 may be performed according to the methods described herein. In some examples, aspects of the operations of 2020 may be performed by a UE ID component as described with reference to FIGS. 5 through 8.

At 2025, the UE may receive, over the relay communication link, an indication of one or more LCP restrictions corresponding to the communication link, the one or more LCP restrictions based on an identity of the remote UE. The operations of 2025 may be performed according to the methods described herein. In some examples, aspects of the operations of 2025 may be performed by a relay LCP restriction component as described with reference to FIGS. 5 through 8.

At 2030, the UE may transmit, over the sidelink communication link, the indication of the one or more LCP restrictions. The operations of 2030 may be performed according to the methods described herein. In some examples, aspects of the operations of 2030 may be performed by an LCP restriction component as described with reference to FIGS. 5 through 8.

At 2035, the UE may communicate with the remote UE and the base station over the communication link based on the one or more LCP restrictions. The operations of 2035 may be performed according to the methods described herein. In some examples, aspects of the operations of 2035 may be performed by an LCP communication component as described with reference to FIGS. 5 through 8.

Figure 21:
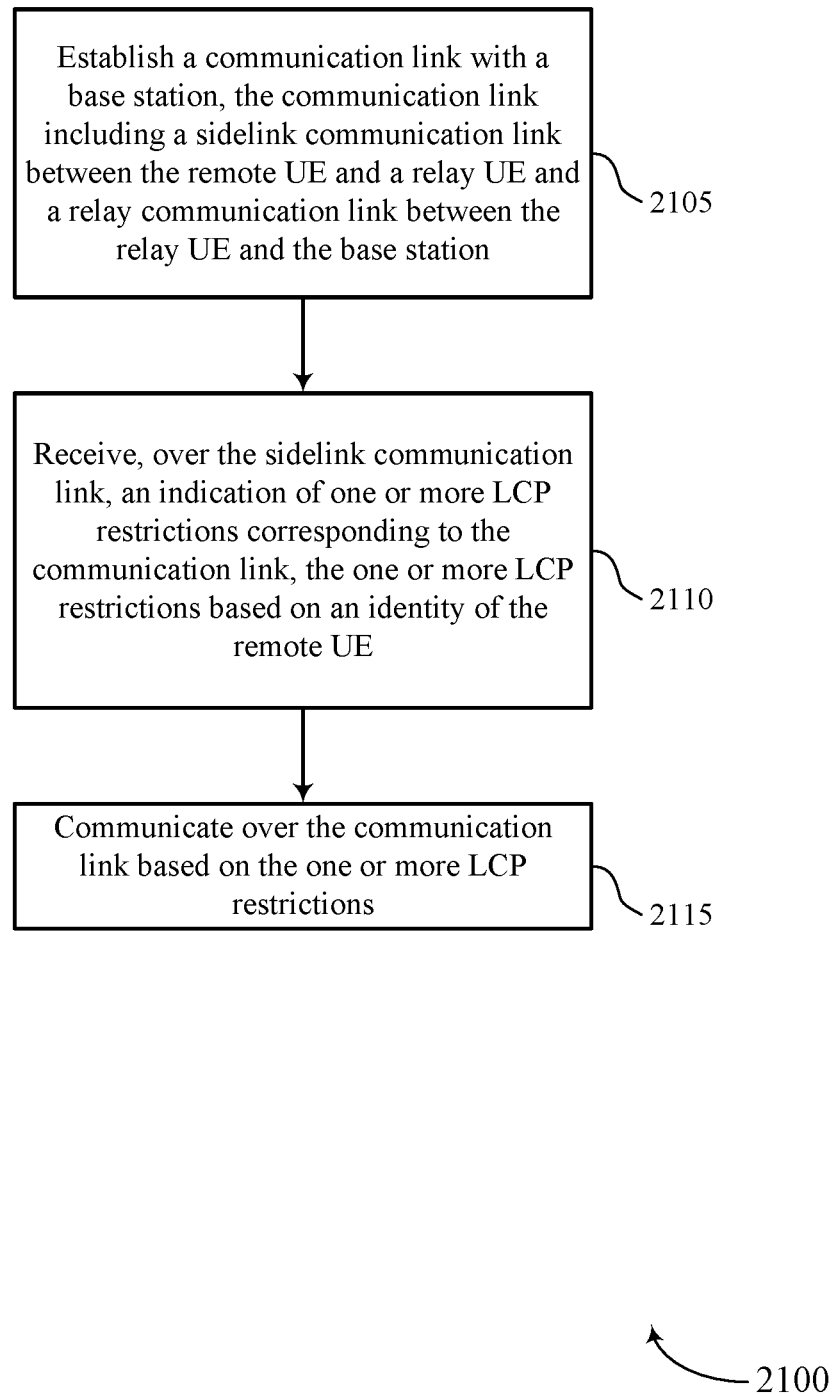

FIG. 21 shows a flowchart illustrating a method 2100 that supports channel restrictions for relayed sidelink communications in accordance with one or more aspects of the present disclosure. The operations of method 2100 may be implemented by a UE 115 or its components as described herein. For example, the operations of method 2100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2105, the UE may establish a communication link with a base station, the communication link including a sidelink communication link between the remote UE and a relay UE and a relay communication link between the relay UE and the base station. The operations of 2105 may be performed according to the methods described herein. In some examples, aspects of the operations of 2105 may be performed by a communication link component as described with reference to FIGS. 5 through 8.

At 2110, the UE may receive, over the sidelink communication link, an indication of one or more LCP restrictions corresponding to the communication link, the one or more LCP restrictions based on an identity of the remote UE. The operations of 2110 may be performed according to the methods described herein. In some examples, aspects of the operations of 2110 may be performed by a remote LCP restriction component as described with reference to FIGS. 5 through 8.

At 2115, the UE may communicate over the communication link based on the one or more LCP restrictions. The operations of 2115 may be performed according to the methods described herein. In some examples, aspects of the operations of 2115 may be performed by an LCP communication component as described with reference to FIGS. 5 through 8.

Figure 22:
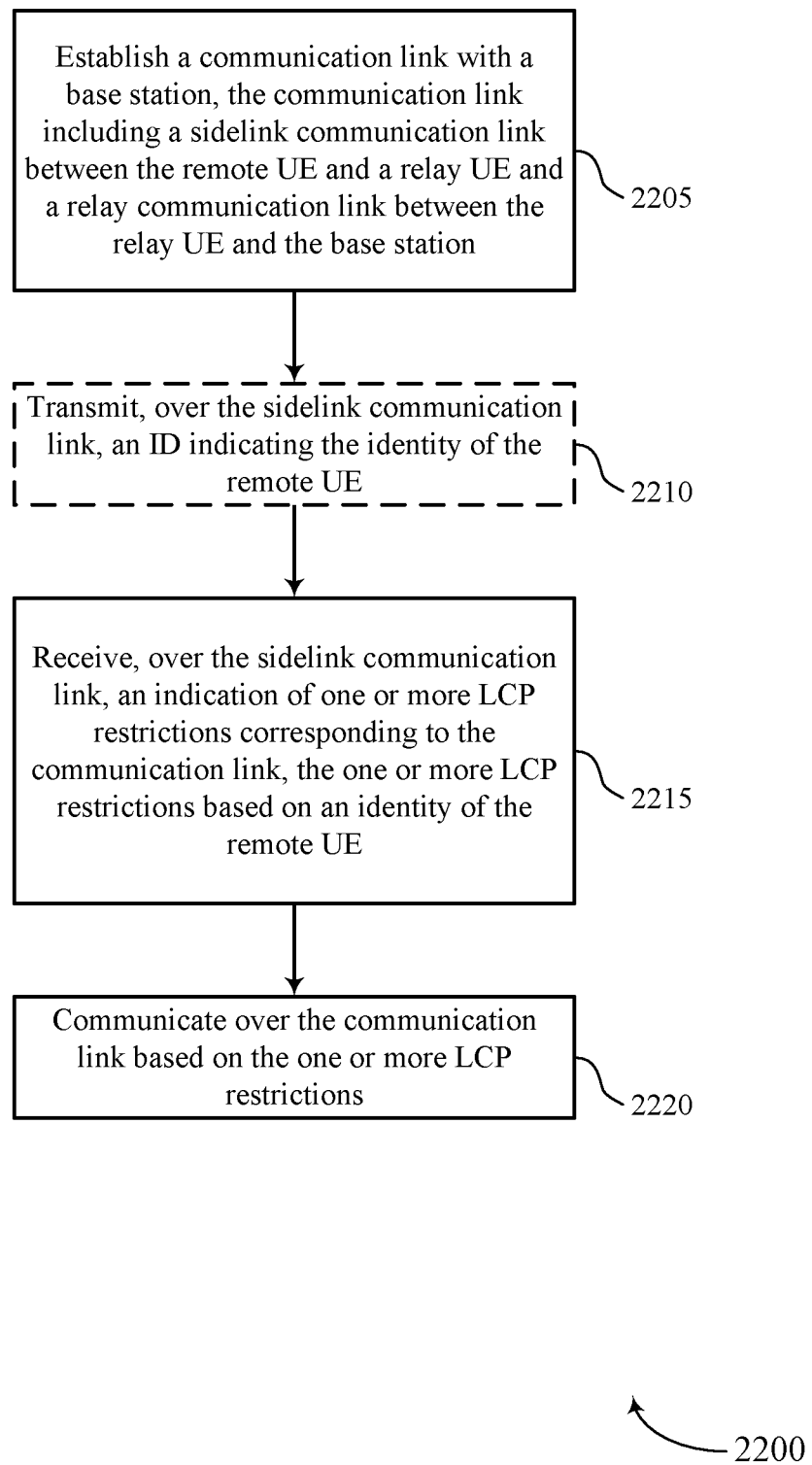

FIG. 22 shows a flowchart illustrating a method 2200 that supports channel restrictions for relayed sidelink communications in accordance with one or more aspects of the present disclosure. The operations of method 2200 may be implemented by a UE 115 or its components as described herein. For example, the operations of method 2200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2205, the UE may establish a communication link with a base station, the communication link including a sidelink communication link between the remote UE and a relay UE and a relay communication link between the relay UE and the base station. The operations of 2205 may be performed according to the methods described herein. In some examples, aspects of the operations of 2205 may be performed by a communication link component as described with reference to FIGS. 5 through 8.

At 2210, the UE may transmit, over the sidelink communication link, an ID indicating the identity of the remote UE. The operations of 2210 may be performed according to the methods described herein. In some examples, aspects of the operations of 2210 may be performed by a UE ID component as described with reference to FIGS. 5 through 8.

At 2215, the UE may receive, over the sidelink communication link, an indication of one or more LCP restrictions corresponding to the communication link, the one or more LCP restrictions based on an identity of the remote UE. The operations of 2215 may be performed according to the methods described herein. In some examples, aspects of the operations of 2215 may be performed by a remote LCP restriction component as described with reference to FIGS. 5 through 8.

At 2220, the UE may communicate over the communication link based on the one or more LCP restrictions. The operations of 2220 may be performed according to the methods described herein. In some examples, aspects of the operations of 2220 may be performed by an LCP communication component as described with reference to FIGS. 5 through 8.

Figure 23:
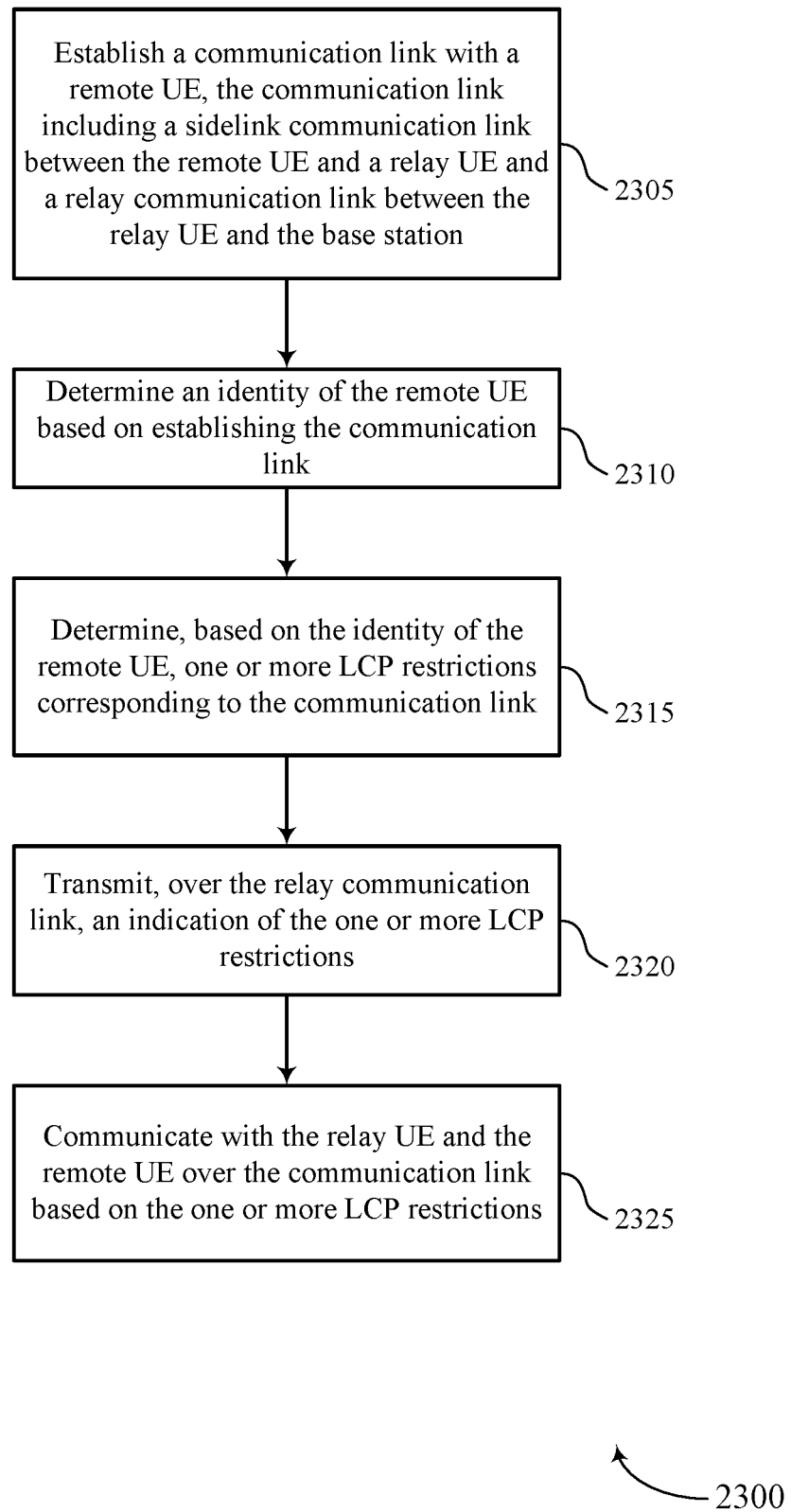

FIG. 23 shows a flowchart illustrating a method 2300 that supports channel restrictions for relayed sidelink communications in accordance with one or more aspects of the present disclosure. The operations of method 2300 may be implemented by a base station 105 or its components as described herein. For example, the operations of method 2300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2305, the base station may establish a communication link with a remote UE, the communication link including a sidelink communication link between the remote UE and a relay UE and a relay communication link between the relay UE and the base station. The operations of 2305 may be performed according to the methods described herein. In some examples, aspects of the operations of 2305 may be performed by a communication link establishment component as described with reference to FIGS. 9 through 12.

At 2310, the base station may determine an identity of the remote UE based on establishing the communication link. The operations of 2310 may be performed according to the methods described herein. In some examples, aspects of the operations of 2310 may be performed by a UE identity component as described with reference to FIGS. 9 through 12.

At 2315, the base station may determine, based on the identity of the remote UE, one or more LCP restrictions corresponding to the communication link. The operations of 2315 may be performed according to the methods described herein. In some examples, aspects of the operations of 2315 may be performed by an LCP restriction configuration component as described with reference to FIGS. 9 through 12.

At 2320, the base station may transmit, over the relay communication link, an indication of the one or more LCP restrictions. The operations of 2320 may be performed according to the methods described herein. In some examples, aspects of the operations of 2320 may be performed by an LCP restriction transmission component as described with reference to FIGS. 9 through 12.

At 2325, the base station may communicate with the relay UE and the remote UE over the communication link based on the one or more LCP restrictions. The operations of 2325 may be performed according to the methods described herein. In some examples, aspects of the operations of 2325 may be performed by a base station LCP communication component as described with reference to FIGS. 9 through 12.

Figure 24:
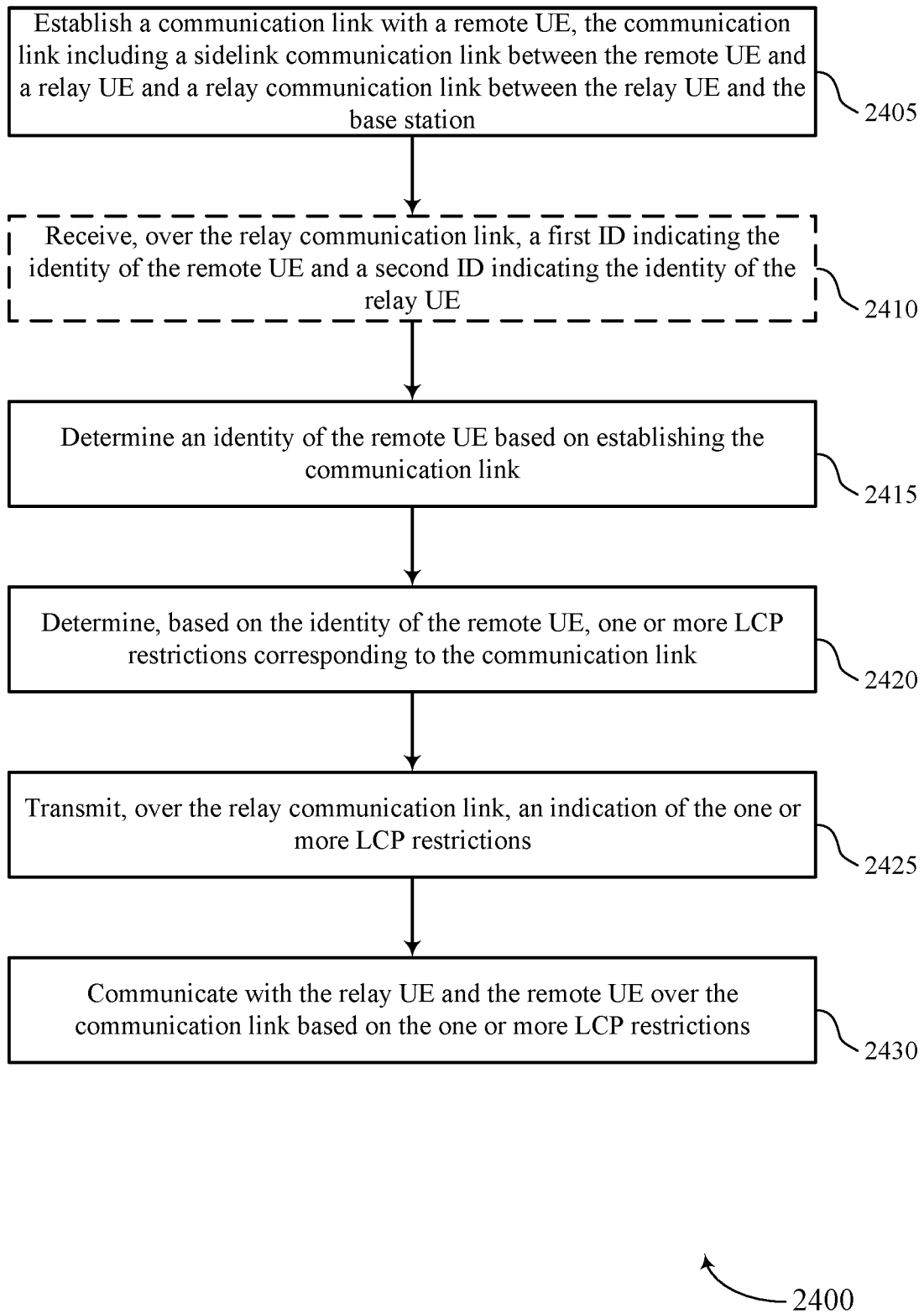

FIG. 24 shows a flowchart illustrating a method 2400 that supports channel restrictions for relayed sidelink communications in accordance with one or more aspects of the present disclosure. The operations of method 2400 may be implemented by a base station 105 or its components as described herein. For example, the operations of method 2400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2405, the base station may establish a communication link with a remote UE, the communication link including a sidelink communication link between the remote UE and a relay UE and a relay communication link between the relay UE and the base station. The operations of 2405 may be performed according to the methods described herein. In some examples, aspects of the operations of 2405 may be performed by a communication link establishment component as described with reference to FIGS. 9 through 12.

At 2410, the base station may receive, over the relay communication link, a first ID indicating the identity of the remote UE and a second ID indicating the identity of the relay UE. The operations of 2410 may be performed according to the methods described herein. In some examples, aspects of the operations of 2410 may be performed by a UE identity component as described with reference to FIGS. 9 through 12.

At 2415, the base station may determine an identity of the remote UE based on establishing the communication link. The operations of 2415 may be performed according to the methods described herein. In some examples, aspects of the operations of 2415 may be performed by a UE identity component as described with reference to FIGS. 9 through 12.

At 2420, the base station may determine, based on the identity of the remote UE, one or more LCP restrictions corresponding to the communication link. The operations of 2420 may be performed according to the methods described herein. In some examples, aspects of the operations of 2420 may be performed by an LCP restriction configuration component as described with reference to FIGS. 9 through 12.

At 2425, the base station may transmit, over the relay communication link, an indication of the one or more LCP restrictions. The operations of 2425 may be performed according to the methods described herein. In some examples, aspects of the operations of 2425 may be performed by an LCP restriction transmission component as described with reference to FIGS. 9 through 12.

At 2430, the base station may communicate with the relay UE and the remote UE over the communication link based on the one or more LCP restrictions. The operations of 2430 may be performed according to the methods described herein. In some examples, aspects of the operations of 2430 may be performed by a base station LCP communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: receiving, over a relay communication link between the first device and a base station, an indication of one or more LCP restrictions corresponding to the relay communication link and a sidelink communication link between the first device and a second device, the one or more LCP restrictions based at least in part on an identity of the second device; transmitting, over the sidelink communication link, the indication of the one or more LCP restrictions; and communicating over the sidelink communication link and the relay communication link based at least in part on the one or more LCP restrictions.

Aspect 2: The method of aspect 1, the receiving the indication of the one or more LCP restrictions comprising: receiving a configuration that differentiates an LCP for the second device from an LCP for the first device.

Aspect 3: The method of any of aspects 1 through 2, the receiving the indication of the one or more LCP restrictions comprising: receiving an indication that one or more LCHs associated with the first device have a higher scheduling priority than one or more LCHs associated with the second device.

Aspect 4: The method of any of aspects 1 through 3, the receiving the indication of the one or more LCP restrictions comprising: receiving an indication of an offset associated with an LCP for the first device.

Aspect 5: The method of aspect 4, the communicating over the sidelink communication link and the relay communication link comprising: determining an initial LCP for the first device; summing the initial LCP and the offset, the LCP for the first device based at least in part on the sum of the initial LCP and the offset; and assigning the LCP for the first device to one or more communications associated with the first device, the one or more communications transmitted over the relay communication link.

Aspect 6: The method of any of aspects 1 through 5, the one or more LCP restrictions applying to a set of devices that comprises the second device.

Aspect 7: The method of any of aspects 1 through 6, the receiving the indication of the one or more LCP restrictions comprising: receiving a configuration that restricts communications for a set of devices to a subset of carriers of a system bandwidth, the set of devices comprising the second device.

Aspect 8: The method of any of aspects 1 through 7, the receiving the indication of the one or more LCP restrictions comprising: receiving a configuration that restricts communications for a set of devices to one or more grant-based resources, the set of devices comprising the second device.

Aspect 9: The method of any of aspects 1 through 8, the receiving the indication of the one or more LCP restrictions comprising: receiving a configuration that associates each LCH corresponding to the second device with one of the sidelink communication link or a second communication link directly between the second device and the base station.

Aspect 10: The method of any of aspects 1 through 9, the receiving the indication of the one or more LCP restrictions comprising: receiving a configuration that associates each LCH corresponding to the second device with a first range of TBSs associated with the sidelink communication link and a second range of TBSs associated with a second communication link directly between the second device and the base station.

Aspect 11: The method of aspect 10, the receiving the indication of the one or more LCP restrictions further comprising: receiving, via the configuration, a threshold TBS for communications on the sidelink communication link or the second communication link.

Aspect 12: The method of any of aspects 1 through 11, further comprising: receiving, over the sidelink communication link, a first ID indicating the identity of the second device; identifying a second ID indicating an identity of the first device; and transmitting, over the relay communication link, the first ID and the second ID, the receiving the indication of the one or more LCP restrictions based at least in part on transmitting the first ID and the second ID.

Aspect 13: The method of any of aspects 1 through 12, further comprising: receiving, over the sidelink communication link, one or more first LCP restrictions configured for the second device; identifying one or more second LCP restrictions configured for the first device; and transmitting, over the relay communication link, the one or more first LCP restrictions and the one or more second LCP restrictions, the one or more LCP restrictions based at least in part on the one or more first LCP restrictions and the one or more second LCP restrictions.

Aspect 14: A method for wireless communication at a second device, comprising: receiving, over a sidelink communication link between the second device and a first device, an indication of one or more LCP restrictions corresponding to the sidelink communication link and a relay communication link between the first device and a base station, the one or more LCP restrictions based at least in part on an identity of the second device; and communicating over the sidelink communication link based at least in part on the one or more LCP restrictions.

Aspect 15: The method of aspect 14, the one or more LCP restrictions applying to a set of devices that comprises the second device.

Aspect 16: The method of any of aspects 14 through 15, the receiving the indication of the one or more LCP restrictions comprising: receiving a configuration that restricts communications for a set of devices to a subset of carriers of a system bandwidth, the set of devices comprising the second device.

Aspect 17: The method of any of aspects 14 through 16, the receiving the indication of the one or more LCP restrictions comprising: receiving a configuration that restricts communications for a set of devices to one or more grant-based resources, the set of devices comprising the second device.

Aspect 18: The method of any of aspects 14 through 17, further comprising: establishing a second communication link with the base station, the second device being located within a coverage area of the base station and the second communication link being a direct communication link between the second device and the base station.

Aspect 19: The method of any of aspects 14 through 18, the receiving the indication of the one or more LCP restrictions comprising: receiving a configuration that associates each LCH corresponding to the second device with one of the sidelink communication link or a second communication link between the second device and the base station, the second device located within a coverage area of the base station and the second communication link being a direct communication link between the second device and the base station.

Aspect 20: The method of any of aspects 14 through 19, the receiving the indication of the one or more LCP restrictions comprising: receiving a configuration that associates each LCH corresponding to the second device with a first range of TBSs associated with the sidelink communication link and a second range of TBSs associated with a second communication link between the second device and the base station, the second device located within a coverage area of the base station and the second communication link being a direct communication link between the second device and the base station.

Aspect 21: The method of aspect 20, the receiving the indication of the one or more LCP restrictions further comprising: receiving, via the configuration, a threshold TBS for communications on the sidelink communication link or the second communication link.

Aspect 22: The method of any of aspects 14 through 21, further comprising: transmitting, over the sidelink communication link, an ID indicating the identity of the second device, the receiving the indication of the one or more LCP restrictions based at least in part on transmitting the ID.

Aspect 23: The method of any of aspects 14 through 22, further comprising: transmitting, over the sidelink communication link, one or more first LCP restrictions configured for the second device, the one or more LCP restrictions based at least in part on the one or more first LCP restrictions.

Aspect 24: A method for wireless communication at a base station, comprising: transmitting, over a relay communication link between the base station and a first device, an indication of one or more LCP restrictions corresponding to the relay communication link and a sidelink communication link between the first device and a second device, the one or more LCP restrictions based at least in part on an identity of the second device; and communicating with the first device over the relay communication link based at least in part on the one or more LCP restrictions.

Aspect 25: The method of aspect 24, the transmitting the indication of the one or more LCP restrictions comprising: transmitting an LCP configuration that differentiates an LCP for the second device from an LCP for the first device.

Aspect 26: The method of any of aspects 24 through 25, the transmitting the indication of the one or more LCP restrictions comprising: transmitting an indication that one or more LCHs associated with the first device have a higher scheduling priority than one or more LCHs associated with the second device.

Aspect 27: The method of any of aspects 24 through 26, the transmitting the indication of the one or more LCP restrictions comprising: transmitting an indication of an offset associated with an LCP for the first device, one or more communications associated with the first device and communicated over the relay communication link being based at least in part on the offset.

Aspect 28: The method of any of aspects 24 through 27, the transmitting the indication of the one or more LCP restrictions comprising: transmitting an indication that the one or more LCP restrictions apply to a set of devices that comprises the second device.

Aspect 29: The method of any of aspects 24 through 28, the transmitting the indication of the one or more LCP restrictions comprising: transmitting an LCP configuration that restricts communications for a set of devices to a subset of carriers of a system bandwidth, the set of devices comprising the second device.

Aspect 30: The method of any of aspects 24 through 29, the transmitting the indication of the one or more LCP restrictions comprising: transmitting an LCP configuration that restricts communications for a set of devices to one or more grant-based resources, the set of devices comprising the second device.

Aspect 31: The method of any of aspects 24 through 30, further comprising: establishing a second communication link with the second device, the second device being located within a coverage area of the base station and the second communication link being a direct communication link between the second device and the base station.

Aspect 32: The method of any of aspects 24 through 31, the transmitting the indication of the one or more LCP restrictions comprising: transmitting an LCP configuration that associates each LCH corresponding to the second device with one of the sidelink communication link or a second communication link between the base station and the second device, the second device located within a coverage area of the base station and the second communication link being a direct communication link between the second device and the base station.

Aspect 33: The method of any of aspects 24 through 32, the transmitting the indication of the one or more LCP restrictions comprising: transmitting an LCP configuration that associates each LCH corresponding to the second device with a first range of TBSs associated with the sidelink communication link and a second range of TBSs associated with a second communication link between the base station and the second device, the second device located within a coverage area of the base station and the second communication link being a direct communication link between the second device and the base station.

Aspect 34: The method of aspect 33, further comprising: indicating, in the LCP configuration, a threshold TBS for communications on the sidelink communication link or the second communication link.

Aspect 35: The method of any of aspects 24 through 34, further comprising: receiving, over the relay communication link, a first ID indicating the identity of the second device and a second ID indicating the identity of the first device, the transmitting the indication of the one or more LCP restrictions based at least in part on receiving the first ID and the second ID.

Aspect 36: The method of any of aspects 24 through 35, further comprising: receiving, over the relay communication link, one or more first LCP restrictions configured for the second device and one or more second LCP restrictions configured for the first device, the one or more LCP restrictions based at least in part on the one or more first LCP restrictions and the one or more second LCP restrictions.

Aspect 37: An apparatus for wireless communication at a first device, comprising a processor; and memory coupled to the processor, the processor and memory configured to perform a method of any of aspects 1 through 13.

Aspect 38: An apparatus for wireless communication at a first device, comprising at least one means for performing a method of any of aspects 1 through 13.

Aspect 39: A non-transitory computer-readable medium storing code for wireless communication at a first device, the code comprising instructions executable by a processor to perform a method of any of aspects 1 through 13.

Aspect 40: An apparatus for wireless communication at a first device, comprising a processor; and memory coupled to the processor, the processor and memory configured to perform a method of any of aspects 14 through 23.

Aspect 41: An apparatus for wireless communication at a first device, comprising at least one means for performing a method of any of aspects 14 through 23.

Aspect 42: A non-transitory computer-readable medium storing code for wireless communication at a first device, the code comprising instructions executable by a processor to perform a method of any of aspects 14 through 23.

Aspect 43: An apparatus for wireless communication at a base station, comprising a processor; and memory coupled to the processor, the processor and memory configured to perform a method of any of aspects 24 through 36.

Aspect 44: An apparatus for wireless communication at a base station, comprising at least one means for performing a method of any of aspects 24 through 36.

Aspect 45: A non-transitory computer-readable medium storing code for wireless communication at a base station, the code comprising instructions executable by a processor to perform a method of any of aspects 24 through 36.

The following provides an overview of further aspects of the present disclosure:

Aspect 46: A method for wireless communication at a relay UE, comprising: establishing a communication link with a base station and a remote UE, the communication link comprising a sidelink communication link between the remote UE and the relay UE and a relay communication link between the relay UE and the base station; receiving, over the relay communication link, an indication of one or more LCP restrictions corresponding to the communication link, the one or more LCP restrictions based at least in part on an identity of the remote UE; transmitting, over the sidelink communication link, the indication of the one or more LCP restrictions; and communicating with the remote UE and the base station over the communication link based at least in part on the one or more LCP restrictions.

Aspect 47: The method of aspect 46, wherein receiving the indication of the one or more LCP restrictions comprises: receiving a configuration that differentiates an LCP for the remote UE from an LCP for the relay UE.

Aspect 48: The method of aspect 47, wherein receiving the indication of the one or more LCP restrictions further comprises: receiving, via the configuration, an indication that one or more LCHs associated with the relay UE have a higher scheduling priority than one or more LCHs associated with the remote UE.

Aspect 49: The method of any of aspects 47 through 48, wherein receiving the indication of the one or more LCP restrictions further comprises: receiving, via the configuration, an indication of an offset associated with the LCP for the relay UE.

Aspect 50: The method of aspect 49, wherein communicating with the remote UE and the base station over the communication link comprises: determining an initial LCP for the relay UE; summing the initial LCP and the offset, wherein the LCP for the relay UE is based at least in part on the sum of the initial LCP and the offset; and assigning the LCP for the relay UE to one or more communications associated with the relay UE, the one or more communications transmitted over the relay communication link.

Aspect 51: The method of any of aspects 46 through 50, wherein the one or more LCP restrictions apply to a set of remote UEs that comprises the remote UE.

Aspect 52: The method of aspect 51, wherein receiving the indication of the one or more LCP restrictions comprises: receiving a configuration that restricts communications for the set of remote UEs to a subset of carriers of a system bandwidth.

Aspect 53: The method of any of aspects 51 or 52, wherein receiving the indication of the one or more LCP restrictions comprises: receiving a configuration that restricts communications for the set of remote UEs to one or more grant-based resources.

Aspect 54: The method of any of aspects 46 through 53, wherein receiving the indication of the one or more LCP restrictions comprises: receiving a configuration that associates each LCH corresponding to the remote UE with one of the communication link or a second communication link directly between the remote UE and the base station, the configuration based at least in part on a target throughput, latency, reliability, or any combination thereof, for communications on the respective communication link or second communication link.

Aspect 55: The method of any of aspects 46 through 54, wherein receiving the indication of the one or more LCP restrictions comprises: receiving a configuration that associates each LCH corresponding to the remote UE with a first range of TBSs associated with the communication link and a second range of TBSs associated with a second communication link directly between the remote UE and the base station.

Aspect 56: The method of aspect 55, wherein receiving the indication of the one or more LCP restrictions further comprises: receiving, via the configuration, a threshold TBS for communications on the communication link or the second communication link, the threshold TBS based at least in part on a target throughput, latency, reliability, or any combination thereof, for the respective communications on the communication link or the second communication link.

Aspect 57: The method of any of aspects 46 through 56, wherein establishing the communication link comprises: receiving, over the sidelink communication link, a first ID indicating the identity of the remote UE; identifying a second ID indicating the identity of the relay UE; and transmitting, over the relay communication link, the first ID and the second ID.

Aspect 58: The method of any of aspects 46 through 57, further comprising: receiving, over the sidelink communication link, one or more first LCP restrictions configured for the remote UE; identifying one or more second LCP restrictions configured for the relay UE; and transmitting, over the relay communication link, the one or more first LCP restrictions and the one or more second LCP restrictions, wherein the one or more LCP restrictions are based at least in part on the one or more first LCP restrictions and the one or more second LCP restrictions.

Aspect 59: A method for wireless communication at a remote UE, comprising: establishing a communication link with a base station, the communication link comprising a sidelink communication link between the remote UE and a relay UE and a relay communication link between the relay UE and the base station; receiving, over the sidelink communication link, an indication of one or more LCP restrictions corresponding to the communication link, the one or more LCP restrictions based at least in part on an identity of the remote UE; and communicating over the communication link based at least in part on the one or more LCP restrictions.

Aspect 60: The method of aspect 59, wherein the one or more LCP restrictions apply to a set of remote UEs that comprises the remote UE.

Aspect 61: The method of aspect 60, wherein receiving the indication of the one or more LCP restrictions comprises: receiving a configuration that restricts communications for the set of remote UEs to a subset of carriers of a system bandwidth.

Aspect 62: The method of any of aspects 60 or 61, wherein receiving the indication of the one or more LCP restrictions comprises: receiving a configuration that restricts communications for the set of remote UEs to one or more grant-based resources.

Aspect 63: The method of any of aspects 59 through 62, further comprising: establishing a second communication link with the base station, wherein the remote UE is located within a coverage area of the base station and the second communication link is a direct communication link between the remote UE and the base station.

Aspect 64: The method of aspect 63, wherein receiving the indication of the one or more LCP restrictions comprises: receiving a configuration that associates each LCH corresponding to the remote UE with one of the communication link or the second communication link, the configuration based at least in part on a target throughput, latency, reliability, or any combination thereof, for communications on the respective communication link or second communication link.

Aspect 65: The method of any of aspects 63 or 64, wherein receiving the indication of the one or more LCP restrictions comprises: receiving a configuration that associates each LCH corresponding to the remote UE with a first range of TBSs associated with the communication link and a second range of TBSs associated with the second communication link.

Aspect 66: The method of aspect 65, wherein receiving the indication of the one or more LCP restrictions further comprises: receiving, via the configuration, a threshold TBS for communications on the communication link or the second communication link, the threshold TBS based at least in part on a target throughput, latency, reliability, or any combination thereof, for the respective communications on the communication link or the second communication link.

Aspect 67: The method of any of aspects 59 through 66, wherein establishing the communication link comprises: transmitting, over the sidelink communication link, an ID indicating the identity of the remote UE.

Aspect 68: The method of any of aspects 59 through 67, further comprising: transmitting, over the sidelink communication link, one or more first LCP restrictions configured for the remote UE, wherein the one or more LCP restrictions are based at least in part on the one or more first LCP restrictions.

Aspect 69: A method for wireless communication at a base station, comprising: establishing a communication link with a remote UE, the communication link comprising a sidelink communication link between the remote UE and a relay UE and a relay communication link between the relay UE and the base station; determining an identity of the remote UE based at least in part on establishing the communication link; determining, based at least in part on the identity of the remote UE, one or more LCP restrictions corresponding to the communication link; transmitting, over the relay communication link, an indication of the one or more LCP restrictions; and communicating with the relay UE and the remote UE over the communication link based at least in part on the one or more LCP restrictions.

Aspect 70: The method of aspect 69, wherein determining the one or more LCP restrictions comprises: determining an LCP configuration that differentiates an LCP for the remote UE from an LCP for the relay UE.

Aspect 71: The method of aspect 70, wherein determining the one or more LCP restrictions further comprises: indicating, in the configuration, that one or more LCHs associated with the relay UE have a higher scheduling priority than one or more LCHs associated with the remote UE.

Aspect 72: The method of any of aspects 70 through 71, wherein determining the one or more LCP restrictions further comprises: indicating, in the configuration, an offset associated with the LCP for the relay UE, wherein one or more communications associated with the relay UE and communicated over the relay communication link are based at least in part on the offset.

Aspect 73: The method of any of aspects 69 through 72, wherein determining the one or more LCP restrictions comprises: determining that the one or more LCP restrictions apply to a set of remote UEs that comprises the remote UE.

Aspect 74: The method of aspect 73, wherein determining the one or more LCP restrictions further comprises: determining an LCP configuration that restricts communications for the set of remote UEs to a subset of carriers of a system bandwidth.

Aspect 75: The method of any of aspects 73 or 74, wherein determining the one or more LCP restrictions further comprises: determining an LCP configuration that restricts communications for the set of remote UEs to one or more grant-based resources.

Aspect 76: The method of any of aspects 69 through 75, further comprising: establishing a second communication link with the remote UE, wherein the remote UE is located within a coverage area of the base station and the second communication link is a direct communication link between the remote UE and the base station.

Aspect 77: The method of aspect 76, wherein determining the one or more LCP restrictions comprises: determining an LCP configuration that associates each LCH corresponding to the remote UE with one of the communication link or the second communication link, the configuration based at least in part on a target throughput, latency, reliability, or any combination thereof, for communications on the respective communication link or second communication link.

Aspect 78: The method of any of aspects 76 or 77, wherein determining the one or more LCP restrictions comprises: determining an LCP configuration that associates each LCH corresponding to the remote UE with a first range of TBSs associated with the communication link and a second range of TBSs associated with the second communication link.

Aspect 79: The method of aspect 78, wherein determining the one or more LCP restrictions comprises: indicating, in the configuration, a threshold TBS for communications on the communication link or the second communication link, the threshold TBS based at least in part on a target throughput, latency, reliability, or any combination thereof, for the respective communications on the communication link or the second communication link.

Aspect 80: The method of any of aspects 69 through 79, wherein establishing the communication link comprises: receiving, over the relay communication link, a first ID indicating the identity of the remote UE and a second ID indicating the identity of the relay UE.

Aspect 81: The method of any of aspects 69 through 80, further comprising: receiving, over the relay communication link, one or more first LCP restrictions configured for the remote UE and one or more second LCP restrictions configured for the relay UE; and determining the one or more LCP restrictions based at least in part on the one or more first LCP restrictions and the one or more second LCP restrictions.

Aspect 82: An apparatus for wireless communication at a UE comprising at least one means for performing a method of any of aspects 46 through 58.

Aspect 83: An apparatus for wireless communication at a UE comprising a processor and memory coupled to the processor, the processor and memory configured to perform a method of any of aspects 46 through 58.

Aspect 84: A non-transitory computer-readable medium storing code for wireless communication at a UE comprising a processor, memory coupled with the processor, and instructions stored in the memory and executable by the processor to cause the apparatus to perform a method of any of aspects 46 through 58.

Aspect 85: An apparatus for wireless communication at a UE comprising at least one means for performing a method of any of aspects 59 through 68.

Aspect 86: An apparatus for wireless communication at a UE comprising a processor and memory coupled to the processor, the processor and memory configured to perform a method of any of aspects 59 through 68.

Aspect 87: A non-transitory computer-readable medium storing code for wireless communication at a UE comprising a processor, memory coupled with the processor, and instructions stored in the memory and executable by the processor to cause the apparatus to perform a method of any of aspects 59 through 68.

Aspect 88: An apparatus for wireless communication at a base station comprising at least one means for performing a method of any of aspects 69 through 81.

Aspect 89: An apparatus for wireless communication at a base station comprising a processor and memory coupled to the processor, the processor and memory configured to perform a method of any of aspects 69 through 81.

Aspect 90: A non-transitory computer-readable medium storing code for wireless communication at a base station comprising a processor, memory coupled with the processor, and instructions stored in the memory and executable by the processor to cause the apparatus to perform a method of any of aspects 69 through 81.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:

receiving, over a relay communication link between the first device and a network node, an indication of one or more logical channel prioritization restrictions corresponding to the relay communication link and a sidelink communication link between the first device and a second device, the one or more logical channel prioritization restrictions based at least in part on an identity of the second device;

transmitting, over the sidelink communication link, the indication of the one or more logical channel prioritization restrictions; and communicating over the sidelink communication link and the relay communication link based at least in part on the one or more logical channel prioritization restrictions.

2. The method of claim 1, the receiving the indication of the one or more logical channel prioritization restrictions comprising:

receiving an indication that one or more logical channels associated with the first device have a higher scheduling priority than one or more logical channels associated with the second device.

3. The method of claim 1, the receiving the indication of the one or more logical channel prioritization restrictions comprising:
receiving an indication of an offset associated with a logical channel priority for the first device.

4. The method of claim 3, the communicating over the sidelink communication link and the relay communication link comprising:
determining an initial logical channel priority for the first device;
summing the initial logical channel priority and the offset, the logical channel priority for the first device based at least in part on the sum of the initial logical channel priority and the offset; and
assigning the logical channel priority for the first device to one or more communications associated with the first device, the one or more communications transmitted over the relay communication link.

5. The method of claim 1, the receiving the indication of the one or more logical channel prioritization restrictions comprising:
receiving a configuration that restricts communications for a set of devices to a subset of carriers of a system bandwidth, the set of devices comprising the second device.

6. The method of claim 1, the receiving the indication of the one or more logical channel prioritization restrictions comprising:
receiving a configuration that restricts communications for a set of devices to one or more grant-based resources, the set of devices comprising the second device.

7. The method of claim 1, the receiving the indication of the one or more logical channel prioritization restrictions comprising:
receiving a configuration that associates each logical channel corresponding to the second device with one of the sidelink communication link or a second communication link directly between the second device and the network node.

8. The method of claim 1, the receiving the indication of the one or more logical channel prioritization restrictions comprising:
receiving a configuration that associates each logical channel corresponding to the second device with a first range of transport block sizes associated with the sidelink communication link and a second range of transport block sizes associated with a second communication link directly between the second device and the network node.

9. The method of claim 8, the receiving the indication of the one or more logical channel prioritization restrictions further comprising:
receiving, via the configuration, a threshold transport block size for communications on the sidelink communication link or the second communication link.

10. The method of claim 1, further comprising:
receiving, over the sidelink communication link, a first identifier indicating the identity of the second device;
identifying a second identifier indicating an identity of the first device; and
transmitting, over the relay communication link, the first identifier and the second identifier, the receiving the indication of the one or more logical channel prioritization restrictions based at least in part on transmitting the first identifier and the second identifier.

11. The method of claim 1, further comprising:
receiving, over the sidelink communication link, one or more first logical channel prioritization restrictions configured for the second device;
identifying one or more second logical channel prioritization restrictions configured for the first device; and
transmitting, over the relay communication link, the one or more first logical channel prioritization restrictions and the one or more second logical channel prioritization restrictions, the one or more logical channel prioritization restrictions based at least in part on the one or more first logical channel prioritization restrictions and the one or more second logical channel prioritization restrictions.

12. A method for wireless communication at a second device, comprising:
receiving, over a sidelink communication link between the second device and a first device, an indication of one or more logical channel prioritization restrictions corresponding to the sidelink communication link and a relay communication link between the first device and a network node, the one or more logical channel prioritization restrictions based at least in part on an identity of the second device; and
communicating over the sidelink communication link based at least in part on the one or more logical channel prioritization restrictions.

13. The method of claim 12, the receiving the indication of the one or more logical channel prioritization restrictions comprising:
receiving a configuration that restricts communications for a set of devices to a subset of carriers of a system bandwidth, the set of devices comprising the second device.

14. The method of claim 12, the receiving the indication of the one or more logical channel prioritization restrictions comprising:
receiving a configuration that restricts communications for a set of devices to one or more grant-based resources, the set of devices comprising the second device.

15. The method of claim 12, the receiving the indication of the one or more logical channel prioritization restrictions comprising:
receiving a configuration that associates each logical channel corresponding to the second device with one of the sidelink communication link or a second communication link between the second device and the network node, the second device located within a coverage area of the network node and the second communication link being a direct communication link between the second device and the network node.

16. The method of claim 12, the receiving the indication of the one or more logical channel prioritization restrictions comprising:
receiving a configuration that associates each logical channel corresponding to the second device with a first range of transport block sizes associated with the sidelink communication link and a second range of transport block sizes associated with a second communication link between the second device and the network node, the second device located within a coverage area of the network node and the second communication link being a direct communication link between the second device and the network node.

17. The method of claim 16, the receiving the indication of the one or more logical channel prioritization restrictions further comprising:
receiving, via the configuration, a threshold transport block size for communications on the sidelink communication link or the second communication link.

18. The method of claim 12, further comprising:
transmitting, over the sidelink communication link, an identifier indicating the identity of the second device, the receiving the indication of the one or more logical channel prioritization restrictions based at least in part on transmitting the identifier.

19. The method of claim 12, further comprising:
transmitting, over the sidelink communication link, one or more first logical channel prioritization restrictions configured for the second device, the one or more logical channel prioritization restrictions based at least in part on the one or more first logical channel prioritization restrictions.

20. A method for wireless communication at a network node, comprising:
transmitting, over a relay communication link between the network node and a first device, an indication of one or more logical channel prioritization restrictions corresponding to the relay communication link and a sidelink communication link between the first device and a second device, the one or more logical channel prioritization restrictions based at least in part on an identity of the second device; and
communicating with the first device over the relay communication link based at least in part on the one or more logical channel prioritization restrictions.

21. The method of claim 20, the transmitting the indication of the one or more logical channel prioritization restrictions comprising:
transmitting an indication that one or more logical channels associated with the first device have a higher scheduling priority than one or more logical channels associated with the second device.

22. The method of claim 20, the transmitting the indication of the one or more logical channel prioritization restrictions comprising:
transmitting an indication of an offset associated with a logical channel priority for the first device, one or more communications associated with the first device and communicated over the relay communication link being based at least in part on the offset.

23. The method of claim 20, the transmitting the indication of the one or more logical channel prioritization restrictions comprising:
transmitting a logical channel priority configuration that restricts communications for a set of devices to a subset of carriers of a system bandwidth, the set of devices comprising the second device.

24. The method of claim 20, the transmitting the indication of the one or more logical channel prioritization restrictions comprising:
transmitting a logical channel priority configuration that restricts communications for a set of devices to one or more grant-based resources, the set of devices comprising the second device.

25. The method of claim 20, the transmitting the indication of the one or more logical channel prioritization restrictions comprising:
transmitting a logical channel priority configuration that associates each logical channel corresponding to the second device with one of the sidelink communication link or a second communication link between the network node and the second device, the second device located within a coverage area of the network node and the second communication link being a direct communication link between the second device and the network node.

26. The method of claim 20, the transmitting the indication of the one or more logical channel prioritization restrictions comprising:
transmitting a logical channel priority configuration that associates each logical channel corresponding to the second device with a first range of transport block sizes associated with the sidelink communication link and a second range of transport block sizes associated with a second communication link between the network node and the second device, the second device located within a coverage area of the network node and the second communication link being a direct communication link between the second device and the network node.

27. The method of claim 26, further comprising:
indicating, in the logical channel priority configuration, a threshold transport block size for communications on the sidelink communication link or the second communication link.

28. The method of claim 20, further comprising:
receiving, over the relay communication link, a first identifier indicating the identity of the second device and a second identifier indicating the identity of the first device, the transmitting the indication of the one or more logical channel prioritization restrictions based at least in part on receiving the first identifier and the second identifier.

29. The method of claim 20, further comprising:
receiving, over the relay communication link, one or more first logical channel prioritization restrictions configured for the second device and one or more second logical channel prioritization restrictions configured for the first device, the one or more logical channel prioritization restrictions based at least in part on the one or more first logical channel prioritization restrictions and the one or more second logical channel prioritization restrictions.

30. An apparatus for wireless communication at a first device, comprising:
at least one processor; and
at least one memory coupled with the at least one processor, the at least one processor configured to:
receive, over a relay communication link between the first device and a network node, an indication of one or more logical channel prioritization restrictions corresponding to the relay communication link and a sidelink communication link between the first device and a second device, the one or more logical channel prioritization restrictions based at least in part on an identity of the second device;
transmit, over the sidelink communication link, the indication of the one or more logical channel prioritization restrictions; and
communicate over the sidelink communication link and the relay communication link based at least in part on the one or more logical channel prioritization restrictions.

31. The apparatus of claim 30, wherein, to receive the indication of the one or more logical channel prioritization restrictions, the at least one processor is configured to:
receive an indication that one or more logical channels associated with the first device have a higher scheduling priority than one or more logical channels associated with the second device.

32. The apparatus of claim 30, wherein, to receive the indication of the one or more logical channel prioritization restrictions, the at least one processor is configured to:
receive an indication of an offset associated with a logical channel priority for the first device.

33. The apparatus of claim 30, wherein, to receive the indication of the one or more logical channel prioritization restrictions, the at least one processor is configured to:
receiving a configuration that restricts communications for a set of devices to a subset of carriers of a system bandwidth, the set of devices comprising the second device.

34. The apparatus of claim 30, wherein, to receive the indication of the one or more logical channel prioritization restrictions, the at least one processor is configured to:
receiving a configuration that restricts communications for a set of devices to one or more grant-based resources, the set of devices comprising the second device.

35. An apparatus for wireless communication at a second device, comprising:
at least one processor; and
at least one memory coupled with the at least one processor, the at least one processor configured to:
receive, over a sidelink communication link between the second device and a first device, an indication of one or more logical channel prioritization restrictions corresponding to the sidelink communication link and a relay communication link between the first device and a network node, the one or more logical channel prioritization restrictions based at least in part on an identity of the second device; and
communicate over the sidelink communication link based at least in part on the one or more logical channel prioritization restrictions.

36. The apparatus of claim 35, wherein, to receive the indication of the one or more logical channel prioritization restrictions, the at least one processor is configured to:
receive a configuration that restricts communications for a set of devices to a subset of carriers of a system bandwidth, the set of devices comprising the second device.

37. The apparatus of claim 35, wherein, to receive the indication of the one or more logical channel prioritization restrictions, the at least one processor is configured to:
receive a configuration that restricts communications for a set of devices to one or more grant-based resources, the set of devices comprising the second device.

38. The apparatus of claim 35, wherein, to receive the indication of the one or more logical channel prioritization restrictions, the at least one processor is configured to:
receive a configuration that associates each logical channel corresponding to the second device with one of the sidelink communication link or a second communication link between the second device and the network node, the second device is located within a coverage area of the network node and the second communication link is a direct communication link between the second device and the network node.

39. The apparatus of claim 35, wherein, to receive the indication of the one or more logical channel prioritization restrictions, the at least one processor is configured to:
receive a configuration that associates each logical channel corresponding to the second device with a first range of transport block sizes associated with the sidelink communication link and a second range of transport block sizes associated with a second communication link between the second device and the network node, the second device is located within a coverage area of the network node and the second communication link is a direct communication link between the second device and the network node.

40. An apparatus for wireless communication at a network node, comprising:
at least one processor; and
at least one memory coupled with the at least one processor, the at least one processor configured to:
transmit, over a relay communication link between the network node and a first device, an indication of one or more logical channel prioritization restrictions corresponding to the relay communication link and a sidelink communication link between the first device and a second device, the one or more logical channel prioritization restrictions based at least in part on an identity of the second device; and
communicate with the first device over the relay communication link based at least in part on the one or more logical channel prioritization restrictions.

41. The apparatus of claim 40, wherein, to transmit the indication of the one or more logical channel prioritization restrictions, the at least one processor is configured to:
transmit an indication that one or more logical channels associated with the first device have a higher scheduling priority than one or more logical channels associated with the second device.

42. The apparatus of claim 40, wherein, to transmit the indication of the one or more logical channel prioritization restrictions, the at least one processor is configured to:
transmit an indication of an offset associated with a logical channel priority for the first device, one or more communications associated with the first device and communicated over the relay communication link are based at least in part on the offset.

43. The apparatus of claim 40, wherein, to transmit the indication of the one or more logical channel prioritization restrictions, the at least one processor is configured to:
transmit a logical channel priority configuration that restricts communications for a set of devices to a subset of carriers of a system bandwidth, the set of devices comprising the second device.

44. The apparatus of claim 40, wherein, to transmit the indication of the one or more logical channel prioritization restrictions, the at least one processor is configured to:
transmit a logical channel priority configuration that restricts communications for a set of devices to one or more grant-based resources, the set of devices comprising the second device.

45. An apparatus for wireless communication at a first device, comprising:
at least one processor; and
at least one memory coupled with the at least one processor, the at least one processor configured to:
receive, over a relay communication link between the first device and a network node, an indication of one or more logical channel prioritization restrictions corresponding to the relay communication link and a sidelink communication link between the first device and a second device, the first device and the second device are organized into one or more sets of devices, different sets of the one or more sets are scheduled separately, and the one or more logical channel prioritization restrictions are based at least in part on a set of the one or more sets to which the second device belongs;

transmit, over the sidelink communication link, the indication of the one or more logical channel prioritization restrictions; and communicate over the sidelink communication link and the relay communication link based at least in part on the one or more logical channel prioritization restrictions.

46. The apparatus of claim 45, wherein, to receive the indication of the one or more logical channel prioritization restrictions, the at least one processor is configured to:

receive an indication that one or more logical channels associated with the first device have a higher scheduling priority than one or more logical channels associated with the second device.

47. The apparatus of claim 45, wherein, to receive the indication of the one or more logical channel prioritization restrictions, the at least one processor is configured to:

receive an indication of an offset associated with a logical channel priority for the first device.

48. The apparatus of claim 45, wherein, to receive the indication of the one or more logical channel prioritization restrictions, the at least one processor is configured to:

receiving a configuration that restricts communications for a set of devices to a subset of carriers of a system bandwidth, the set of devices comprising the second device.

49. The apparatus of claim 45, wherein, to receive the indication of the one or more logical channel prioritization restrictions, the at least one processor is configured to:

receiving a configuration that restricts communications for a set of devices to one or more grant-based resources, the set of devices comprising the second device.

50. An apparatus for wireless communication at a network node, comprising:

at least one processor; and at least one memory coupled with the at least one processor, the at least one processor configured to:

transmit, over a relay communication link between the network node and a first device, an indication of one or more logical channel prioritization restrictions corresponding to the relay communication link and a sidelink communication link between the first device and a second device, the first device and the second device are organized into one or more sets of devices, different sets of the one or more sets are scheduled separately, and the one or more logical channel prioritization restrictions are based at least in part on a set of the one or more sets to which the second device belongs; and communicate with the first device over the relay communication link based at least in part on the one or more logical channel prioritization restrictions.

51. The apparatus of claim 50, wherein, to transmit the indication of the one or more logical channel prioritization restrictions, the at least one processor is configured to:

transmit an indication that one or more logical channels associated with the first device have a higher scheduling priority than one or more logical channels associated with the second device.

52. The apparatus of claim 50, wherein, to transmit the indication of the one or more logical channel prioritization restrictions, the at least one processor is configured to:

transmit an indication of an offset associated with a logical channel priority for the first device, one or more communications associated with the first device and communicated over the relay communication link are based at least in part on the offset.

53. The apparatus of claim 50, wherein, to transmit the indication of the one or more logical channel prioritization restrictions, the at least one processor is configured to:

transmit a logical channel priority configuration that restricts communications for a set of devices to a subset of carriers of a system bandwidth, the set of devices comprising the second device.

54. The apparatus of claim 50, wherein, to transmit the indication of the one or more logical channel prioritization restrictions, the at least one processor is configured to:

transmit a logical channel priority configuration that restricts communications for a set of devices to one or more grant-based resources, the set of devices comprising the second device.

55. A non-transitory computer-readable medium storing code for wireless communication at a first device, the code comprising instructions executable by at least one processor to:

receive, over a relay communication link between the first device and a network node, an indication of one or more logical channel prioritization restrictions corresponding to the relay communication link and a sidelink communication link between the first device and a second device, the one or more logical channel prioritization restrictions based at least in part on an identity of the second device;

transmit, over the sidelink communication link, the indication of the one or more logical channel prioritization restrictions; and communicate over the sidelink communication link and the relay communication link based at least in part on the one or more logical channel prioritization restrictions.

56. The non-transitory computer-readable medium of claim 55, wherein the instructions are further executable by the at least one processor to:

receive an indication that one or more logical channels associated with the first device have a higher scheduling priority than one or more logical channels associated with the second device.

57. The non-transitory computer-readable medium of claim 55, wherein the instructions are further executable by the at least one processor to:

receive an indication of an offset associated with a logical channel priority for the first device.

58. A non-transitory computer-readable medium storing code for wireless communication at a second device, the code comprising instructions executable by at least one processor to:

receive, over a sidelink communication link between the second device and a first device, an indication of one or more logical channel prioritization restrictions corresponding to the sidelink communication link and a relay communication link between the first device and a network node, the one or more logical channel prioritization restrictions based at least in part on an identity of the second device; and communicate over the sidelink communication link based at least in part on the one or more logical channel prioritization restrictions.

59. The non-transitory computer-readable medium of claim 58, wherein the instructions are further executable by the at least one processor to:
receive a configuration that restricts communications for a set of devices to a subset of carriers of a system bandwidth, the set of devices comprising the second device.

60. The non-transitory computer-readable medium of claim 58, wherein the instructions are further executable by the at least one processor to:
receive a configuration that restricts communications for a set of devices to one or more grant-based resources, the set of devices comprising the second device.

61. A non-transitory computer-readable medium storing code for wireless communication at a network node, the code comprising instructions executable by at least one processor to:
transmit, over a relay communication link between the network node and a first device, an indication of one or more logical channel prioritization restrictions corresponding to the relay communication link and a sidelink communication link between the first device and a second device, the one or more logical channel prioritization restrictions based at least in part on an identity of the second device; and
communicate with the first device over the relay communication link based at least in part on the one or more logical channel prioritization restrictions.

62. The non-transitory computer-readable medium of claim 61, wherein the instructions are further executable by the at least one processor to:
transmit an indication that one or more logical channels associated with the first device have a higher scheduling priority than one or more logical channels associated with the second device.

63. The non-transitory computer-readable medium of claim 61, wherein the instructions are further executable by the at least one processor to:
transmit an indication of an offset associated with a logical channel priority for the first device, one or more communications associated with the first device and communicated over the relay communication link are based at least in part on the offset.

64. A non-transitory computer-readable medium storing code for wireless communication at a first device, the code comprising instructions executable by at least one processor to:
receive, over a relay communication link between the first device and a network node, an indication of one or more logical channel prioritization restrictions corresponding to the relay communication link and a sidelink communication link between the first device and a second device, the first device and the second device are organized into one or more sets of devices, different sets of the one or more sets are scheduled separately, and the one or more logical channel prioritization restrictions are based at least in part on a set of the one or more sets to which the second device belongs;
transmit, over the sidelink communication link, the indication of the one or more logical channel prioritization restrictions; and
communicate over the sidelink communication link and the relay communication link based at least in part on the one or more logical channel prioritization restrictions.

65. The non-transitory computer-readable medium of claim 64, wherein the instructions are further executable by the at least one processor to:
receive an indication that one or more logical channels associated with the first device have a higher scheduling priority than one or more logical channels associated with the second device.

66. The non-transitory computer-readable medium of claim 64, wherein the instructions are further executable by the at least one processor to:
receive an indication of an offset associated with a logical channel priority for the first device.

67. A non-transitory computer-readable medium storing code for wireless communication at a network node, the code comprising instructions executable by at least one processor to:
transmit, over a relay communication link between the network node and a first device, an indication of one or more logical channel prioritization restrictions corresponding to the relay communication link and a sidelink communication link between the first device and a second device, the first device and the second device are organized into one or more sets of devices, different sets of the one or more sets are scheduled separately, and the one or more logical channel prioritization restrictions are based at least in part on a set of the one or more sets to which the second device belongs; and
communicate with the first device over the relay communication link based at least in part on the one or more logical channel prioritization restrictions.

68. The non-transitory computer-readable medium of claim 67, wherein the instructions are further executable by the at least one processor to:
transmit an indication that one or more logical channels associated with the first device have a higher scheduling priority than one or more logical channels associated with the second device.

69. The non-transitory computer-readable medium of claim 67, wherein the instructions are further executable by the at least one processor to:
transmit an indication of an offset associated with a logical channel priority for the first device, one or more communications associated with the first device and communicated over the relay communication link are based at least in part on the offset.

* * * * *